(12) United States Patent
Obana et al.

(10) Patent No.: US 6,214,118 B1
(45) Date of Patent: Apr. 10, 2001

(54) APPARATUS FOR FORMING EXTERNAL ELECTRODES OF ELECTRONIC COMPONENT, COMPONENT, COMPONENT INSERTING APPARATUS, PASTE COATING APPARATUS, AND COMPONENT CONVEYER BELT

(75) Inventors: Naoki Obana; Minoru Yuasa; Kazuo Naganuma, all of Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/168,896

(22) Filed: Oct. 9, 1998

(30) Foreign Application Priority Data

Oct. 9, 1997 (JP) ...................................... 9-277336

(51) Int. Cl.⁷ ...................................................... B05C 1/08
(52) U.S. Cl. ......................... 118/712; 118/713; 118/244; 118/249; 118/211; 118/212; 118/213; 118/500
(58) Field of Search ..................................... 118/249, 713, 118/244, 712, 500, 213, 212, 211, 239, 248, 687; 198/397.06

(56) References Cited

U.S. PATENT DOCUMENTS 5,226,382   7/1993   Braden .
5,863,331 * 1/1999   Braden et al. ....................... 118/261

FOREIGN PATENT DOCUMENTS

H6-215991   8/1994   (JP) .

* cited by examiner

Primary Examiner—Laura Edwards
(74) Attorney, Agent, or Firm—Lowe Hauptman Gilman & Berner, LLP

(57) ABSTRACT

An external electrode forming apparatus is used to form external electrodes on the component chips. The external electrode forming apparatus comprises a component conveyer belt, a belt feeding mechanism, a component-inserting machine, a component-reversing machine, a paste-coating machine, and a component-discharging machine. For the component-inserting machine, the component-reversing machine, and the component-discharging machine, pressure pins are used to insert or move the component chips. These pressure pins have at the tip part a taper portion with a tip shape smaller than that of the component holding hole. Since the pressure pins of this type are used, the tip portions of these pressure pins may be prevented from impinging upon the opening edges of the component holding holes, and the pressure pins after the impingement may be hindered from forcibly being inserted into the component holding holes, whereby damage to the interiors of the component holding holes can be extremely diminished.

6 Claims, 44 Drawing Sheets

APPARATUS FOR FORMING EXTERNAL ELECTRODES OF ELECTRONIC COMPONENT, COMPONENT, COMPONENT INSERTING APPARATUS, PASTE COATING APPARATUS, AND COMPONENT CONVEYER BELT

BACKGROUND OF THE INVENTION

1. Field of the Invention

The present invention relates to an apparatus for forming external electrodes on component chips for a electronic component, an apparatus for inserting the component chips into component holding holes of a component conveyer belt, an apparatus for coating with an electrode paste the component chips that are held within the component holding holes of the component conveyer belt, and the component conveyer belt for conveying the component chips in a state of being resiliently held.

2. Description of the Prior Art

Japanese Patent Application Laid-Open No.H6-215991 discloses an apparatus for forming external electrodes on both ends of a component chip. The apparatus has an endless belt having resilient masks with small apertures, sprockets having the endless belt wound there around, means for inserting component chips into the apertures in the resilient masks, means for coating with a terminal paste respective end portions of the component chips that are inserted into the apertures, and means for extracting the component chips with the paste coating out of the resilient masks.

In the above-noted apparatus, pins each having the same diameter as each of the apertures are used for inserting the component chips into the apertures in the resilient masks provided on the endless belt, moving the component chips within the apertures, or extracting the component chips out of the apertures. For this reason, if the centerline of each aperture should be slightly incorrectly aligned with the centerline of each pin, the tip of the pin would be caused to strike the opening edge of the aperture. In addition, the colliding pins are forcibly inserted into the apertures, resulting in damage to the apertures.

This misalignment may necessarily occur due to dimensional precision of the endless belt, the resilient mask or the like, which is difficult to be prevented. Therefore, if operations of inserting the components into the apertures, moving the components within the apertures, or extracting the components out of the apertures are repeatedly conducted, the damage to the apertures in the resilient masks will be caused to increase. As a result, there suffers from the disadvantage that the component chips may not be inserted into the apertures, the inserted component chips may be dropped out therefrom, or the like. Therefore, the expected external electrode formation will not be satisfactorily achieved.

SUMMARY OF THE INVENTION

An object of the present invention is to provide an external electrode forming apparatus for electronic components while reducing damage to the interiors of component holding holes formed in a component conveyer belt and performing a good external electrode formation on the component chips over a long time period.

In order to attain this object, according to the present invention, the external electrode forming apparatus comprises an endless component conveyer belt including rows of component holding holes in a longitudinal direction of the belt in parallel at equal intervals for resiliently holding the component chips, a belt feeding mechanism for intermittently feeding said component conveyer belt in a predetermined direction, a component-inserting machine for inserting the component chips into the component holding holes, with use of pressure pins, to project one end portion of each component chip from one surface of said component conveyer belt, a component-reversing machine for moving within the component holding holes the component chips that are held within the component holding holes, with use of pressure pins, to project the other end portion of each component chip from the other surface of said component conveyer belt, a paste-coating machine for coating with electrode paste the projection of each component chip that is held within each component holding hole, and a component-discharging machine for extruding the paste coated component chips from the component holding holes with use of pressure pins, wherein each pressure pin used in said component-inserting machine, said component-reversing machine, and said component-discharging machine has a taper portion with a tip shape which is smaller than said component holding hole at the tip part.

In the external electrode forming apparatus according to the present invention, since pressure pins each having a taper portion at the tip are available, impingement may be prevented upon the open-ended edges of the component holding holes. The pressure pins after the impingement may also be hindered from forcibly being inserted into the component holding holes, whereby damage to the interiors of the component holding holes can be extremely diminished. As a result, such inconvenience may be overcome as insertion failure or dropout of the inserted component chips to perform a good formation of external electrodes on the component chips over such a long period.

The aforementioned object and other objects, features and advantages in accordance with the present invention will be apparent in conjunction with the following description and appended claims, and the accompanying drawings.

DESCRIPTION OF THE PREFERRED EMBODIMENTS

Figure 1:
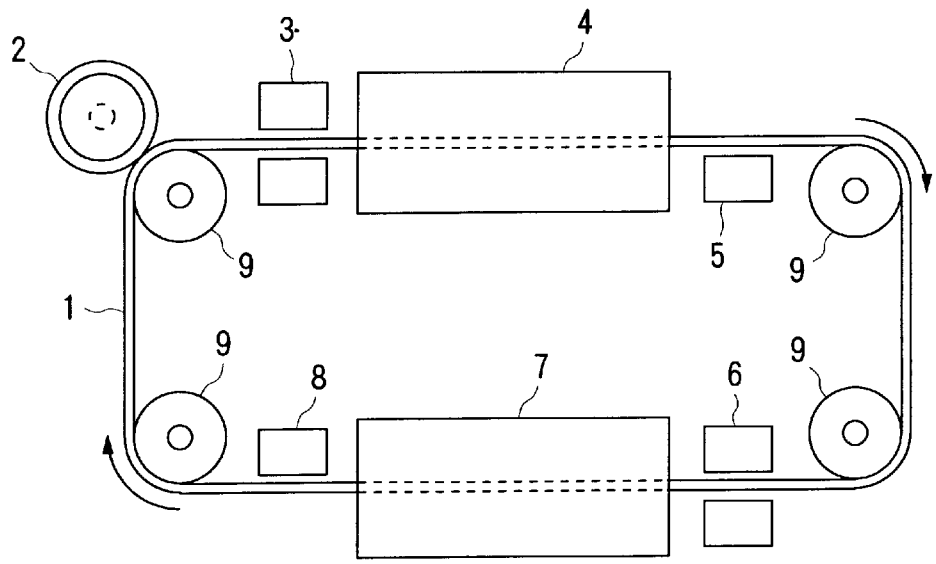
FIG. 1 is a schematic structural view showing a first embodiment of an external electrode forming apparatus according to the present invention.
Figure 2:
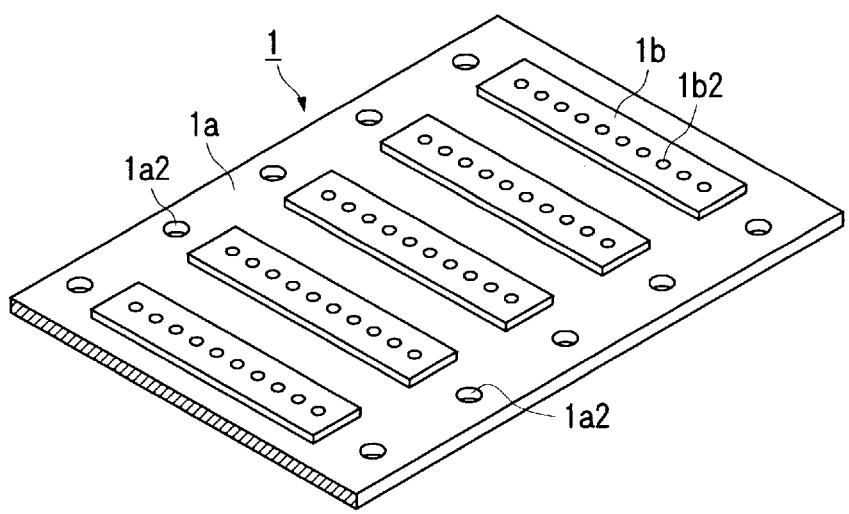
FIG. 2 is a partial perspective view of a component conveyer belt shown in FIG. 1.

FIGS. 1 to 10 show a first embodiment of an external electrode forming apparatus in accordance with the present invention. In the figures, reference numeral 1 denotes a component conveyer belt, 2 denotes a component-inserting machine, 3 denotes a first paste-coating machine, 4 denotes a first paste dryer, 5 denotes a component-reversing machine, 6 denotes a second paste-coating machine, 7 denotes a second paste dryer, 8 denotes a component-discharging machine, 9 denotes a sprocket; and P denotes a component chip.

The component conveyer belt 1 is made up of an endless belt body 1a, and a plurality of resilient bodies 1b that are located in a longitudinal direction parallel to the belt at equal intervals. This component conveyer belt 1 is wound about four sprockets 9, and intermittently advances in the preset direction at a given pitch corresponding to a interval SD (see FIG. 3), which will be described later, by an intermittent driving means such as a pulse motor (not shown) connected to any one of these four sprockets 9.

The belt body 1a is preferably made of metal such as stainless, and has non-expandability and appropriate flexibility. Also, a plurality of resilient body mounting holes 1a1 having a configuration extending widthwise of the belt are formed in a longitudinal direction parallel to the belt at equal intervals in the belt body 1a. Further, a plurality of guide holes 1a2 into which the circumferential surface projection (not shown) of each of the sprockets 9 is inserted and fitted are formed in a longitudinal direction of the belt at equal intervals on both side edges widthwise or one side edge widthwise of the belt body 1a.

Each resilient body 1b is preferably made of synthetic rubber such as silicone rubber, and has appropriate resilience. Each resilient body 1b also has a slightly more thickness than that of the belt body 1a and has a slightly more length and width than those of each mounting hole 1a1. A ring groove 1b1 into which the inner edge of the resilient body mounting hole 1a1 is inserted and fitted is formed at the center in the direction of thickness of the circumferential surface of each resilient body 1b. Further, a plurality of component holding holes 1b2 having a circular shape in the lateral section are formed in each resilient body 1b so as to be located in a longitudinal direction of the resilient body at equal intervals and perforate in the direction of thickness thereof. The diameter Rh of each component holding hole 1b2 is set as slightly smaller than the end maximum length of each component chip P so that the component chips P can be inserted in the longitudinal orientation and be resiliently held therein. Of course, if the same insertion and holding operations as aforementioned may be possible, the lateral shape of each component holding hole 1b2 may be rectangular or other shapes.

Figure 3:
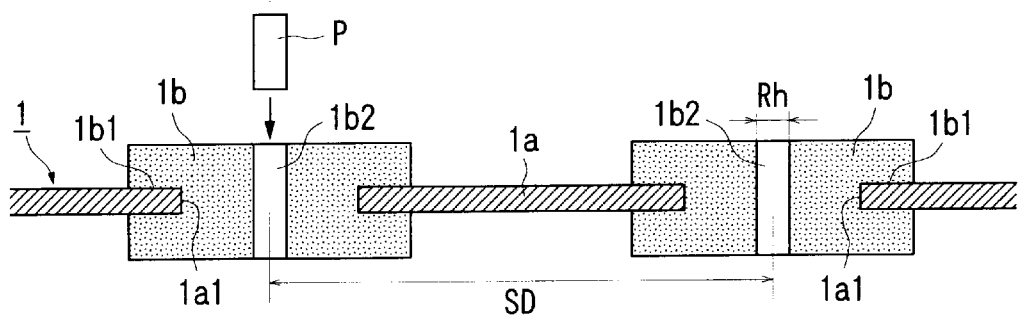
FIG. 3 is a partial longitudinal sectional view of the component conveyer belt shown in FIG. 1.
Figure 4:
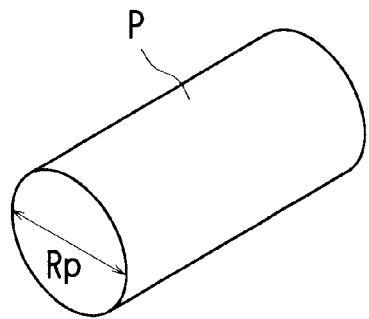
FIGS. 4(A) and 4(B) are perspective views of component chips that are handled in the apparatus shown in FIG. 1.
Figure 4:
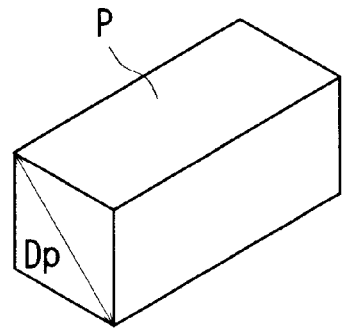
Figure 5:
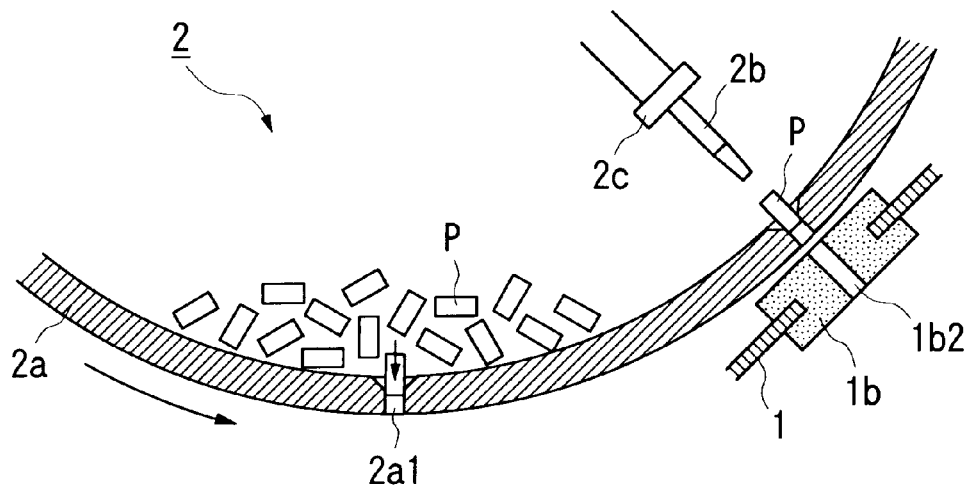
FIGS. 5(A) and 5(B) are diagrams showing the arrangement and the operation of a component-inserting machine in the apparatus shown in FIG. 1.
Figure 5:
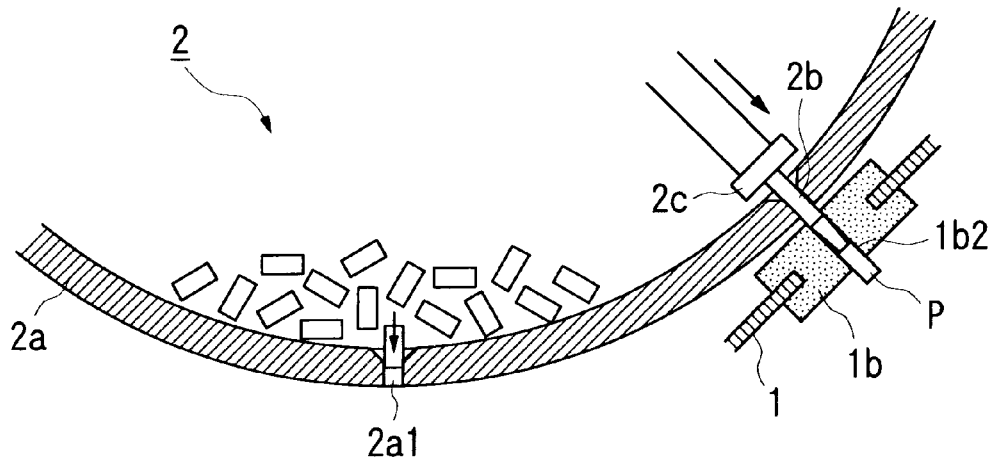
Figure 6:
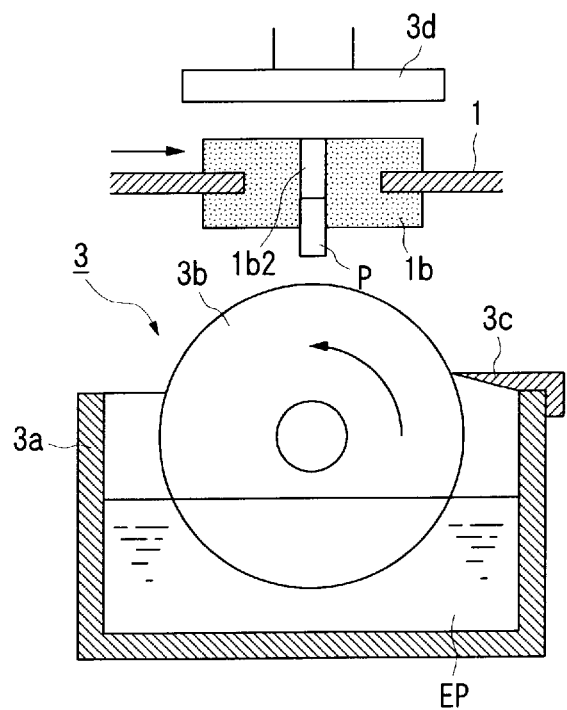
FIGS. 6(A) and 6(B) are diagrams showing the arrangement and the operation of a paste-coating machine in the apparatus shown in FIG.
Figure 6:
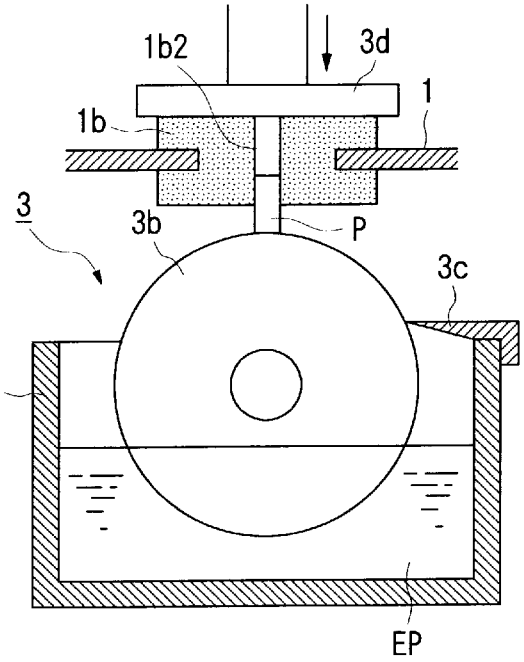
Figure 7:
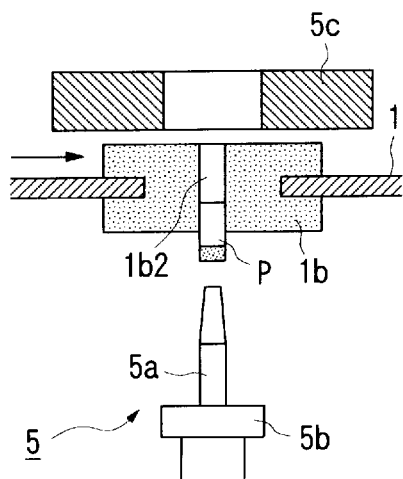
FIGS. 7(A) and 7(B) are diagrams showing the arrangement and the operation of a component-reversing machine in the apparatus shown in FIG. 1.
Figure 7:
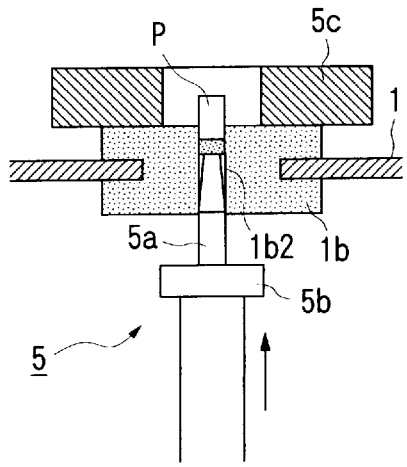
Figure 8:
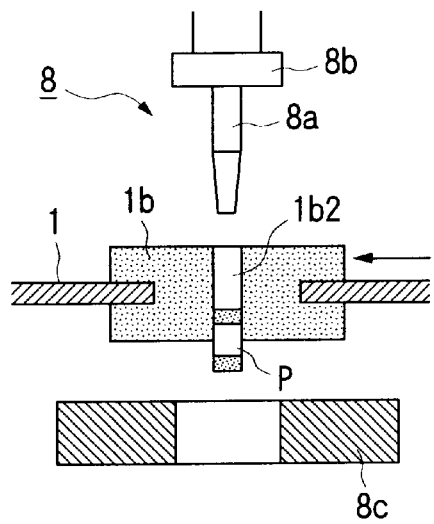
FIGS. 8(A) and 8(B) are diagrams showing the arrangement and the operation of a component-discharging machine in the apparatus shown in FIG. 1.
Figure 8:
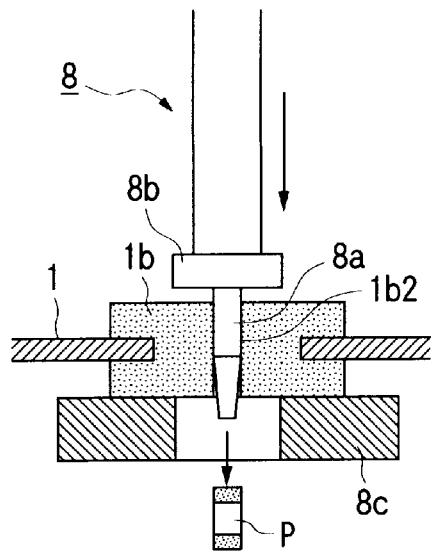
Figure 9:
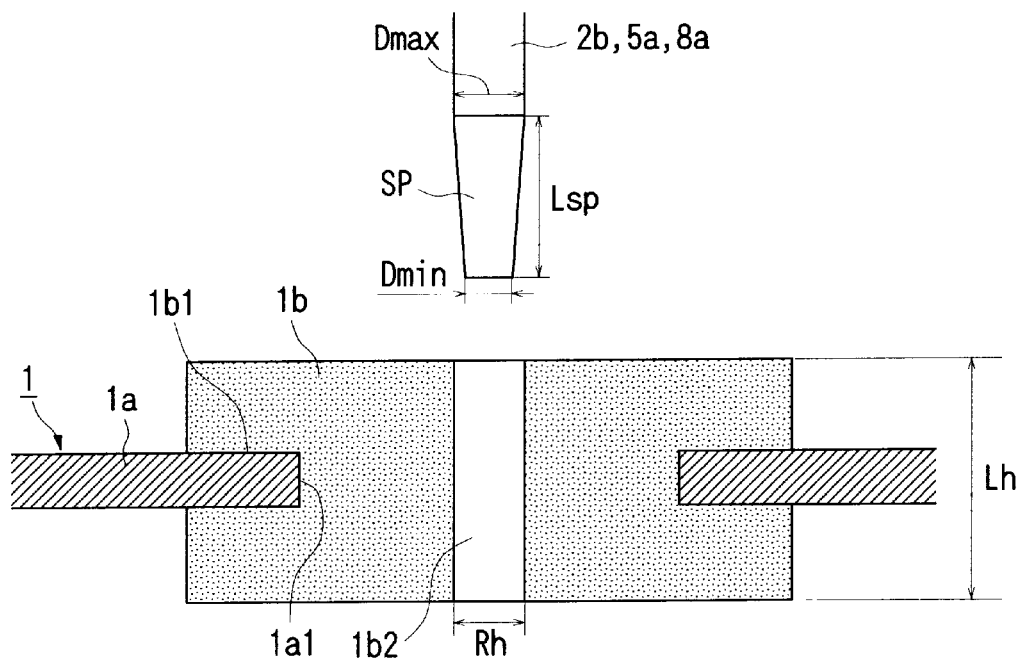
FIG. 9 is a diagram showing a dimensional relation between a pressure pin and a component holding hole.
Figure 10:
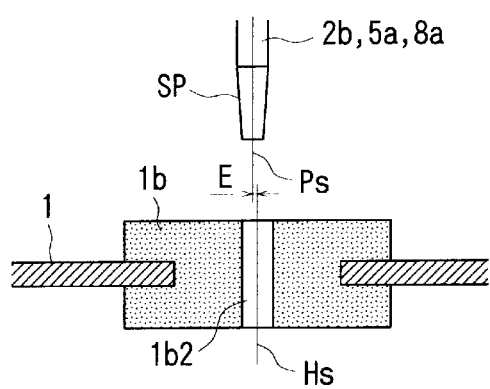
FIGS. 10(A) and 10(B) are diagrams showing that the pressure pin is inserted into the component holding hole.
Figure 10:
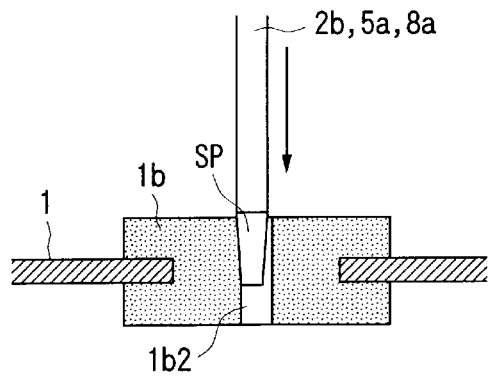

Referring to FIG. 3, there is a predetermined interval SD between one resilient body 1b mounted on the belt body 1a and another resilient body 1b adjacent thereto. The interval SD is brought into coincidence with an interval in a longitudinal direction of the component holding holes 1b2 row that are formed in the resilient body 1b.

Shown in FIGS. 4(A) and 4(B) is the configuration of the component chips P that are inserted into and held in the component holding holes 1b2 of the resilient body 1b. Each component chip P means an electronic component prior to the external electrode formation, such as a chip capacitor, a chip inductor or a chip resistor. The component chips P have component circuits on the interior or the surface of a ceramic chip, and external electrodes are formed on the both end portions of each chip so as to be conductively connected to the component circuits. The component chip P shown in FIG. 4(A) is shaped in a cylindrical manner having a diameter of Rp, and the component chip P shown in FIG. 4(B) is shaped in a rectangular parallelepiped manner having an end maximum length of Dp. When electrodes are formed on the cylindrical component chip P, the diameter Rh of the component holding hole 1b2 (see FIG. 3) is set slightly smaller than the diameter Rp of the component chip P. Also, when electrodes are formed on the rectangular parallelepiped-shaped component chip P, the diameter Rh of the component holding hole 1b2 is set slightly smaller than the end maximum length Dp of the component chip P. In the both cases, the component chip P that is inserted into the component holding hole 1b2 is resiliently held by the resilient body 1b that is slightly deformed due to the component insertion.

Referring now to FIG. 5(A), the component-inserting machine 2 is made up of a cylindrical drum 2a, an intermittent driving means such as a pulse motor (not shown) for intermittently rotating the drum 2a at a given angular pitch so as to correspond to intermittent advancement of the component conveyer belt 1, a plurality of pressure pins 2b for the component insertion, a pin supporting member 2c, and a rectilinear driving means such as a cylinder (not shown) for going and returning moving the pressure pins 2b by driving the pin supporting member 2c. In the embodiment, the component-inserting machine 2 is located on the area that the component conveyer belt 1 may advance in a curved state (in FIG. 1, the outside of the sprocket 9 positioned at upper left).

A plurality of rows of the insertion guide holes 2a1 having a circular shape in the lateral section is penetratingly formed in the circumferential surface of the drum 2a in the direction of the drum periphery at equal spaced intervals so as to be brought into coincidence with the angular pitch for intermittently rotation. The number of the insertion guide holes 2a1 per row and the arrangement thereof, and the number of the pressure pins 2b and the arrangement thereof coincide with the number of the component holding holes 1b2 formed in each resilient body 1b and the arrangement thereof. Further, the diameter of each insertion guide hole 2a1 substantially coincides with the diameter Rp or the end maximum length Dp of each component chip P, and the component chips P can be captured to be lightly held therein. Further, a conical guide surface (no reference numeral) is formed at an open-end portion on the interior of the drum of each insertion guide hole 2a1.

A number of the component chips P are stored in bulk within the drum 2a, and dropout of the stored chips P is defined by the wall surface of the side surface of the drum. The component chips P are stirred by intermittently rotating the drum 2a, and concurrently are given vibration if required, so that the component chips P enter into each insertion guide hole 2a1 through the guide surface, and then may be lightly held within each insertion guide hole 2a1. As shown in FIG. 5(A), since the drum 2a is intermittently rotated so as to be synchronized with the component conveyer belt 1, the component chips P that have entered into each insertion guide holes 2a1 move to the position opposite to the pressure pins 2b and the component holding holes 1b2 of the resilient body 1b.

Referring to FIG. 5(B), when the component conveyer belt 1 is stopped, the pressure pins 2b are moved outward. For this reason, the component chips P that are held within the insertion guide holes 2a1 are pressed by the pressure pins 2b to be forced into the component holding holes 1b2 of the resilient body 1b from the insertion guide holes 2a1. Accordingly, one end portion of each component chip P may project from the reverse surface of the resilient body 1b. Incidentally, a moving stroke of each pressure pin 2b is set in such a manner that approximately half of the length dimension of each component chip P may project from the reverse surface of the resilient body 1b. For this reason, the pressure pins 2b that have been moved at the predetermined stroke are returned to the original position.

Referring to FIG. 6(A), the first paste-coating machine 3 is made up of a vessel 3a for housing electrode paste EP, a coating roller 3b for being freely rotatably disposed in the vessel 3a, an intermittent driving means such as a pulse motor (not shown), for intermittently rotating the coating roller 3b at a given angular pitch so as to correspond to intermittent advancement of the component conveyer belt 1, a blade 3c for scraping the excess electrode paste EP adhered to the coating roller 3b, a pressure plate 3d for pressing the component, and a rectilinear driving means such as a cylinder (not shown), for advancing and returning the pressure plate 3d. The first paste-coating machine 3 is located on the area that the component conveyer belt 1 may advance in a planar state (in FIG. 1, the right side of the sprocket 9 positioned at upper left). The width of the coating roller 3b is formed so as to correspond to the length of the resilient body 1b, so that all the component chips P that are held within the component holding holes 1b2 of the resilient body 1b can be coated with the electrode paste EP in a batch manner. The electrode paste EP is prepared by mixing a metallic powder such as Ag, a binder, a solvent and the like, and is subjected to burning treatment to produce a desired external electrode. The other electrode paste is also available except for the aforementioned electrode paste. Further, for the aforementioned paste-coating machine, such an apparatus may be employed that an end portion of the component chip is brought into contact with the plate surface to which the electrode paste is adhered, whereby the paste coating is applied to the component chip.

Since the coating roller 3b is intermittently rotated synchronizingly with the component conveyer belt 1, this rotation may cause the electrode paste EP to be adhered to the outer circumferential surface of the coating roller 3b. The excess electrode paste EP is scraped by the blade 3c, and therefore the electrode paste EP is adhered at a given thickness to the outer circumferential surface of the coating roller after the roller 3b passes through the blade 3c.

Referring to FIG. 6(B), when the component conveyer belt 1 is stopped, the pressure plate 3d is moved downward, and the resilient body 1b is pressed down together with the component conveyer belt 1. Accordingly, one end portion of the component chips P that are held within the component holding holes 1b2 is pressed against the outer circumferential surface of the coating roller 3b, whereby the electrode paste EP is applied to the end portion of the component chips P. Incidentally, a moving stroke of the pressure plate 3d is set to the extent that the end portion of the one end projection of the component chip P is brought into contact with the outer circumferential surface of the coating roller 3b. For this reason, the plate 3d that has been moved at the predetermined stroke is returned to the original position.

The first paste dryer 4 has an electrothermal heater (not shown) therein. The electrode paste EP is applied by the first paste-coating machine 3, and thereafter is dried in the process that the component conveyer belt 1 passes within the first paste dryer 4. Incidentally, in the case where electrode paste capable of being dried in a normal temperature atmosphere is utilized, the first paste dryer 4 may not be always required.

Referring now to FIG. 7(A), the component-reversing machine 5 is made up of a plurality of pressure pins 5a for the component feeding, and a pin supporting member 5b. A rectilinear driving means, such as a cylinder (not shown) advances and returns the pressure pins 5a by driving the pin supporting member 5b. Machine 5 also includes a supporting plate 5c for the resilient body 1b supporting. The component-reversing machine 5 is located on an area where the component conveyer belt 1 advances in a planar state (in FIG. 1, the left side of the sprocket 9 positioned at upper right). The number of the pressure pins and arrangement of pressure pins 5a coincide with the number and arrangement of the component holding holes 1b2 formed in the resilient bodies 1b. Further, the width of the supporting plate 5c corresponds with the length of the resilient body 1b, and elongated holes (no reference numeral) are formed on the supporting plate 5c so as to correspond to the arrangement of the component holding hole 1b2.

Referring to FIG. 7(B), when the component conveyer belt 1 is stopped, the pressure pins 5a are moved upward. For this reason, the component chips P that are held within the component holding holes 1b2 are pressed by the pressure pins 5a to pass through the component holding holes 1b2. Then, the other end portion that is not subjected to the electrode paste EP coating may project from the reverse surface of the resilient body 1b. The supporting plate 5c serves to support the resilient body 1b when the pressure pin 5a is moved upward. Incidentally, a moving stroke of the pressure pin 5a is set in such a manner that approximately half of the length dimension of the component chip P may project from the reverse surface of the resilient body 1b. For this reason, the pressure pins 5a that have been moved at the predetermined stroke are returned to the original position.

The second paste-coating machine 6 has the same arrangement and function as the first paste-coating machine 3, and thus illustration and description of the arrangement will be omitted. The second paste-coating machine 6 is located on the area that the component conveyer belt 1 may advance in a planar state (in FIG. 1, the left side of the sprocket 9 positioned at lower right). When the component conveyer belt 1 is stopped, the pressure plate is moved downward, and the resilient body 1b is pressed down together with the component conveyer belt 1. Accordingly, the other end portion of the component chips P that are held within the component holding holes 1b2 may be pressed against the outer circumferential surface of the coating roller, whereby the electrode paste EP is applied to the other end portion of the component chips P. Incidentally, a moving stroke of the pressure plate is set to the extent that the end portion of the other end projection of the component chip P is brought into contact with the outer circumferential surface of the coating roller. For this reason, the plate that has been moved at the predetermined stroke is returned to the original position.

The second paste dryer 7 has an electrothermal heater (not shown) therein similar to the first paste dryer 4. The electrode paste EP is applied by the second paste-coating machine 6, and thereafter is dried in the process that the component conveyer belt 1 passes within the second paste dryer 7. Incidentally, in the case where electrode paste capable of being dried in a normal temperature atmosphere is utilized, the second paste dryer 7 may not be always required.

Referring now to FIG. 8(A), the component-discharging machine 8 is made up of a plurality of pressure pins 8a for forcing out the component, a pin supporting member 8b, a rectilinear driving means such as a cylinder (not shown) for advancing and returning the pressure pins 8a by driving the pin supporting member 8b, and a supporting plate 8c for resilient body supporting. The component-discharging machine 8 is located on the area where the component conveyer belt 1 advances in a planar state (in FIG. 1, the right side of the sprocket 9 positioned at lower left). The number and arrangement of the pressing pins 8a coincide with the number and arrangement of the component holding holes 1b2 formed in the resilient bodies 1b. Further, the width of the supporting plate 8c corresponds with the length of the resilient body 1b, and elongated holes (no reference numeral) are formed on the supporting plate 8c so as to correspond to the arrangement of the component holding hole 1b2.

Referring to FIG. 8(B), when the component conveyer belt 1 is stopped, the pressure pins 8a are moved upward. For this reason, the component chips P that are held within the component holding holes 1b2 are pressed by the pressure pins 8a to be extruded downward from the component holding holes 1b2. The supporting plate 8c serves to support the resilient body 1b when the pressure pins 8a are moved downward. Incidentally, the advancing stroke of the pressure pin 8a is set in such a manner that the component chip P that is held within the component holding hole 1b2 is completely extruded from the component holding hole 1b2. For this reason, the pressure pins 8a that have been moved at the predetermined stroke are returned to the original position.

In the aforementioned manner, at the time when the component conveyer belt 1 is stopped, the component chips P are subsequently inserted into the component holding holes 1b2 of the resilient bodies 1b of the component conveyer belt 1 by the component-inserting machine 2. The component chips P that are inserted into the component holding holes 1b2 are fed through the first paste-coating machine 3, the first paste dryer 4, the component-reversing machine 5, the second paste-coating machine 6 and the second paste dryer 7 in this order, and finally are coated with the electrode paste EP on its both ends. The component chips P that are coated with the electrode paste EP are extruded from the component holding holes 1b2 by the component-discharging machine 8 and then collected in a vessel or the like. Thereafter, the component chips P are delivered to a next manufacturing line.

Incidentally, in the external electrode forming apparatus according to the first embodiment of the present invention, improvement is undergone with reference to its configuration of the pressure pin 2b of the component-inserting machine 2, the pressure pin 5a of the component-reversing machine 5, and the pressure pin 8a of the component-discharging machine 8. In other words, as can be seen from FIG. 9, a taper portion SP is formed at the tip portion of the respective pressure pins 2b, 5a and 8a. In this embodiment, since a reference lateral section uses a circular shaped straight pin as the respective pressure pins 2b, 5a and 8a, the taper portion SP is arranged in a circular truncated cone manner that the lateral section shape gradually converses toward the tip.

The maximum diameter Dmax of the taper portion SP is substantially the same as the diameter Rh of the component holding hole 1b2 formed on the resilient body 1b, and further the minimum diameter Dmin of the taper portion SP appearing on a tip shape is made smaller than the diameter Rh of the component holding hole 1b2. The dimensional difference between the maximum diameter Dmax and the minimum diameter Dmin of the taper portion SP is equal to more than a tolerance of the interval SD (see FIG. 3). The length dimension Lsp of the taper portion SP is also smaller than the length dimension Lh of the component holding hole 1b2.

For specifically exemplified numerical values, the diameter Rh of the component holding hole 1b2 is 0.46 mm, the length dimension Lh thereof is 1.397 mm, while if the tolerance of the interval SD of the resilient body 1b is ±0.1 mm, the maximum diameter Dmax of the taper portion SP is 0.45 mm, the minimum diameter Dmin thereof is 0.3 mm, and the length diameter Lsp is 1.0 mm. In this case, the maximum diameter Dmax and the minimum diameter Dmin of the taper portion SP have the dimensional difference (0.15 mm) more than the tolerance of the interval SD.

The interval SD of the resilient body 1b on the component conveyer belt 1 involves a small fluctuation depending upon the dimensional precision of the resilient body incorporating groove 1a1, the resilient body 1b, or the like. As a result, as shown FIG. 10(A), but not there is intermittent misalignment E due to the fluctuation between the central line Hs of the component holding hole 1b2 of the resilient body 1b in a stopping state and the central line Ps of the respective pressure pins 2b, 5a and 8a.

Even under such a condition, if the aforementioned taper portion SP is formed at the tip portion of the respective pressure pins 2b, 5a and 8a, and the minimum diameter Dmin of the taper portion SP is made smaller than the diameter Rh of the component holding hole 1b2, it is be possible to avoid impingement of the tip portion of the pin upon the opening edge of the component holding hole 1b2 when the respective pressure pins 2b, 5a and 8a are inserted into the component holding hole 1b2. In particular, if the maximum diameter Dmax and the minimum diameter Dmin of the taper portion SP is made larger than the tolerance of the interval SD, it will be possible to more positively avoid the tip of the pin from impinging upon the opening edge of the component holding hole 1b2.

In addition, as shown in FIG. 10(B), since the component holding hole 1b2 may be smoothly moved making use of the angular outer surface of the taper portion SP after the respective pressure pins 2b, 5a and 8a are inserted into the component holding hole 1b2 of the resilient body 1b, damage affecting the component holding hole 1b2 at the time of inserting the pins would be possibly reduced.

Furthermore, if the length dimension Lsp of the taper portion SP is made smaller than the length dimension Lh of the component holding hole 1b2, the taper portion SP with a suitable angled outer surface could be moved smoothly within the component holding hole 1b2. Still, rigidity of the taper portion SP and the entire pins would be prevented from reducing, whereby deformation of the taper portion SP and some other portions would be avoided from occurring.

As can be seen from above, in the first embodiment according to the present invention, the apparatus uses the pressure pins 2b, 5a and 8a having the taper portions SP at the tips. To this end, the tips of these pressure pins may be prevented from impinging upon the opening edges of the component holding holes 1b2, and the pressure pins after the impingement may be hindered from forcibly being inserted into the component holding holes 1b2, whereby damage to the interiors of the component holding holes 1b2 can be extremely diminished. As a consequence, such a disadvantage that the component chips P may not be inserted into the component holding hole 1b2 or the inserted component chips P may be dropped out therefrom can be overcome, to perform the expected external electrode formation with high efficiency for a long period. Further, in the embodiment according to the present invention, the lifetime of the component conveyer belt 1 may extend, whereby the frequency of exchanging the expensive component conveyer belt 1 is reduced to prevent the cost loading for the belt exchanging and increase of the manufacturing cost.

Figure 11:
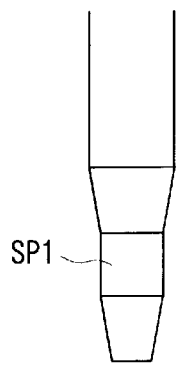
FIGS. 11(A), 11(B) and 11(C) are diagrams showing a configuration example of a taper portion of the pressure pin, respectively.
Figure 11:
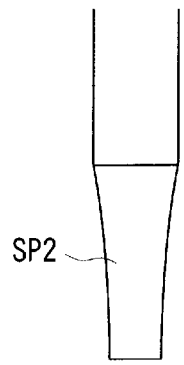
Figure 11:
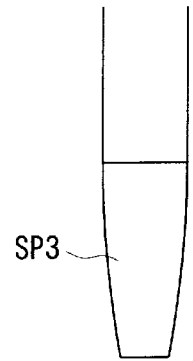

Referring now to FIG. 11(A), shapes for the taper portion SP of the respective pressure pins 2b, 5a and 8a may be adopted to the shape (SP1), shown in FIG. 11(A), having a cylindrical portion imposed between a plurality of circular truncated cone base portions so that the outer diameter of the taper portion SP may become gradually small and also having a stepless continuing body. Further, as shown in FIGS. 11(B) and 11(C), shapes such as concave or convex (SP2 or SP3) may be adopted to the outer surface of the taper portion. Of course, in the case where polygonal straight pins in the reference lateral section are used for the respective pressure pins 2b, 5a and 8a, the same operation and effect would be realized with such taper portions.

Figure 12:
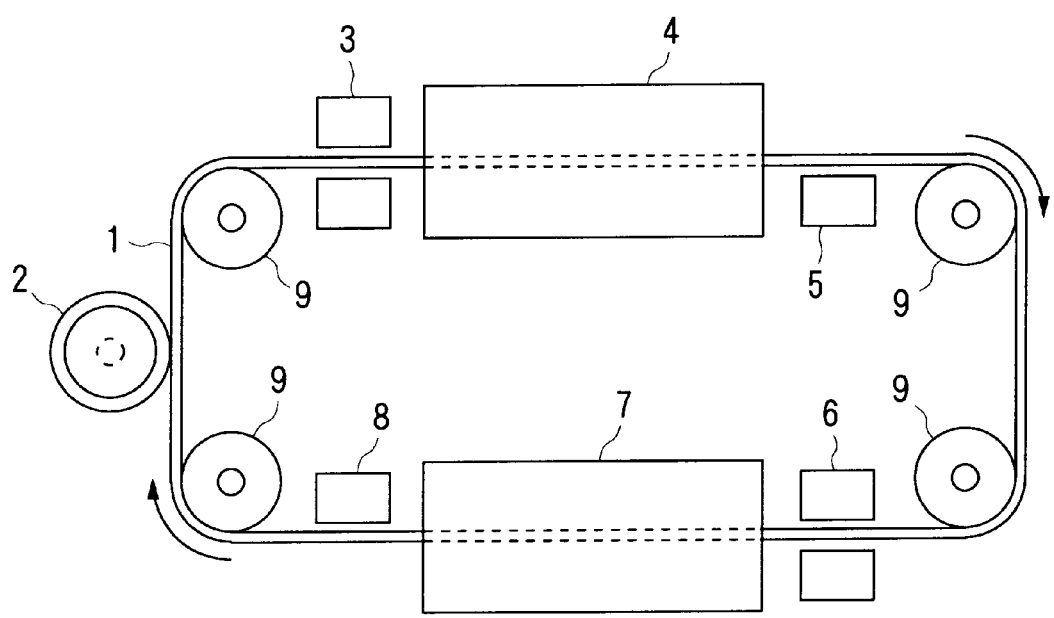
FIG. 12 is a schematic structural view showing a second embodiment of the external electrode forming apparatus according to the present invention.
Figure 13:
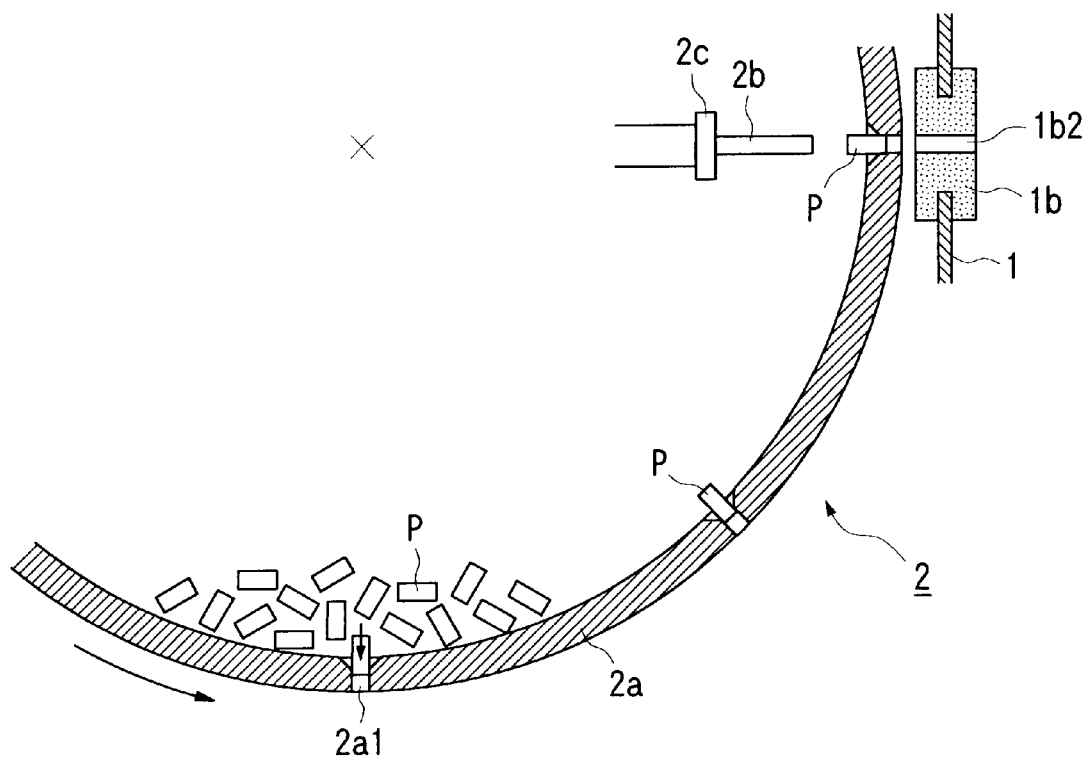
FIGS. 13(A) and 13(B) are diagrams showing the arrangement and the operation of the component-inserting machine in the apparatus shown in FIG. 12.
Figure 13:
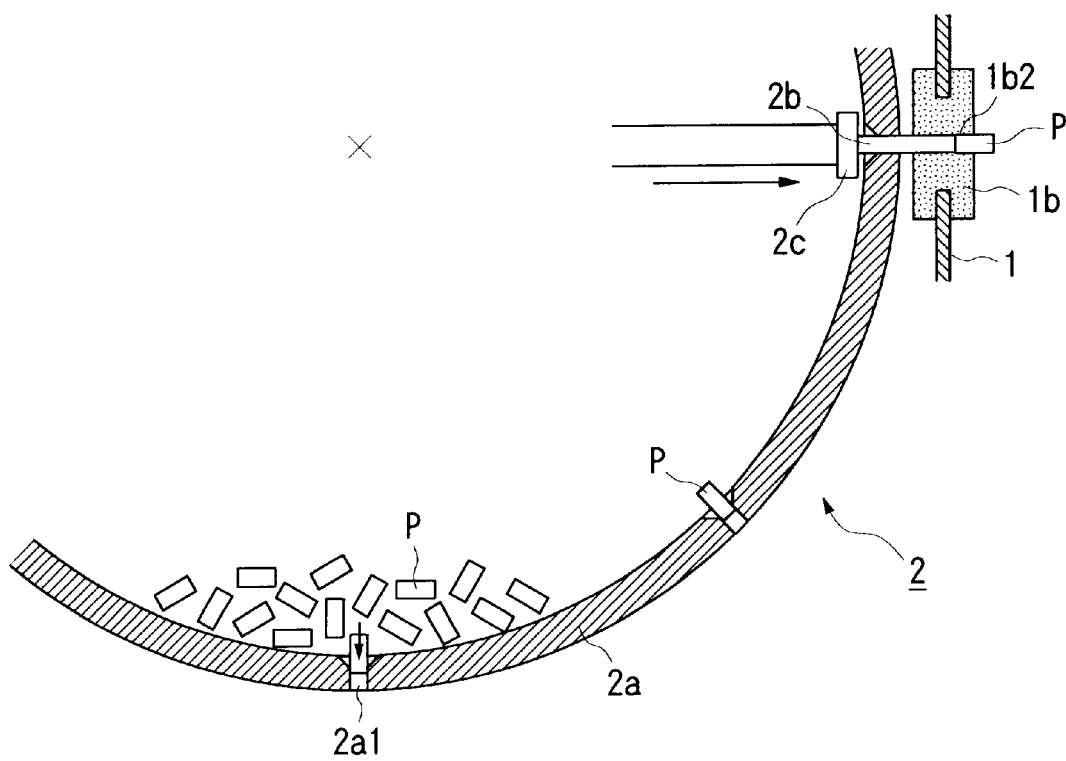

FIGS. 12 and 13 show a second embodiment of the external electrode forming apparatus according to the present invention. Referring to FIG. 12, the following points are different from the aforementioned first embodiment of the present invention: (1) the component-inserting machine 2 is located on the area that the component conveyer belt 1 may advance in a planar state (in the figure, between a sprocket 9 positioned at upper left and a sprocket 9 positioned at lower left); and (2) the pressure pin 2b of the component-inserting machine 2 is made to move in a perpendicular orientation to the surface of the component conveyer belt 1. Other arrangements are the same as that of the first embodiment of the present invention, and therefore the identical reference numerals are used as well as description will be omitted.

The component chips P stored in the drum 2a are stirred by intermittently rotating of the drum 2a, and by giving outer vibration if required, enter into the insertion guide hole 2a1 through the guide surface, and then may be lightly held within the insertion guide holes 2a1. As shown in FIG. 13(A), since the drum 2a is intermittently rotated so as to be synchronized with the component conveyer belt 1, the component chips P that have entered into the insertion guide holes 2a1 travel to position opposite to the pressure pins 2b and the component holding holes 1b2 of the resilient body 1b.

Referring to FIG. 13(B), when the component conveyer belt 1 is stopped, the pressure pins 2b are moved outward. For this reason, the component chips P that are held within the insertion guide holes 2a1 are pressed by the pressure pins 2b to be forced into the component holding holes 1b2 of the resilient body 1b from the insertion guide holes 2a1. Accordingly, one end portion of each component chip P may project from the reverse surface of the resilient body 1b. Incidentally, a moving stroke of the pressure pin 2b is set in such a manner that approximately half of the length dimension of the component chip P may project from the reverse surface of the resilient body 1b. For this reason, the pressure pins 2b that have been moved at the predetermined stroke are returned to the original position.

As seen from above, in the apparatus of the second embodiment according to the present invention, the component-inserting machine 2 is located on the area that the component conveyer belt 1 may advance in a planar state, whereby the component can be inserted into the component holding holes 1b2 with high efficiency under such an appropriate condition that no deformation may occur of the resilient body 1b and the component holding holes 1b2. Further, since the component-reversing machine 5 and the component-discharging machine 8 are also located on the area that the component conveyer belt 1 may advance in a planar state, which is same as the component-inserting machine 2, the component feeding in conjunction with the component inverse and the component discharging may be smoothly carried out. Accordingly, damage affecting the component holding hole 1b2 may be further reduced, and such a problem may be positively prohibited that the component chips P are inconveniently inserted into the component holding hole 1b2 and dropped out therefrom.

It is noted that in order to perform more efficiently the component feeding in conjunction with the component insertion into the component holding hole 1b2, the component inverse, or the component discharging, the following position adjustment method may be adopted.

Figure 14:
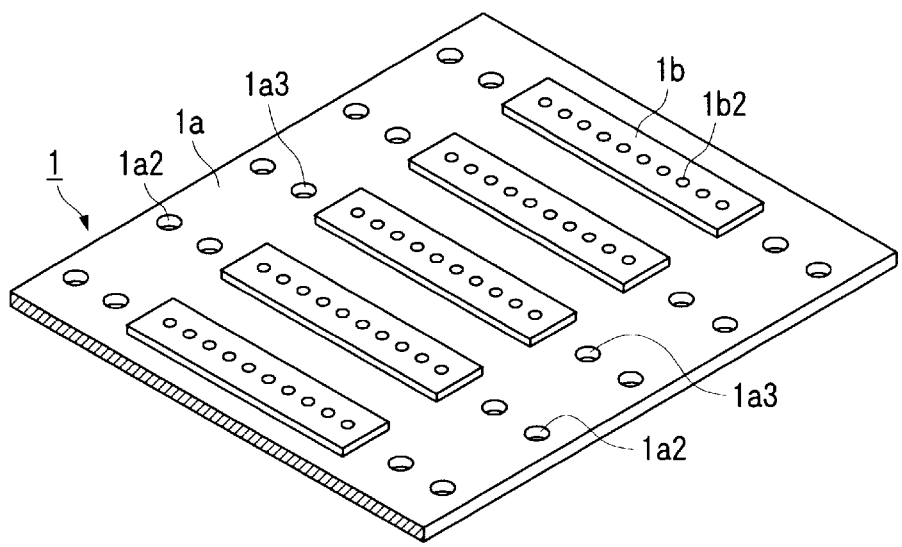
FIG. 14 is a partial perspective view of a component conveyer belt in accordance with a first example of a method of position-adjusting pressure pins and component holding holes.
Figure 15:
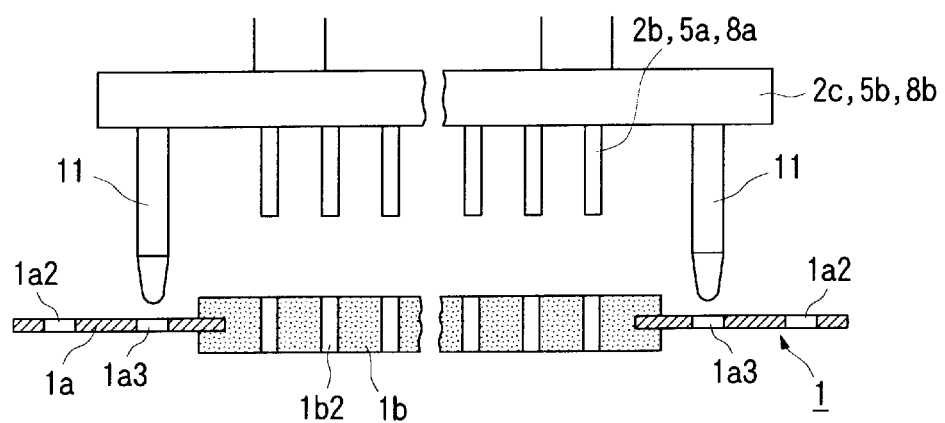
FIG. 15 is a diagrams showing a position relation between a pin supporting member and the component conveyer belt in accordance with the first example of the method of position-adjusting the pressure pins and the component holding holes.
Figure 16:
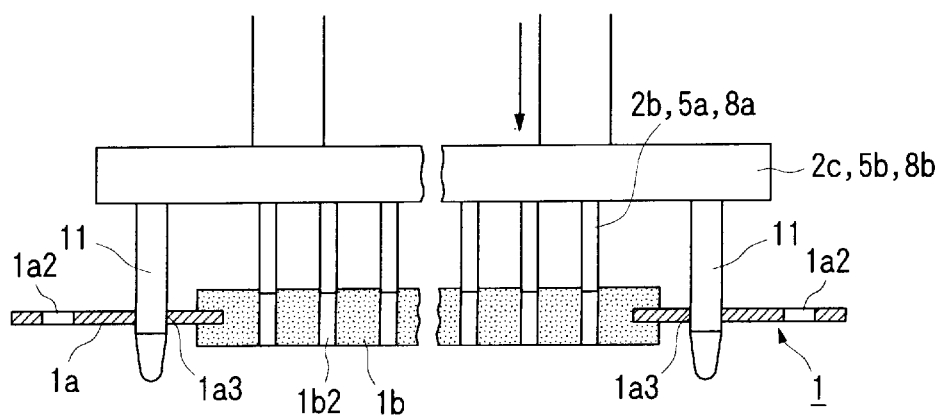
FIG. 16 is an explanatory diagram of an operation in accordance with the first example of the method of position-adjusting the pressure pins and the component holding holes.

FIGS. 14 to 16 show a first example of the position adjustment method. As seen from FIG. 14, positioning holes 1a3 into which positioning rods 11 which will be described later are inserted are formed on a belt body 1a of a component conveyer belt 1 so that the positioning holes 1a3 may be located at the both sides of each of resilient bodies 1b. The interval in a longitudinal direction of the belt between the positioning holes 1a3 is coincident with the interval in a longitudinal direction of the belt between the resilient bodies 1b. The center of each positioning hole 1a3 is aligned with the arrangement center of the component holding holes 1b2.

Referring now to FIG. 15, the positioning rods 11 having a sharp tip portion to correspond to the positioning hole 1a3 are formed on the pin supporting members 2c, 5b and 8b for supporting pressure pins 2b, 5a and 8a respectively. The interval of the positioning rods 11 is mated with the interval widthwise of the belt between the positioning holes 1a3. The center of each positioning rod 11 is aligned with the arrangement center of the respective pressure pins 2b, 5a and 8a, and each positioning rod 11 has longer length than the respective pressure pins 2b, 5a and 8a.

Referring now to FIG. 16, when the respective pin supporting members 2c, 5b and 8b are driven in the state where the component conveyer belt 1 is stopped, the positioning rods 11 are initially inserted into the positioning holes 1a3 of the belt body 1a, and thereafter the respective pressure pins 2b, 5a and 8a are inserted into the component holding holes 1b2. Accordingly, even when there exists slight misalignment in its position between the respective pressure pins 2b, 5a and 8a and the component holding holes 1b2, such misalignment may be remedied by inserting the positioning rods 11 into the positioning holes 1a3, thus allowing the respective pressure pins 2b, 5a and 8a to be inserted into the component holding holes 1b2 in such a manner that the position adjustment may accurately carried out. Of course, in the case where positioning holes are formed at the side of the pin supporting member, and positioning rods corresponding to the positioning holes are formed at the side of the belt body, the same position adjustment as above can be realized.

Figure 17:
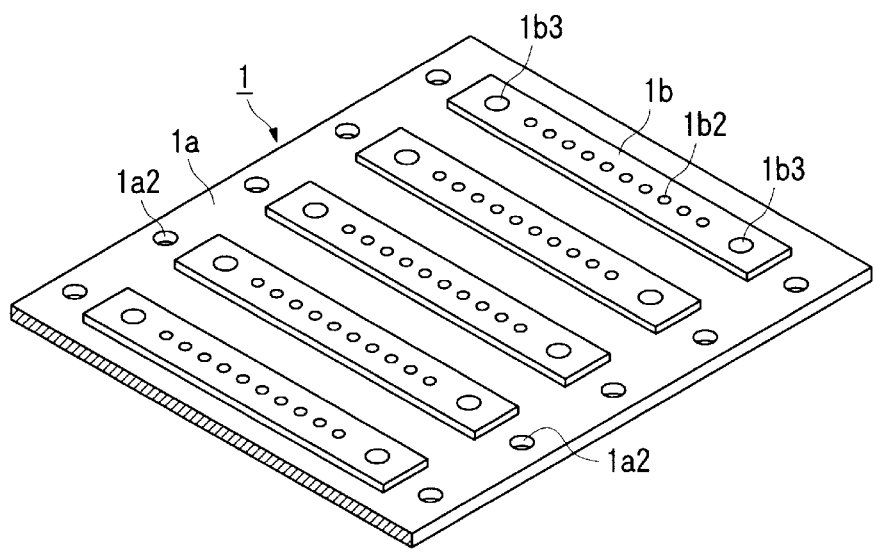
FIG. 17 is a partial perspective view of a component conveyer belt in accordance with a second example of the method of position-adjusting the pressure pins and the component holding holes.
Figure 18:
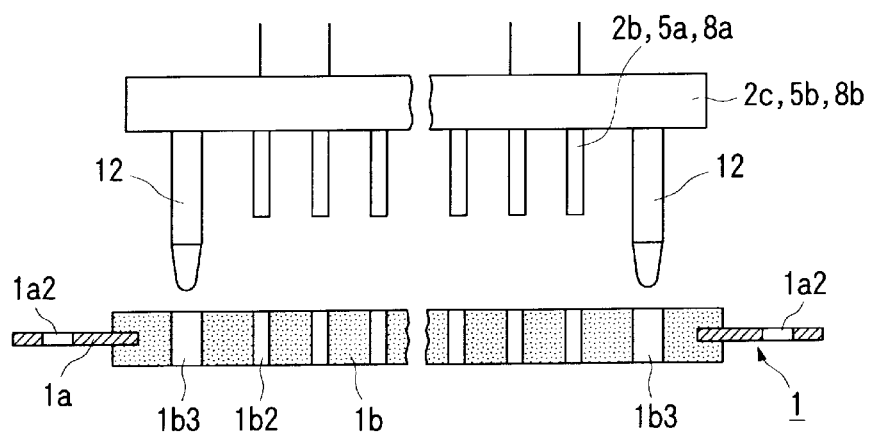
FIG. 18 is a diagram showing a position relation between pin supporting members and the component conveyer belt in accordance with the second example of the method of position-adjusting the pressure pins and the component holding holes.
Figure 19:
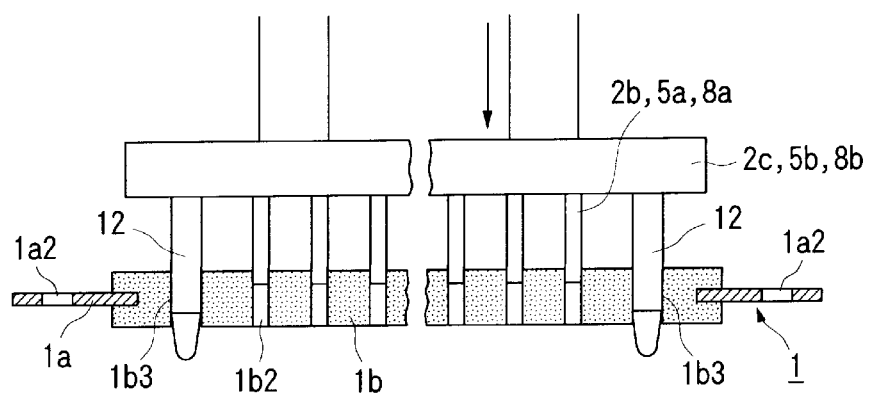
FIG. 19 is an explanatory diagram of an operation in accordance with the second example of the method of position-adjusting the pressure pins and the component holding holes.

FIGS. 17 to 19 show a second example of the position adjustment method. As seen from FIG. 17, positioning holes 1b3 into which positioning rods 12 which will be described later are inserted are formed on a resilient body 1b of a component conveyer belt 1 so that the positioning holes 1b3 may be located at the both sides of each of component holding holes 1b2. The center of the positioning holes 1b3 is aligned with the arrangement center of the component holding holes 1b2.

Referring now to FIG. 18, the positioning rod 12 having a sharp tip portion to correspond to the positioning hole 1a3 are formed on the pin supporting member 2c, 5b and 8b for supporting pressure pins 2b, 5a and 8a respectively. The interval of the positioning rods 12 is mated with the interval widthwise of the belt between the positioning holes 1a3. The center of each positioning rod 12 is aligned with the arrangement center of the respective pressure pins 2b, 5a and 8a, and each positioning rod 11 has longer length than the respective pressure pins 2b, 5a and 8a.

Referring now to FIG. 19, when the respective pin supporting members 2c, 5b and 8b are driven in the state where the component conveyer belt 1 is stopped, the positioning rods 12 are initially inserted into the positioning holes 1a3 on the resilient bodies 1b, and thereafter the respective pressure pins 2b, 5a and 8a are inserted into the component holding holes 1b2. Accordingly, even when there exists slight misalignment in its position between the respective pressure pins 2b, 5a and 8a and the component holding holes 1b2, such misalignment may be remedied by inserting the positioning rods 12 into the positioning holes 1a3, thus allowing the respective pressure pins 2b, 5a and 8a to be inserted into the component holding holes 1b2 in such a manner that the position adjustment may accurately carried out. Of course, in the case where positioning holes are formed at the side of the pin supporting member, and positioning rods corresponding to the positioning holes are formed at the side of the belt body, the same position adjustment as above can be realized.

Figure 20:
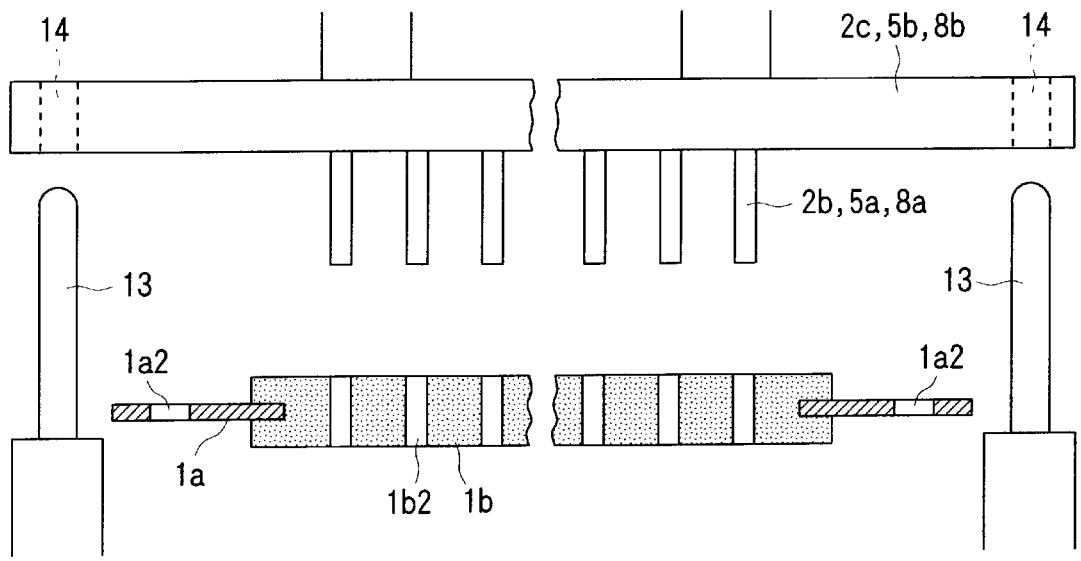
FIG. 20 is a diagram showing a position relation between pin supporting members and component conveyer belt in accordance with a third example of the method of position-adjusting the pressure pins and the component holding holes.
Figure 21:
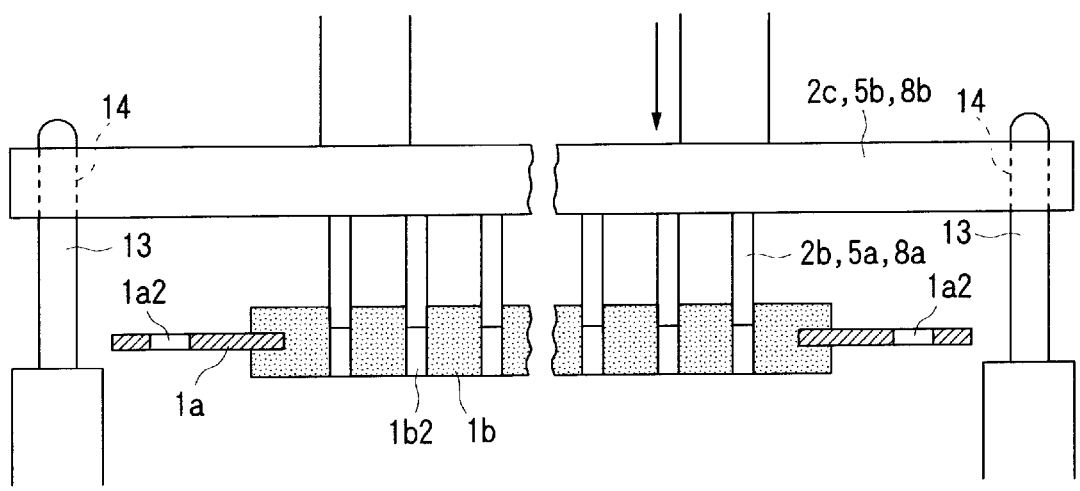
FIG. 21 is an explanatory diagram of an operation in accordance with the third example of the method of position-adjusting the pressure pins and the component holding holes.

FIGS. 20 and 21 show a third example of the position adjustment method. As seen from FIG. 20, positioning rods 13 having a sharp tip are disposed at widthwise outside of a component conveyer belt 1 in a non-contact state to the component conveyer belt 1. Each positioning rod 13 has longer length than the respective pressure pins 2b, 5a and 8a.

Referring now to FIG. 20, positioning holes 14 corresponding to the positioning rods 13 are formed at the both ends in the width direction of the belt of the pin supporting members 2c, 5b and 8b respectively. The interval of the positioning holes 14 is mated with the interval of the positioning rods 13, and the center of each positioning hole 14 is aligned with the arrangement center of the respective pressure pins 2b, 5b and 8b.

Referring now to FIG. 21, when the respective pin supporting members 2c, 5b and 8b are driven in the state where the component conveyer belt 1 is stopped, the positioning rods 13 are initially inserted into the positioning holes 14 of the respective pin supporting members 2c, 5b and 8b, and thereafter the respective pressure pins 2b, 5a and 8a are inserted into the component holding holes 1b2. Accordingly, even when there exists slight misalignment in its position between the respective pressure pins 2b, 5a and 8a and the component holding holes 1b2, such misalignment may be remedied by inserting the positioning rods 13 into the positioning holes 14, thus allowing the respective pressure pins 2b, 5a and 8a to be inserted into the component holding holes 1b2 in such a manner that the position adjustment may accurately carried out. Of course, in the case where positioning rods are formed at the side of the pin supporting member, and components corresponding to the positioning holes are formed at the widthwise outside of component conveyer belt 1, the same position adjustment as above can be realized.

Figure 22:
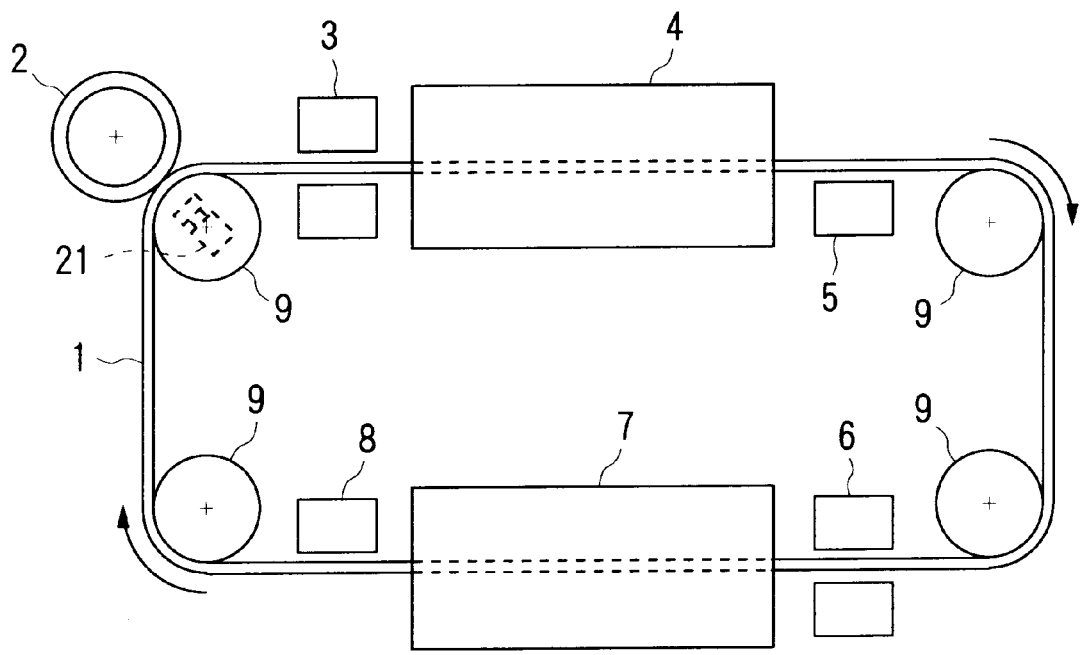
FIG. 22 is a schematic structural view showing a third embodiment of the external electrode forming apparatus according to the present invention.
Figure 23:
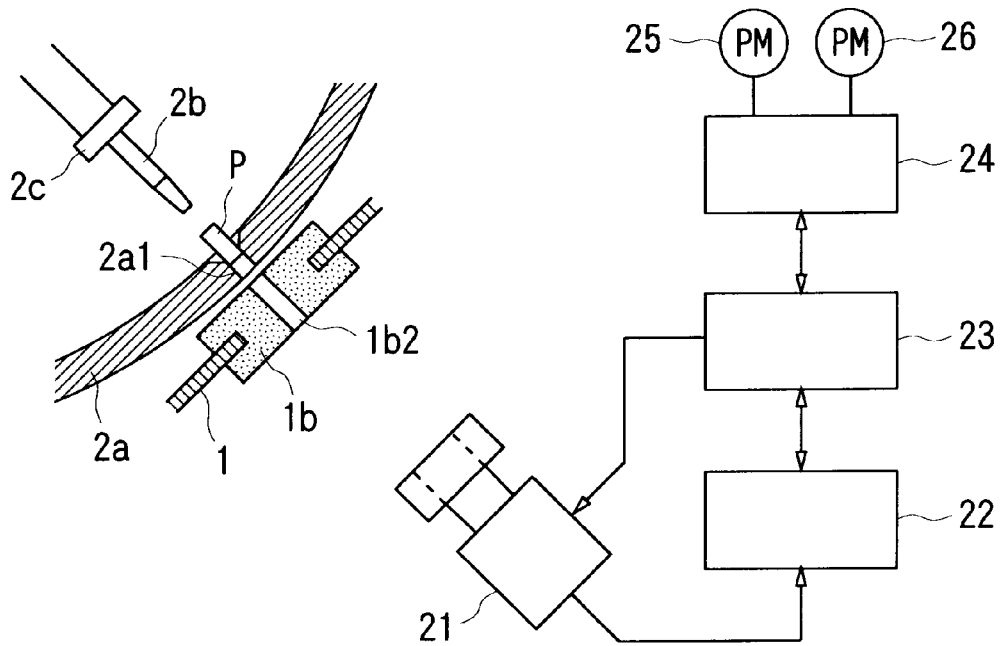
FIG. 23 is a structural view of a position misalignment correction apparatus including a camera shown in FIG. 22.

FIGS. 22 and 23 are diagrams of a third embodiment of the external electrode forming apparatus according to the present invention. Referring to FIG. 22, the following points are different from the aforementioned first embodiment of the present invention: (1) a camera 21 is placed inside of a component insertion position; and (2) the component insertion position is electrically corrected on the basis of the image data from the camera 21. Other arrangements are the same as that of the first embodiment of the present invention, and therefore the identical reference numerals used as well as description will be omitted.

Referring to FIG. 23, the camera 21, which is a monochrome or color camera having imaging element such as two-dimensional CCD, is set to face the lower surface of the resilient body 1b that is stopped at the component insertion position. A position misalignment correction device comprises the camera 21, a memorizing unit 22 for memorizing the imaging data from the camera 21, a controlling unit 23 of a microcomputer composition for detecting relative position misalignment that may be produced between the component conveyer belt 1 and the component-inserting machine 2, based on the imaging data or the like, and for generating signals for correcting the position on the basis of the detected position misalignment, and a driving unit 24 for carrying out the positioning correction by driving in responsive to the correction signals at least one of a pulse i.e., step, motor 25 for feeding the belt and a pulse motor 26 for rotating the drum.

Now, several correction method by image processing feasible in the foregoing external electrode forming apparatus according to the present invention will be in detail described.

Figure 24:
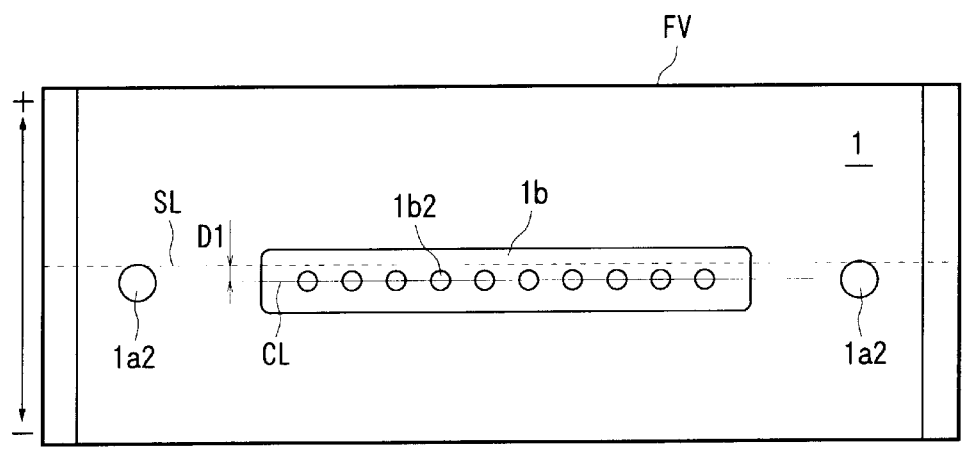
FIG. 24 is a diagram showing a camera image in accordance with a first example of the position misalignment correction method feasible in the position misalignment correction apparatus shown in FIG. 23.

FIG. 24 is a diagram of a first example of a position misalignment correction method. In FIG. 24, reference numeral FV indicates a field of view of the camera 21, SL indicates a reference line preset on the field of view FV, and CL indicates an aligning center line of the component holding holes 1b2.

In the position misalignment correction method according to the first example, the camera 21 photographs the lower surface of the resilient body 1b that is stopped at the component insertion position, and then the position misalignment correction is carried out depending upon the pickup image. Specifically, the component holding hole 1b2 that appears in the field of view FV of the camera 21 is detected, and then the aligning center line CL of the component holding hole 1b2 is positioned. Second, the differential D1 (differential in the direction of the belt feeding) between the aligning center line CL and the reference line SL is obtained. In the case where the differential D1 in the minus direction between the aligning center line CL and the reference line SL as shown in FIG. 24 is detected, the correction signals in responsive to this differential D1 are generated to perform the position correction by feeding the component conveyer belt 1 in the plus direction by the differential D1, and alternatively by rotating the drum 2a to the minus direction by the differential D1. The position correcting operation may cause the component holding hole 1b2 of the resilient body 1b and the insertion guide hole 2a1 of the drum 2a to positively alignably face each other. Therefore, accordingly moving the pressure pins 2b will enable the desired component insertion to be efficiently carried out.

Figure 25:
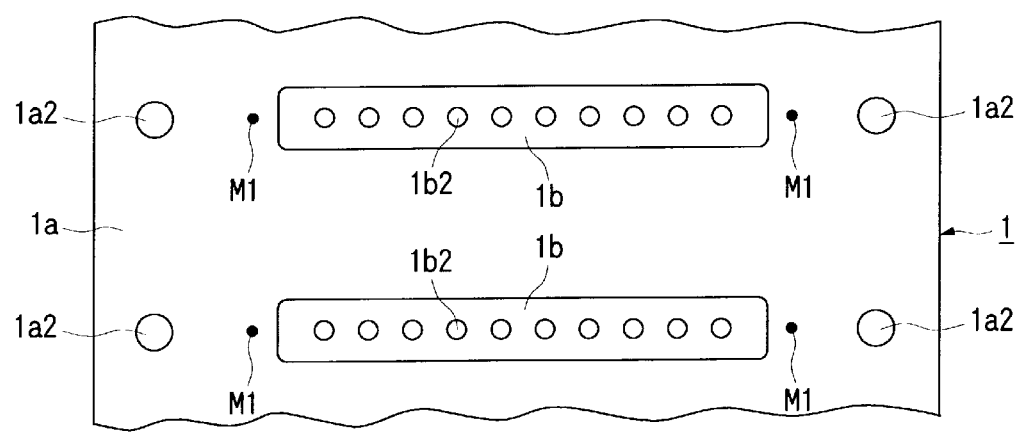
FIG. 25 is a partial lower end view showing a component conveyer belt in accordance with a second example of the position misalignment correction method feasible in the position misalignment correction apparatus shown in FIG. 23.
Figure 26:
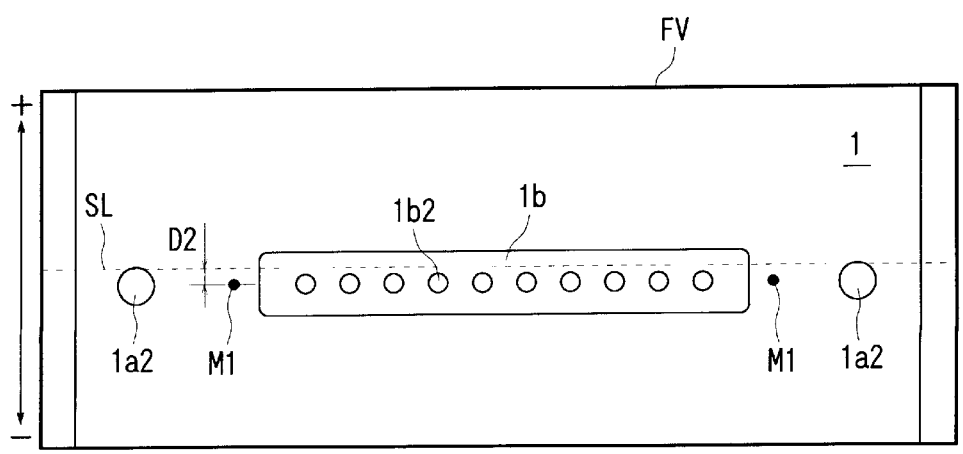
FIG. 26 is a diagram showing a camera image in accordance with the second example of the position misalignment correction method feasible in the position misalignment correction apparatus shown in FIG. 23.

FIGS. 25 and 26 are diagrams of a second example of the position misalignment correction method. In the figures, reference numeral FV indicates a field of view of the camera 21, SL indicates a reference line preset on the field of view FV, and M1 denotes a mark that is formed on the lower surface of the belt body 1a so as to correspond to the respective resilient bodies 1b. The mark M1 is a point, and the center thereof is positioned on the aligning center line of the component holding holes 1b2. Of course, the mark M1 may be other than of a point, and may be also formed on the lower surface of the respective resilient bodies 1b. One mark M1 is usually sufficient.

In the position misalignment correction method according to the second example of the present invention, the camera 21 photographs the lower surface of the resilient body 1b that is stopped at the component insertion position, and then the position misalignment correction is carried out depending upon the pickup image. Specifically, the position of the mark M1 that appears in the field of view FV of the camera 21 is primarily detected. Second, the differential D2 (differential in the direction of the belt feeding) between the center of at least one mark M1 and the reference line SL is obtained. Of course, an average value of the differentials between the center of two marks M1 and the reference line may be rendered the above-mentioned differential D2. In the case where the differential D2 in the minus direction between the center of the mark M1 and the reference line SL as shown in FIG. 26, the correction signals in responsive to this differential D2 are generated to perform the position correction by feeding the component conveyer belt 1 in the plus direction by the differential D2, and alternatively by rotating the drum 2a to the minus direction by the differential D2. The position correcting operation may cause the component holding hole 1b2 of the resilient body 1b and the insertion guide hole 2a1 of the drum 2a to positively alignably face each other. Therefore, accordingly moving the pressure pins 2b will enable the desired component insertion to be efficiently carried out.

Figure 27:
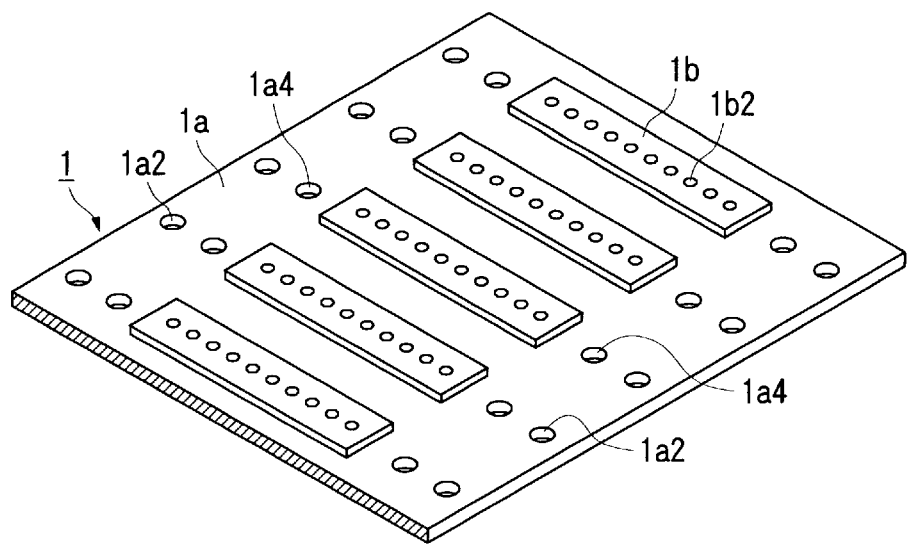
FIG. 27 is a partial perspective view showing a component conveyer belt in accordance with a third example of the position misalignment correction method feasible in the position misalignment correction apparatus shown in FIG. 23.
Figure 28:
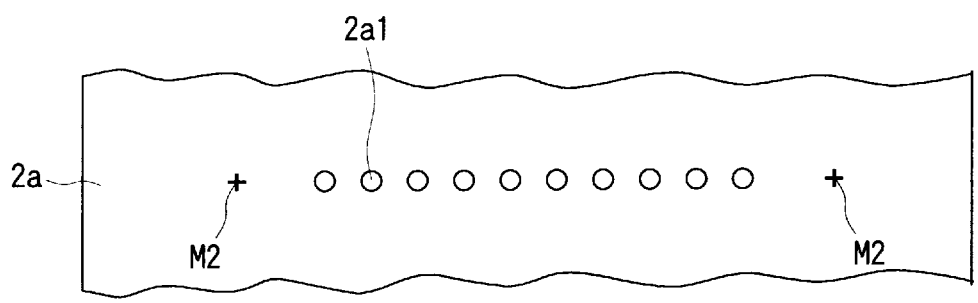
FIG. 28 is a partial front view showing a drum in accordance with the third example of the position misalignment correction method feasible in the position misalignment correction apparatus shown in FIG. 23.
Figure 29:
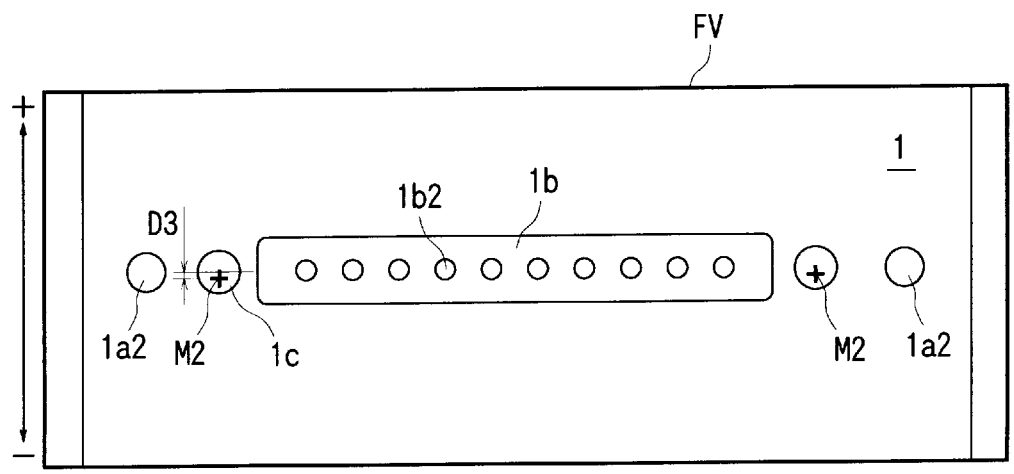
FIG. 29 is a diagram showing a camera image in accordance with the third example of the position misalignment correction method feasible in the position misalignment correction apparatus shown in FIG. 23.

FIGS. 27 to 29 are diagram of a third example of the position misalignment correction method. In the figures, reference numeral FV indicates a field of view of the camera 21, M2 denotes a mark that is formed on the outer circumferential surface of the drum 2a so as to correspond to each row of the insertion guide holes 2a1 of the drum 2a, 1a4 denotes a mark exposing hole for exposing the mark M2. The mark exposing hole 1a4 is of a circle, and the center thereof is positioned on the aligning center line of the component holding holes 1b2. The mark M2 is of a "+" shape, and the center line thereof is positioned on the aligning center line of the insertion guide holes 2a1. Of course, the mark M2 may be other than of a "+" shape. At least one mark M2 and at least one mark exposing hole 1a4 may be sufficient.

In the position misalignment correction method according to the third example, the camera 21 photographs the lower surface of the resilient body 1b that is stopped at the component insertion position, and then the position misalignment correction is carried out depending upon the pickup image. Specifically, the positions of the mark M2 and a mark exposing hole 1c that appear in the field of view FV of the camera 21 are primarily detected. Second, the differential D3 (differential in the direction of the belt feeding) between the center of at least one mark M2 and the center of at least one mark exposing hole 1c is obtained. Of course, an average value of the differentials between the respective marks M2 and the respective mark exposing holes 1c may be rendered the above-mentioned differential D3. In the case where the differential D3 in the minus direction between the center of the mark M2 and the center of the mark exposing hole 1c as shown in FIG. 29, the correction signals in responsive to this differential D3 are generated to perform the position correction by feeding the component conveyer belt 1 in the minus direction by the differential D3, and alternatively by rotating the drum 2a to the plus direction by the differential D3. The position correcting operation may cause the component holding hole 1b2 of the resilient body 1b and the insertion guide hole 2a1 of the drum 2a to positively alignably face each other. Therefore, accordingly moving the pressure pins 2b will enable the desired component insertion to be efficiently carried out.

As is clear from above, in the apparatus according to the third embodiment of the present invention, when the resilient body 1b of the component conveyer belt 1 is stopped at the component insertion position, the relative position misalignment that may be produced between the component conveyer belt 1 and the component-inserting machine 2 is detected by utilizing the image processing technique, and the position of at least one of the component conveyer belt 1 and the component-inserting machine 3 can be corrected on the basis of the detected position misalignment before the component chips P are forced into the component holding hole 1b2 by the component-inserting machine 2.

That is, even if the relative position misalignment is produced between the component conveyer belt 1 and the component-inserting machine 3 when the resilient body 2 is stopped at the component insertion position, positive position adjustment of the component holding hole 1b2 of the resilient body 1b and the insertion guide hole 2a1 of the drum 2a can be carried out, and thereafter the component chips P may be forced into the component holding hole 1b2.

Accordingly, such inconvenience can be positively prevented that the aforementioned position misalignment will cause the component chips P to impinge upon the opening edge of the component holding hole 1b2 and then be prevented from being inserted into the component holding hole 1b2, and that the component holding hole 1b2 suffers from damage because the component chips P are forcibly inserted into the component holding hole 1b2. For this reason, while establishment and precision of the chip insertion into the component holding hole 1b2 are enhanced, the production efficiency of the apparatus per se may be increased. Further, damage affecting the component holding hole 1b2 may be reduced, to thereby diminish the cost loading for the belt exchanging.

Figure 30:
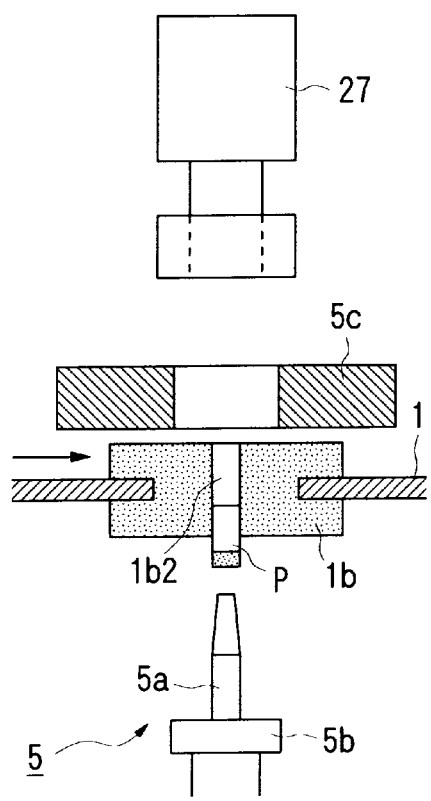
FIG. 30 is a structural view showing an application example of the position misalignment correction method to the component-reversing machine.
Figure 31:
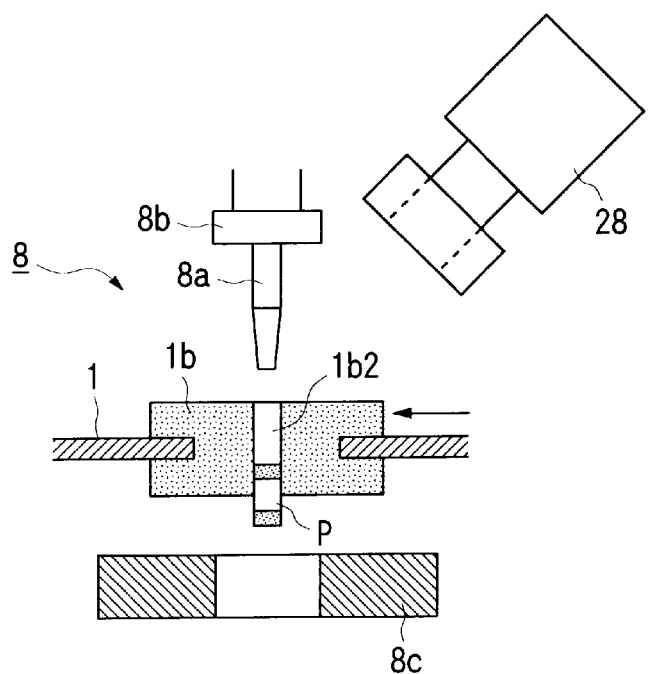
FIG. 31 is a structural view showing an application example of the position misalignment correction method to the component-discharging machine.

According to the aforementioned third embodiment of the present invention, the position misalignment that is produced between the component conveyer belt 1 and the component-inserting machine 2 is corrected at the component insertion position prior to the component insertion. As shown in FIG. 30, a camera 27 that is the same as the camera 21 is set above the position where the component is fed inversely, and the position misalignment that is produced between the component conveyer belt 1 and the component-reversing machine 5 may be corrected at the component inverse position using the same method as above. To this end, such inconvenience will be obviated that the pressure pin 5a of the component-reversing machine 5 is slipped off from the component chip P due to the position misalignment, and thus the expected component inverse may not be carried out. Referring now to FIG. 31, a camera 28 that is the same as the camera 21 is set obliquely above the position where the component is discharged, and the position misalignment that is produced between the component conveyer belt 1 and the component-discharging machine 8 may be corrected at the component discharging position using the same method as above. To this end, such inconvenience will be obviated that the pressure pin 8a of the component-discharging machine 8 impinges upon the opening edge of the component holding hole 1b2 due to the position misalignment, and thus the expected component discharging may not be carried out.

Description will be made of other arrangement examples of the component-inserting machine applicable to the apparatus according to the first to third embodiments of the present invention.

Figure 32:
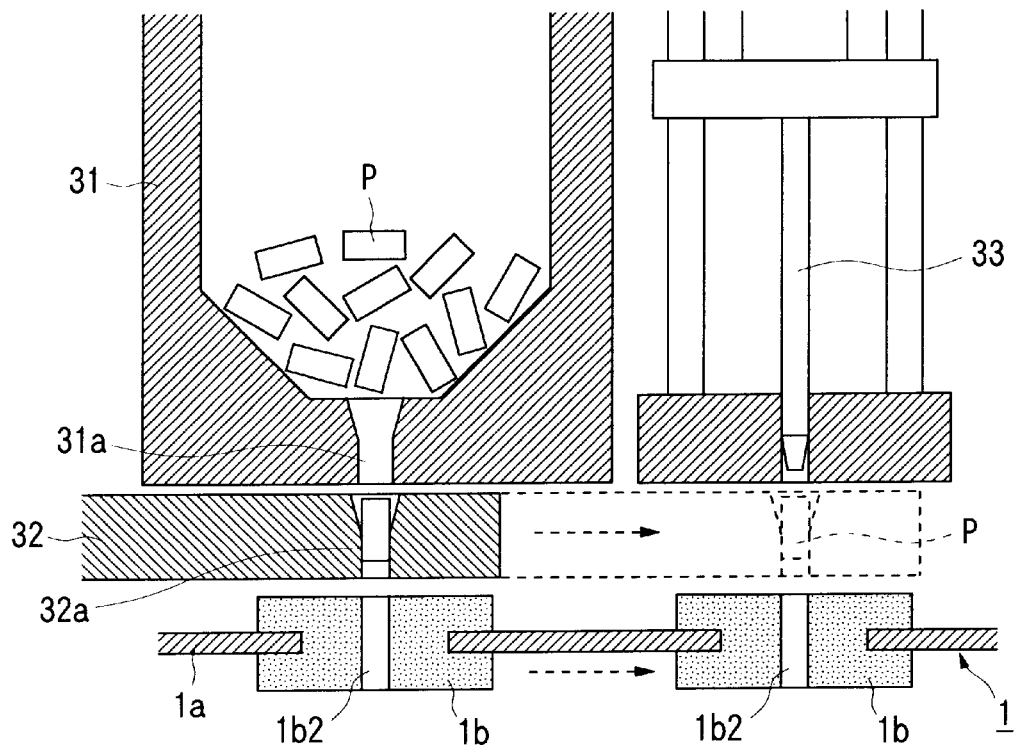
FIG. 32 is a structural view showing a first example of the component-inserting machine applicable to the apparatus according to the first to third embodiments of the present invention.
Figure 33:
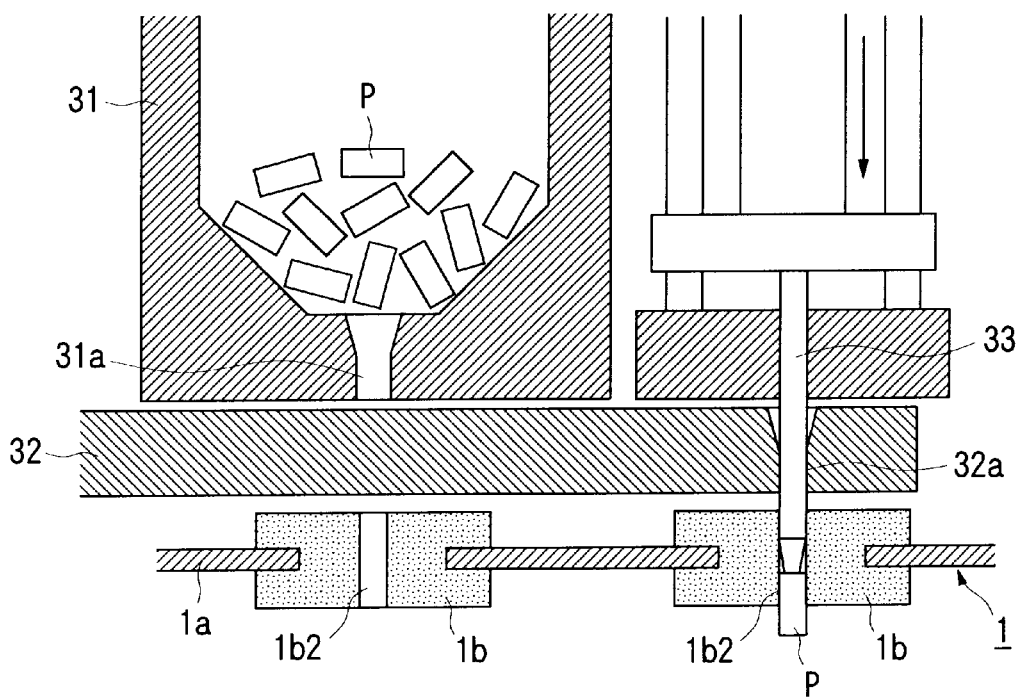
FIG. 33 is an explanatory diagram of an operation of the component-inserting machine shown in FIG. 32.

FIGS. 32 and 33 show a first example of the component-inserting machine. In Figures, reference numeral 31 denotes a component reservoir container, 32 denotes a guide plate, and 33 denotes a pressure pin for the component insertion.

A number of the component chips P are stored in a bulky manner within the component reservoir container 31. A plurality of through holes 31a having a circular shape in lateral section are penetratingly formed on the bottom surface of the component reservoir container 31 so as to be parallel to the component holding hole 1b2 of the resilient body 1b at equal intervals. The number of the through holes 31a and the arrangement thereof coincide with the number of the component holding holes 1b2 and the arrangement thereof. Further, the diameter of the through holes 31a is made slightly larger than the diameter Rp or the end maximum length Dp of the component chip P, so that the reserved components P are dropped downward under gravity at a predetermined orientation within the through hole 31a.

The guide plate 32 is placed movably in the horizontal direction in the figures beneath the component reservoir container 31. A plurality of insertion guiding holes 32a having a circular shape in lateral section are penetratingly formed on the bottom surface of the guide plate 32 so as to be parallel to the component holding hole 1b2 of the resilient body 1b at equal intervals. The number of the insertion guiding holes 32a and the arrangement thereof coincide with the number of the component holding holes 1b2 and the arrangement thereof. Further, the diameter of the insertion guiding holes 32a is corresponded approximately with the diameter Rp or the end maximum length Dp of the component chip P, so that the component chips P from the component reservoir container 31 enter into the insertion guiding hole 32a at a certain orientation to be held.

The pressure pins 33 are placed movably in the vertical direction in the figures beside the component reservoir container 31. The number of the pressure pins 33 and the arrangement thereof coincide with the number of the component holding holes 1b2 and the arrangement thereof. Further, the diameter of the pressure pin 33 is made slightly smaller than that of the insertion guiding hole 32a.

Referring now to FIG. 32, if vibration is imparted to the component reservoir container 31 in the state where the insertion guiding hole 32a of the guide plate 32 is placed straight beneath the through hole 32a of the component reservoir container 31, the component chips P accommodated in the component reservoir container 31 enter into the insertion guiding hole 32a through the through hole 31a to be held.

Thereafter, as shown in FIG. 33, when the guide plate 32 is fed to the component insertion position, and then the pressure pins 33 are dropped downward, the component chips P that are held within the insertion guiding boles 32a are forcibly pressed by the pressure pin 33 to be forced into the component holding holes 1b2 of the resilient body 1b from the insertion guiding holes 32a. This forcing-into operation may cause the lower end portion of the component chips P to project from the lower surface of the resilient body 1b, and then the component chips P are held resiliently in the projecting state.

The component-inserting machine is located on the area that the component conveyer belt 1 may advance in a planar state, for example, in FIG. 1, at the right side of a pulley 10 positioned at upper left. The pin 33 is moved in the direction perpendicular to the surface of the component conveyer belt 1. Even when such a component-inserting machine is employed, if a camera is placed beneath the position where the component is inserted, the same position misalignment correction as that of the third embodiment of the present invention may be performed to conduct efficiently the component insertion.

FIGS. 34 to 38 show a second example of the component-inserting machine. In the figures, reference numeral 41 denotes a component-inserting head, 42 denotes a fixed component housing container, 43 denotes a camera for recognizing the holding hole, and 44 denotes a belt supporting base.

Figure 35:
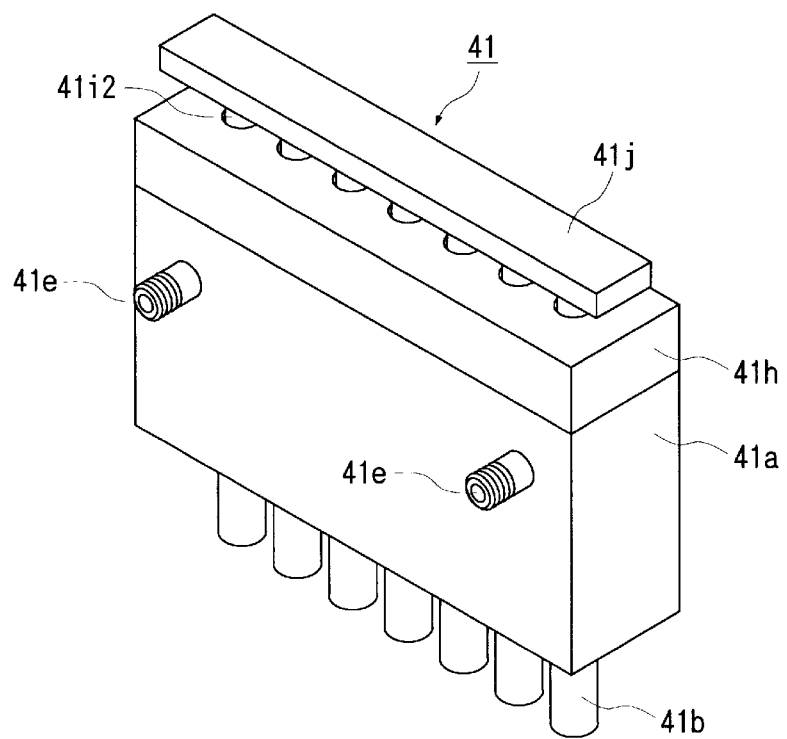
FIG. 35 is a perspective view of a component-inserting head shown in FIG. 34.
Figure 36:
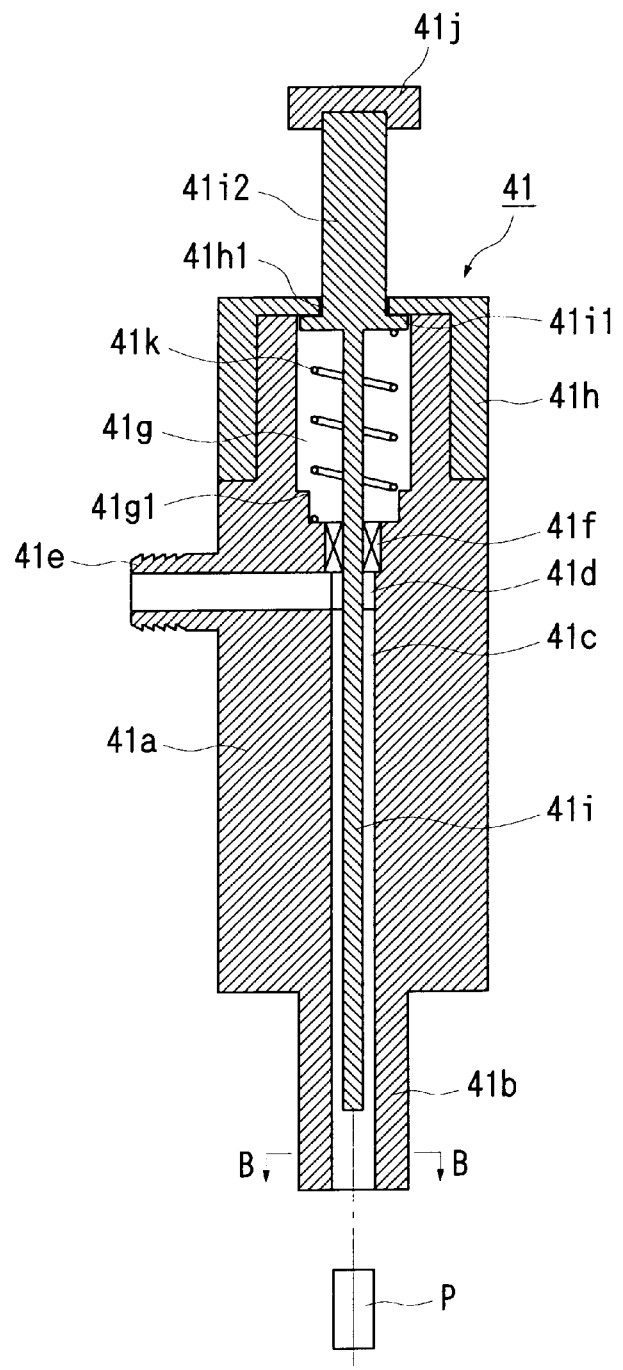
FIG. 36(A) is a longitudinal sectional view of the component-inserting head shown in FIG. 341
FIG. 36(B) is a cross-sectional view taken along the line B—B of the component-inserting head shown in FIG. 34.
Figure 36:
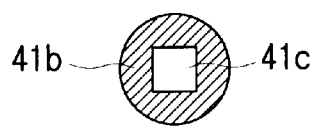
Figure 37:
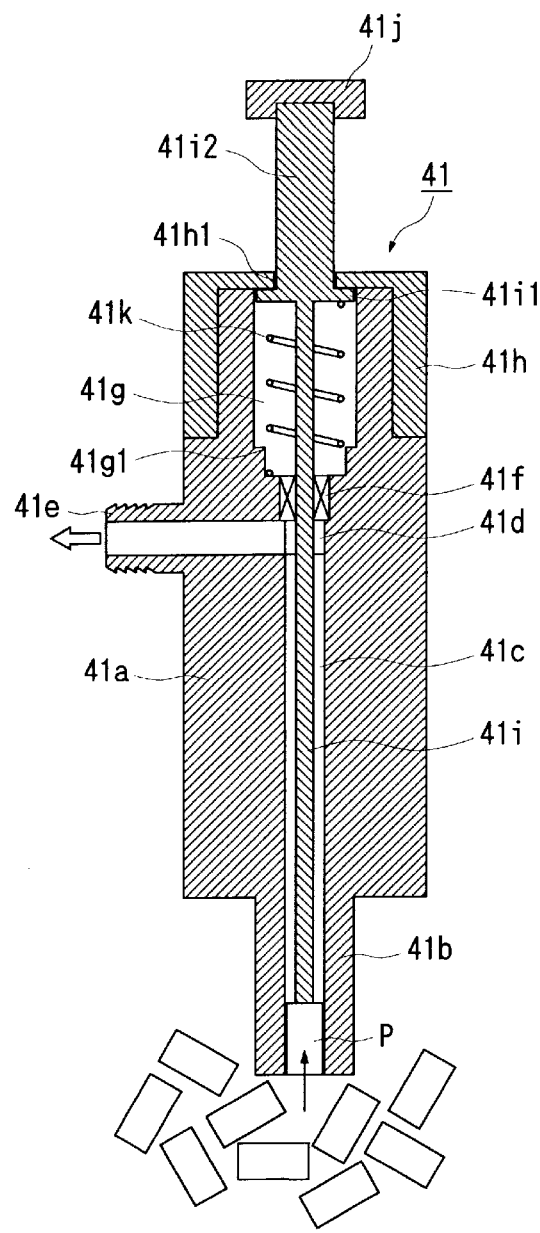
FIGS. 37(A) and 37(B) are explanatory diagrams of an operation of the component-inserting machine shown in FIG. 34.
Figure 37:
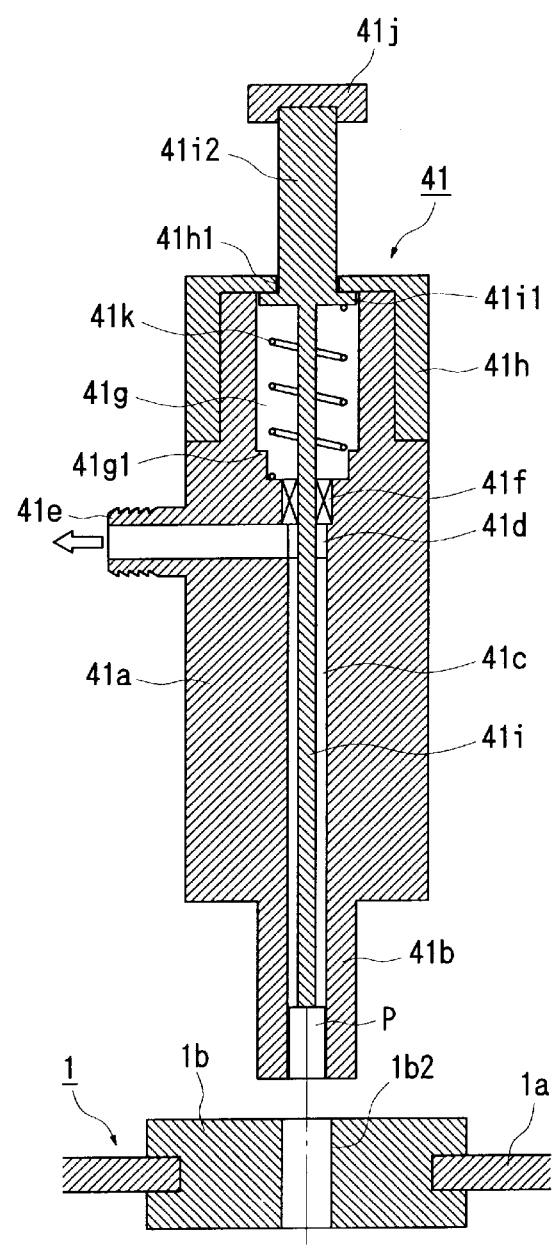
Figure 38:
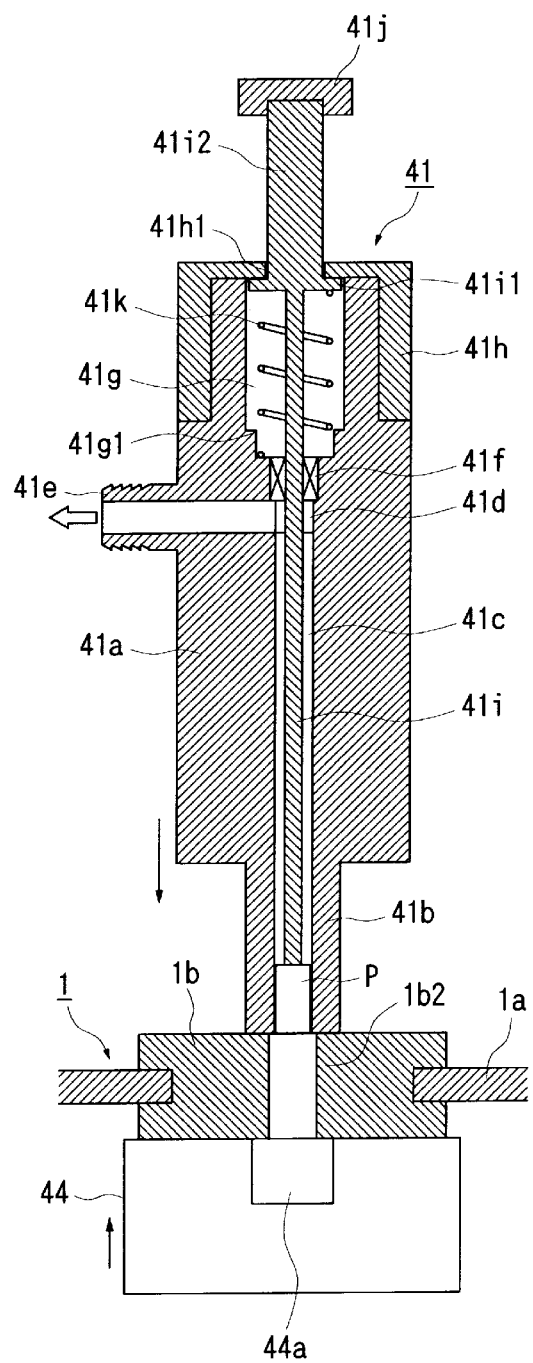
FIGS. 38(A) and 38(B) are explanatory diagrams of the operation of the component-inserting machine shown in FIG. 34.
Figure 38:
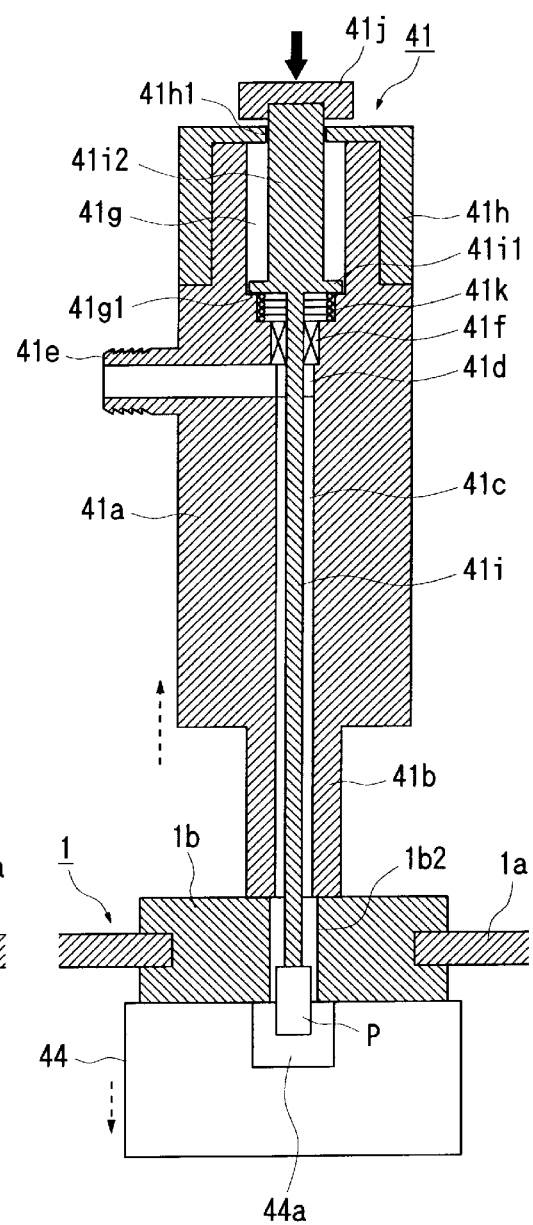

Referring now to FIGS. 35, 36(A) and 36(B), the component-inserting head 41 comprises a head body 41a; a plurality of nozzles 41b formed at the lower surface of the head body 41a at equal intervals; suction passages 41c formed at the center of the respective nozzles 41b to extend inside of the head body 41a; a lateral passage 41d in communication with the upper end of the suction passages 41c; two inlet-ports 41e in communication with the lateral passage 41d; a plurality of seal members 41f formed at the upper wall of the lateral passages 41d so as to match with the arrangement of the suction passages 41c; open-ended spring chambers 41g formed above the lateral passage 41d; a cover member 41h mounted to the upper portion of the head body 41a; a plurality of pins 41i passing through the seal members 41f to be inserted into the respective suction passages 41c; an operation member 41j coupled to the upper end of the respective pins 41i; and a plurality of coil springs 41k energizing the respective pins 41i in the upper direction.

The number of the plurality of the nozzles 41b and the arrangement thereof coincide with the number of the component holding holes 1b2 formed in the component conveyer belt 1 and the arrangement thereof. The lateral section of each suction passage 41c is of rectangular or of circular. The component chips P that is the subject to be inserted can be captured in the suction passage 41c in a longitudinal direction. The lateral section of each pin 41i is of circular or rectangular. There exists a clearance for passing air between the pin 41i and the suction passage 41c. A collar 41i1 and large diameter portion 41i2 are integrally formed at the top portion of each pin 41i. The large diameter portion 41i2 extends upward so as to pass through an top opening portion 41h1 of the cover member 41h, and the collar 41i1 abuts against the lower surface of the top opening portion 41h1. The operation member 41j is coupled to distally extending end of the large diameter portion 41i2, and can move the entire pin 41i downward simultaneously. While the collar 41i1 abuts the lower surface of the top opening portion 41h1, differential between the position of the lower end of each pin 41i and the lower end of each suction passage 41c coincides substantially matches with the length dimension of the component chip P that is the subject to be inserted. Further, a vacuum pump (not shown) is connected to each inlet-port 41e through a tube, and negative pressure necessary for capturing the component chips P acts on the suction passage 41c depending upon necessity.

Figure 41:
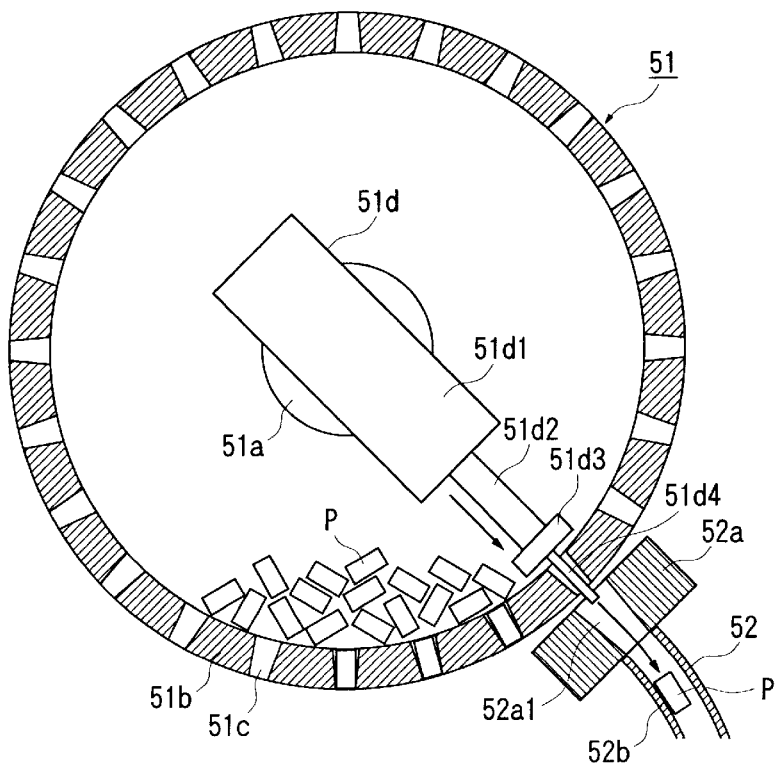
FIG. 41 is an explanatory diagram of an operation of the component-housing drum shown in FIG. 39.
Figure 42:
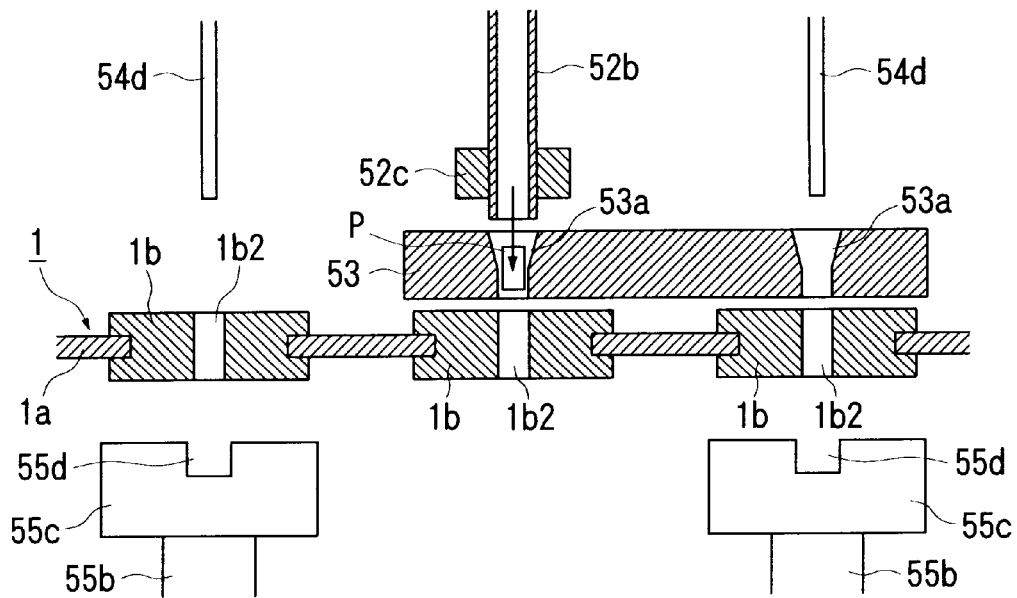
FIG. 42 is an explanatory diagram of an operation of the component-inserting machine shown in FIG. 39.

Incidentally, as shown in FIG. 41, a driving mechanism having two degree of freedom (not shown) makes it possible to feed the component-inserting head 41 both vertically and horizontally. Of course, the driving mechanism may be of three degree of freedom or larger. Further, the component-inserting head 41 has seven nozzles 41b, but the number of the nozzles 41b may suitably be increased or decreased depending upon the number of the component holding holes 1b2 formed in the resilient body 1b of the component conveyer belt 1.

The camera 43 serves to recognize from the down side the positions of the holding holes 1b2 in the resilient body 1b of the component conveyer belt 1 that stops at the component insertion prior position. The camera 43 has a lighting utensil 43a integral therewith. In the case where there exists misalignment at the holding hole position of the component conveyer belt 1 in a stopping state, the degree of the misalignment that is detected through the camera 43 is fed back to the driving mechanism for the component-inserting head 41 or a rotation driving source for the component conveyer belt 1, to carry out the position correcting operation accordingly. The camera 43 incorporates a two dimensional CCD therein, and connects to a control device or the like (see FIG. 23) for detecting the degree of the misalignment based on the image data to send the correction signals. Of course, the camera 43 may be placed downcast above the resilient body 1b that stops at the component insertion position so that the camera 43 may recognize from the above side the holding hole position of the resilient body 1b that stops at the component insertion position. In this case, the camera 43 is arranged so as to be capable of moving rightward or leftward in FIG. 34. Further, such an arrangement is made that when component-inserting head 41 moves rightward in FIG. 34, i.e., when the component-inserting head 41 moves to the upper position of the resilient body 1*b* that stops at the component insertion position, a roundabout from the same position may be possible.

Figure 34:
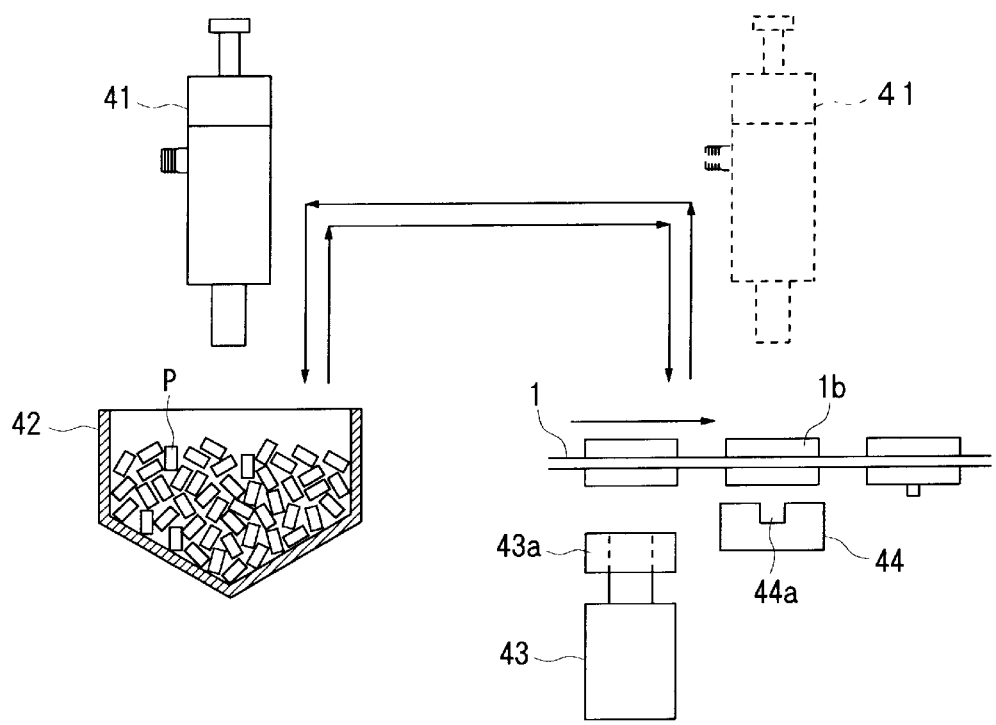
FIG. 34 is a structural view showing a second example of the component-inserting machine applicable to the apparatus according to the first to third embodiments of the present invention.

The belt supporting base 44 serves to support the lower surface of the resilient body 1*b* that stops at the component insertion position, and moves upward or downward in FIG. 34 by a rectilinear driving source such as a cylinder (not shown). A recess 44*a* is formed so as to correspond to each component holding hole 1*b*2 of the resilient body 1*b*.

When the component chip P is inserted into the component holding hole 1*b*2 of component conveyer belt 1, the component-inserting head 41 is initially stopped above the component housing container 42, and the component-inserting head 41 is moved downward to make the nozzle 41*b* enter into the component housing container 42 while negative pressure acts on each suction passage 41*c*. Accordingly, as shown in FIG. 37(A), the component chips P stored within the component housing container 42 are sucked longitudinally into the suction passage 41*c* from the lower opening of each suction passage 41*c*. Each component chip P that is sucked into each suction passage 41*c* stops at the position where the upper end of the component chip P abutting against the lower end of the pin 41*i*.

Then, the component-inserting head 41 is recovered to rise from the descended position, and the head 41 is moved to the position above the resilient body 1*b* that stops at the component insertion position to stop. Referring to FIG. 37(B), while the head 41 is stopped, the center line of each suction passage 41*c* and the center line of each component holding hole 1*b*2 are aligned longitudinally. As described previously, in the case where there exists misalignment at the position insertion prior position or the holding hole position of the resilient body 1*b* that stops at the component insertion position, the degree of misalignment that is detected through the camera 43 is fed back to the driving mechanism for the component-inserting head 41 or the rotation driving source for the component conveyer belt 1 to carry out the position correcting operation. Therefore, there is no fear that the center line of each suction passage 41*c* and the center line of each component holding hole 1*b*2 should not be matched with each other at the component insertion position.

Then, the component-inserting head 41 is moved downward from the ascended position, and the belt supporting base 44 rises from the descended position concurrently therewith. As a result, as shown in FIG. 38(A), the lower end of each nozzle 41*b* of the component-inserting head 41 abuts against the upper surface of the resilient body 1*b*, and also the upper surface of the belt supporting base 44 abuts against the lower surface of the resilient body 1*b*. In other words, the resilient body 1*b* that is stopped at the component insertion position is held between each nozzle 41*b* and the belt supporting base 44.

Then, the operation member 41*j* of the component-inserting head 41 is forcibly pressed downward by a rectilinear driving source such as a cylinder (not shown). As a result, as shown in FIG. 38(B), the component chips P that are captured in the suction passages 41*c* are expelled by the pins 41*i*, and the expelled component chips P are forced into the component holding holes 1*b*2 of the resilient body 1*b*. By way of example illustrated in the figure, since the expelling position of the pin 41*i* is set so that the lower end portion of the component chip P may project beyond the lower surface of the resilient body 1*b*, the projection of the component chip P may be received by the recess 44*a* of the belt supporting base 44 in a non-contact condition.

Then, the component-inserting head 41 is rises from the descended position, and the belt supporting base 44 is dropped from the ascended position concurrently therewith. As a result, the lower end of each nozzle 41*b* of the component-inserting head 41 is free from the upper surface of the resilient body 1*b*, and thus the upper surface of the belt supporting base 44 is free from the lower surface of the resilient body 1*b*.

Then, the component-inserting head 41 is moved to the position above the component housing container and stopped, the component conveyer belt 1 is fed at a certain distance, and a following resilient body 1*b*2 is stopped at the component insertion position. The component insertion into the above belt holes is repeated under the same procedure as above mentioned.

Though the negative pressure may constantly act on each suction passage 41*c* of the component-inserting head 41, the negative pressure may not be always required during the time interval between the time when the lower end of each nozzle 41*b* abuts against the lower surface of the resilient body 1*b* and the time when the component-inserting head 41 again initiates to drop toward the interior of the component housing container 42.

In the foregoing component-inserting machine, the following operation can be realized. The component chips P accommodated within the component housing container 42 are captured into the suction passages 41*c* of the component-inserting head 41 to be reserved, and thereafter the component-inserting head 41 is moved to the component insertion position to carry out the position adjusting operation. Then, the component chips P that are captured into the suction passages 41*c* are extruded by the pins 41*i*, and forced into the component holding holes 1*b*2 formed in the resilient body 1*b* of the component conveyer belt 1 concurrently therewith.

Since the component-inserting head 41 incorporates the pins 41*i* for the component insertion within the suction passages 41*c*, if the inserting head 41 P is stopped at a certain position within the component-inserting head 41, the component insertion into the component holding holes 1*b*2 of the component conveyer belt 1 may be appropriately carried out. Accordingly, the opening edge or the interior of the component holding hole 1*b*2 will not be damaged by the inserted component chips P, so that the reduced time resistant to occurrence of damage can be required. In addition, frequencies of exchanging the belt may be reduced to diminish the cost loading therefor.

Further, since the suction passages 41*c* can be utilized as a guide for inserting the component, slant component chips P that are inserted into the component holding hole 1*b*2 can be prevented from generation to suitably coat the inserted components P with the electrode paste.

Still, since the component chips P is designed to be sucked and captured into the suction passage 41*c* by way of introducing the component-inserting head 41 into the component housing container 42, the component chips P can be captured into the suction passage 41*c* with high possibility, so that error in the capturing operation may be avoided to occur. Additionally, such inconvenience will be positively overcome that the component chips P may not be inserted into the component holding holes 1*b*2.

Furthermore, since it is preferable that the component chips P that are the subject to be inserted may be stored in a bulky manner within the component housing container 42 with the open-ended top surface, works such as component supplement or component exchanging may be facilitated.

FIGS. 39 to 44 are diagrams of a third example of the component-inserting machine. In the figures, reference numeral 51 denotes a rotatable component-housing drum, 52 denotes a plurality of component chute, 53 denotes an auxiliary insertion instrument, 54 denotes two component forcing-into machines located at the both sides of the chute conduit 52, and 55 denotes two belt supporting machines located beneath the component conveyer belt 1 so as to correspond to the respective forcing-into machines 54. Reference numeral 43 denotes a camera for recognizing the holding hole, which has the same arrangement as that shown in FIG. 34, and therefore description thereof will be omitted.

Figure 39:
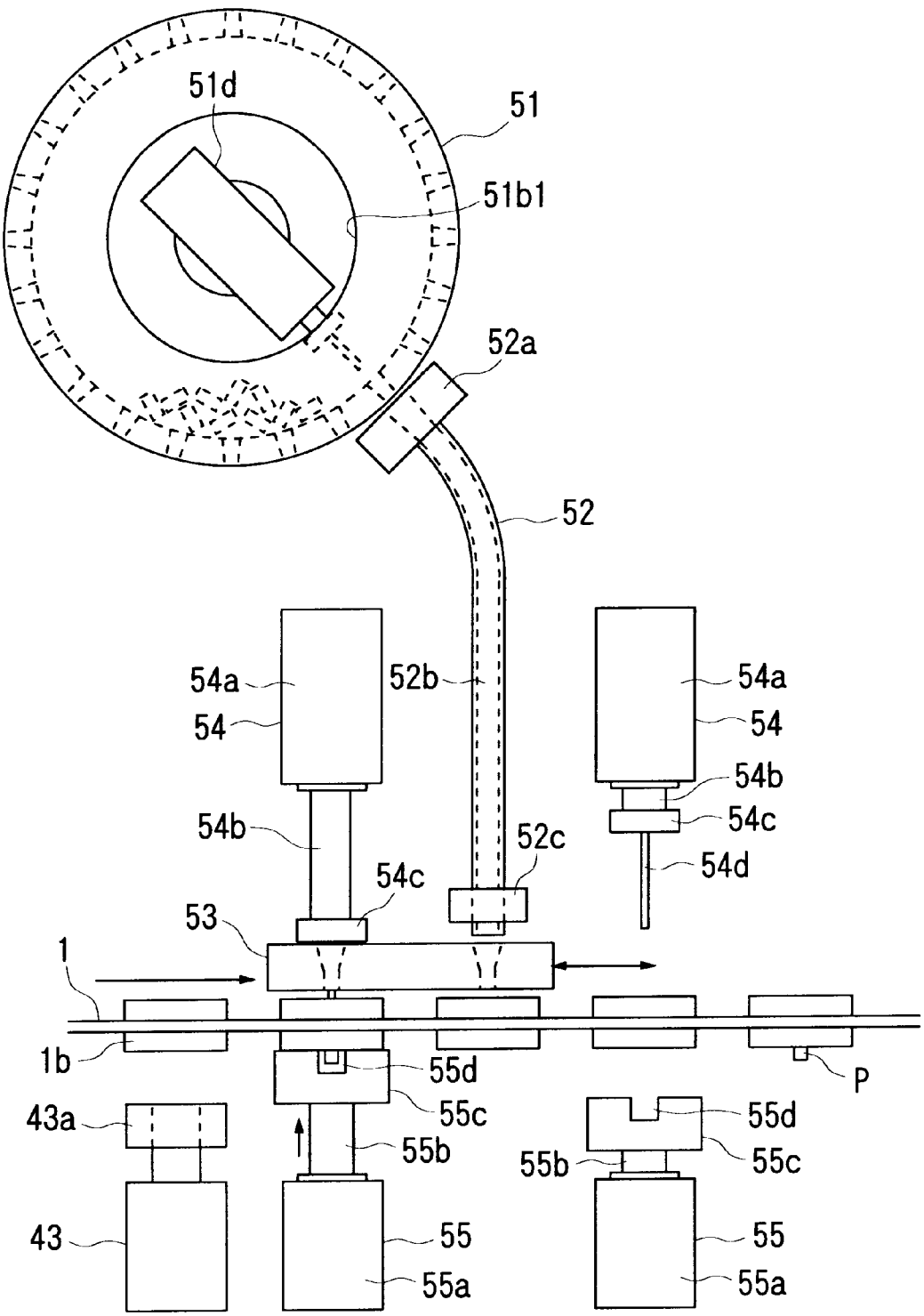
FIG. 39 is a structural view showing a third example of the component-inserting machine applicable to the apparatus according to the first to third embodiments of the present invention.

The component-housing drum 51 has a fixed axis 51*a*; a drum body 51*b* being of a lateral cylinder which is freely rotatably mounted to the fixed axis 51*a*; a row of insertion guide holes 51*c* formed at equal intervals (in the figures, 15° intervals) in the rotating direction about the circumferential surface of the drum body 51*b*; and a component forcing-out machine 51*d* attached to the fixed axis 51*a* sloping rightward and downward as shown in FIG. 39.

The drum body 51*b* has an opening as a component charging aperture 51*b*1 at the center of the surface opposite to the surface that is attached to the fixed axis 51*a*. A number of component chips P that are the subject to be inserted are reserved in a bulky manner within the drum body 51*b*. The number of the insertion guide holes 51*c* per row and the arrangement thereof coincide with the number of component holding holes 1*b*2 formed in the resilient body 1*b* of the component conveyer belt 1 and the arrangement thereof. Each insertion guide hole 51*c* being of circle in the lateral section has a basin-like portion at the top thereof, so that the component chips P that longitudinally enter thereinto from above can be captured and held in the same posture while being introduced at the basin portion. The component forcing-out machine 51*d* is made up of a cylinder 51*d*1, its rod 51*d*2, a plate member 51*d*3 attached to the distal end of the rod 51*d*2, and a plurality of pins 51*d*4 integrally or separately mounted to the supporting plate 51*d*3. The number of the pins 51*d*4 and the arrangement thereof coincide with the number of the component holding holes 1*b*2 formed in the resilient body 1*b* of the component conveyer belt 1 and the arrangement thereof. Incidentally, as shown in FIG. 39, the component-housing drum 51 can be intermittently rotated counterclockwise by a rotation driving source such as a motor (not shown).

Each chute conduit 52 is made up of a capturing member 52*a* located at the component forcing-out position of the component-housing drum 51, a flexible conduit 52*b* coupled to the capturing member 52*a*, and a supporting plate 52*c* for supporting the distal end of the flexible conduit 52*b*. With reference to the upper end of the chute conduit 52, the number of the chute conduits 52 and the arrangement thereof coincides with the number of the insertion guide holes 51*c* of the component-housing drum 51 per row and the arrangement thereof. With respect to the lower end, the number of the chute conduit 52 and the arrangement thereof coincide with the number of insertion guide holes 53*a* of the insertion auxiliary instrument 53 which will be described later and the arrangement thereof.

A basin-like hole 52*a*1 for receiving the component chip P that is extruded of the component-housing drum 51 is formed in the capturing member 52*a*, and the flexible conduit 52*b* is in communication with the hole 52*a*1. The inner opening of the flexible conduit 52*b* is of circle in the lateral section, and the inner diameter thereof is made slightly larger than the end maximum length of the component chip P that is the subject to be inserted. In other words, the component chip P that is extruded of the insertion guide hole 51*c* of the component-housing drum 51 is captured into the flexible conduit 52*b* through the hole 52*a*1, and then is dropped downward under gravity within the flexible conduit 52*b*.

The insertion auxiliary instrument 53 has a metal plate or a resin plate having a slightly larger thickness than the length dimension of the component chip P, and two rows having the number of the insertion guide holes 53*a* and the arrangement thereof that are the same as those of the component holding holes 1*b*2 formed in the resilient body 1*b* of the component conveyer belt 1 are penetratingly formed in such a plate. Each insertion guide hole 53*a* being of circle in the lateral section has a basin-like portion at the top thereof, so that the component chips P that are longitudinally cast thereinto through each chute conduit 52 can be captured and held in the same posture while being introduced at the basin portion. Incidentally, the insertion auxiliary instrument 53 can move in the right or left direction in FIG. 7 by a recilinear driving source such as a cylinder (not shown).

The component forcing-into machine 54 is made up of a cylinder 54*a*, its rod 54*b*, a plate member 54*c* attached to the distal end of the rod 54*b*, and a plurality of pins 54*d* integrally or separately mounted to the supporting plate 54*c*. The number of the pins 54*d* and the arrangement thereof coincide with the number of the insertion guide holes 53*a* and the arrangement thereof.

The belt supporting base 55 is made up of a cylinder 55*a*, its rod 55*b*, a base plate 55*c* attached to the distal end of the rod 55*b*, and a recess 55*d* formed on the top surface of the base plate 55*c* so as to correspond to rows of the component holding holes 1*b*2 in the resilient body 1*b*.

Figure 40:
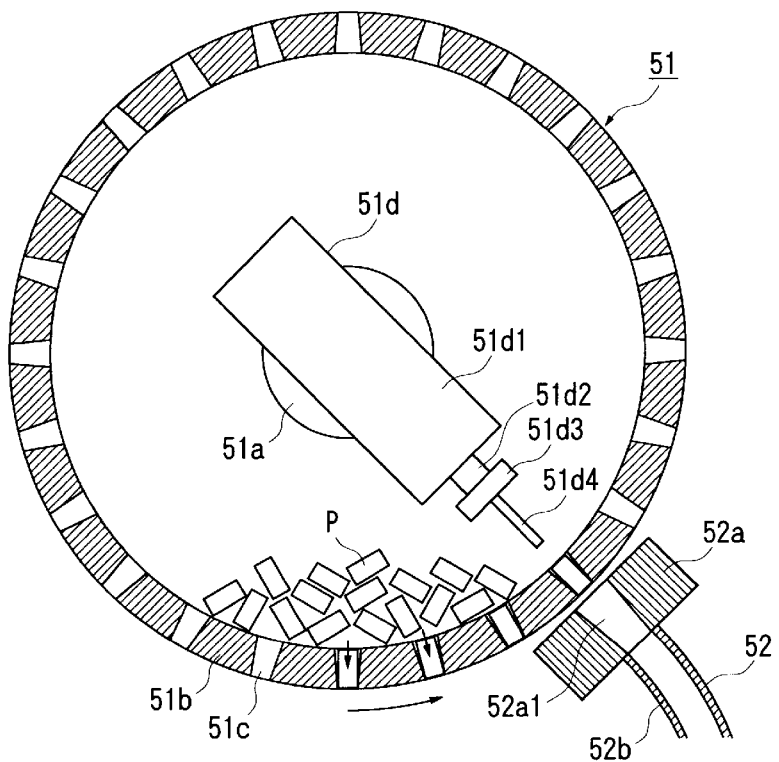
FIG. 40 is a longitudinal sectional view of a component-housing drum shown in FIG. 39.

When the component chip P is inserted into the component holding hole 1*b*2 of the component conveyer belt 1, the component-housing drum 51 is rotated at a given angle, e.g., 15°, and then the component chip P accommodated within the drum 51 is caused to longitudinally enter the insertion guide hole 51*c* to be held. Thereafter, as shown in FIG. 40, one of a row of the insertion guide holes 51*c* within which the component chip P is held is allowed to correspond to a row of the holes 52*a*1 of the capturing member 52*a* of the chute conduit 52.

Referring now to FIG. 41, the rod 51*d*2 of the component forcing-out machine 51*d* is allowed to extend, so that the component chips P that are held within the insertion guide holes 51*c* are extruded by the respective pins 51*d*4. The respective component chips P that are concurrently extruded of the rows of the insertion guide holes 51*c* are captured into the flexible conduit 52*b* through the hole 52*a*1, and then are dropped downward under gravity within the flexible conduit 52*b*. As is clear from FIG. 42, the respective component chips P that have been dropped downward under gravity are cast into one row of the insertion guide holes 53*a* formed in the insertion auxiliary instrument 53 from the lower end of the respective flexible conduits 52*b*, respectively, to be held therein.

Figure 43:
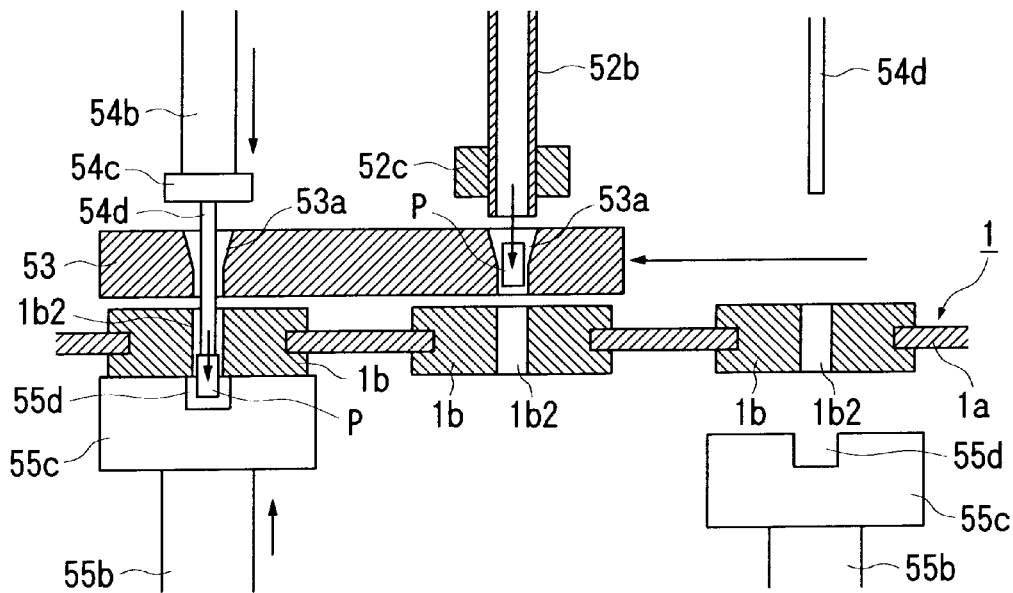
FIG. 43 is an explanatory diagram of the operation of the component-inserting machine shown in FIG. 39.

Referring now to FIG. 43, the insertion auxiliary instrument 53 is allowed to move in the left direction viewing the drawing and stop at the position where the center line of each insertion guide hole 53*a* is vertically aligned with the center line of each component holding hole 1*b*2. As described previously, in the case where there exists misalignment at the position insertion prior position or the holding hole position of the resilient body 1*b* that stops at the component insertion position, the degree of misalignment that is detected through the camera 43 is fed back to the driving mechanism for the insertion auxiliary instrument 53 or the rotation driving source for the component conveyer belt 1 to carry out the position correcting operation. Therefore, there is no fear that the center line of each insertion guide hole 53a and the center line of each component holding hole 1b2 should not be matched with each other at the component insertion position. The rod 55b of the belt supporting machine 55 positioned at the left side viewing the drawing is allowed to extend to support the lower surface of the resilient body 1b by the base plate 55c. Then, the rod 54b of the component forcing-into machine 54 positioned at the left side viewing the drawing is allowed to extend to downward extrude the component chips P that are held within the respective insertion guide holes 53a by the respective pins 54d, and then the component chips P that are extruded is forced into the respective component holding holes 1b2 of the resilient body 1b. By way of example illustrated in the figure, since the dropping position of the pin 54d is set so that the lower end portion of the component chip P may project beyond the lower surface of the resilient body 1b, the projection of the component chip P may be received by the recess 55d of the belt supporting base 55c in a non-contact condition.

In the component inserting process, the component-housing drum 51 is allowed to rotate at a given angle. The component chips P that are received in rows of the following insertion guide holes 51c are extruded of the component forcing-out machine 51d by the respective pins 51d4. Then, the extruded component chips P is dropped downward under gravity within the flexible conduit 52b, respectively, and are cast into a row of the other insertion guide holes 53a of the insertion auxiliary instrument 53, respectively, to be held therein.

Figure 44:
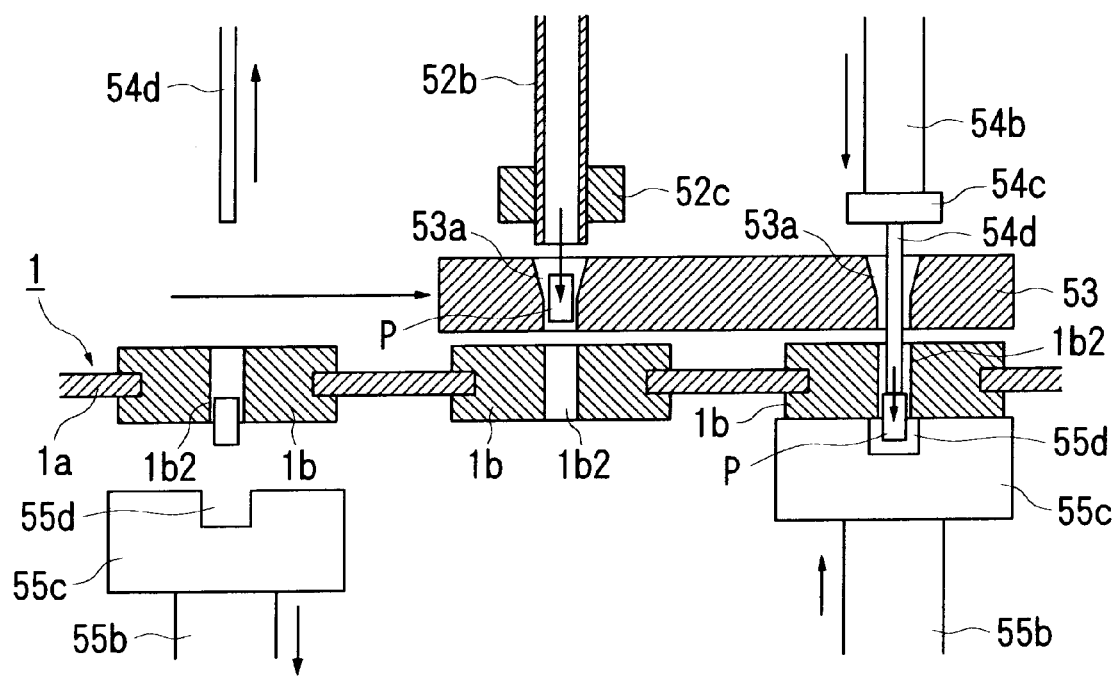
FIG. 44 is an explanatory diagram of the operation of the component-inserting machine shown in FIG. 39.

Referring now to FIG. 44, the rod 55b of the belt supporting machine 55 positioned at the left side viewing the drawing is allowed to returningly move downward while the rod 14b of the component forcing-out machine 54 positioned at the left side is allowed to returningly move upward. Thereafter, the insertion auxiliary instrument 53 is allowed to move in the right direction viewing the drawing and stop at the position where the center line of each insertion guide hole 53a is vertically aligned with the center line of each component holding hole 1b2. The same position correction is made as the foregoing one. Then, the rod 55b of the belt supporting machine 55 positioned at the right side viewing the drawing is allowed to extend to be supported by the base plate 55c at the lower surface of the resilient body 1b. Then, the rod 54b of the component forcing-out machine 54 positioned in the right side viewing the drawing is allowed to extend to downward extrude the component chips P that are held within the respective insertion guide holes 53a is extruded downward by the respective pins 54d. Then, the component chips P that are extruded is forced into the respective component holes 1b2 of the resilient body 1b. By way of example illustrated in the figure, since the dropping position of the pin 54d is set so that the lower end portion of the component chips P may project beyond the lower surface of the resilient body 1b, the projection of the component chip P may be received by the recess 55d of the belt supporting base 55c in a non-contact condition.

In the component inserting process, the component-housing drum 51 is also allowed to rotate at a given angle. The component chips P that are received in rows of the following insertion guide holes 51c are extruded of the component forcing-out machine 51d by the respective pins 51d4. Then, the extruded component chips P is dropped downward under gravity within the flexible conduit 52b, respectively, and are cast into a row of the initial insertion guide holes 53a of the insertion auxiliary instrument 53, respectively, to be held therein.

Then, the rod 55b of the belt supporting machine 55 positioned at the right side viewing the drawing is allowed to returningly move downward and also the rod 54b of the component forcing-out machine 54 positioned at the right side is allowed to returningly move upward. Thereafter, the component conveyer belt 1 is allowed to move by a predetermined distance and stop at the component insertion position. The same further procedure is made as the foregoing one to repeat the component insertion operation into the component holding hole 1b2.

In the foregoing component-inserting machine, the component chips P are fed into the respective chute conduits 52 from the respective insertion guide holes 51c, casting into the respective guiding holes 53a of the insertion auxiliary instrument 53 via the respective chute conduits 52. Therefore, these component chips P can be forced into the respective holding holes 1b2 of the resilient body 1b by the respective pins 54d of the component forcing-out machine 54 all together at the same time.

Since there is no necessity to obtain high dimensional precision for the component feeding portion into the chute conduit 52, dimensional precision for the insertion auxiliary instrument 53 may cause the component insertion into the component conveyer belt 1 to be well performed. Therefore, the capturing operation of the component chips P into the chute conduit 52 is implemented with high possibility, so that error in the capturing operation may be avoided to occur. Additionally, such inconvenience will be positively overcome that the component chips P may not be inserted into the component holding holes 1b2.

Furthermore, since the component chips P can be cast into the insertion guide holes 53a of the insertion auxiliary instrument 53 from the component-housing drum 51 via the chute conduit 52, the alignment position of the component-housing drum 51 and the insertion auxiliary instrument 53 may be optionally changed.

Figure 45:
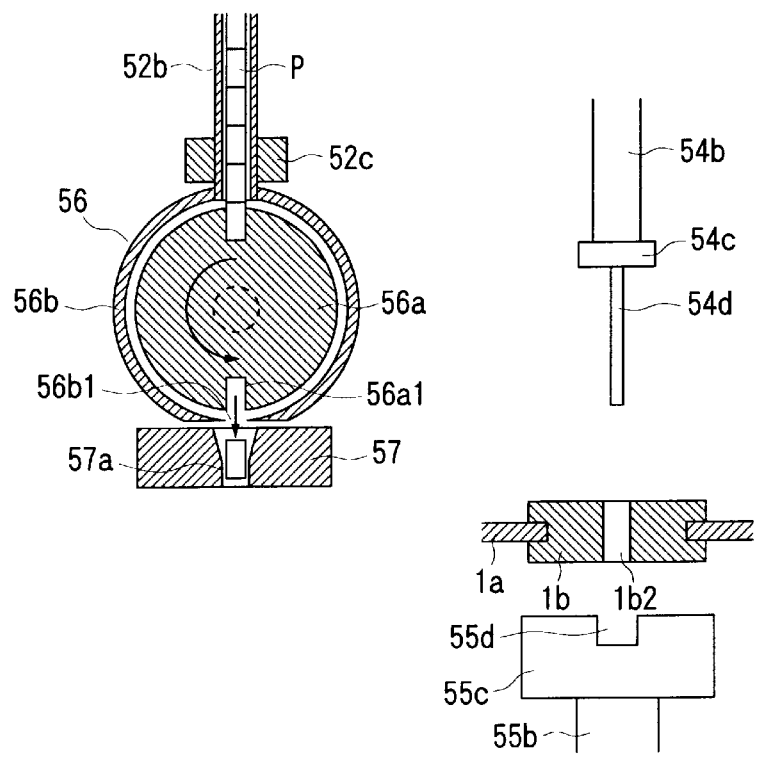
FIG. 45 is structural views a component entry control mechanism applicable to the component-inserting machine shown in FIG. 39.
Figure 46:
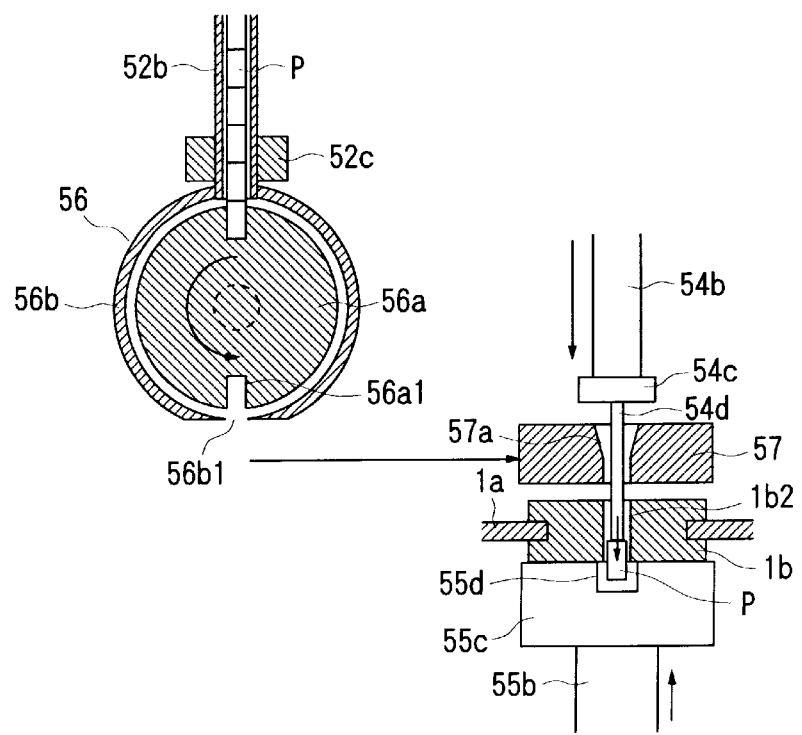
FIG. 46 is an explanatory diagram of an operation of the component entry control mechanism shown in FIG. 45.

Incidentally, though the component chips P are directly cast into the insertion guide holes 53a of the insertion auxiliary instrument 53 from the chute conduit 52, some mechanism for controlling the component cast-in operation may be interposed therebetween. FIGS. 45 and 46 show a concrete example of the above-noted controlling mechanism in which a entry controlling machine 56 is interposed between the lower opening of the flexible conduit 52b and the insertion guide hole 57a of the insertion auxiliary instrument 57. The entry controlling machine 56 is made up of a cylindrical object 56a that is intermittently rotated counterclockwise by a rotation driving source such as a motor (not shown), and a cover member 56b for covering the outer circumferential surface of the cylindrical object 56a. Rows of apertures 56a1 for receiving the component chips P from the flexible conduit 52b are formed in the outer circumferential surface of the cylindrical object 56a in the direction of rotation at equal intervals (in the figure, 180° intervals). The number of the apertures 56a1 and the arrangement thereof coincide with the number of the insertion guide holes 57a of the insertion auxiliary instrument 57 and the arrangement thereof. Further, slits 56b1 for permitting the component to drop from the apertures 56a1 are formed at the bottom of the cover member 56b.

The entry controlling machine 56 may be effectively available in the case where a plurality of the component chips P queue within each flexible conduit 52b. In other words, since the component dropping from the flexible conduit 52*b* can be controlled by the cylindrical object 56*a*, the plurality of component chips P will not be caused to enter into the insertion guide holes 57*a* of the insertion auxiliary instrument 57 in an incorrect manner.

FIGS. 47 to 50 are diagrams of a fourth example of the component-inserting machine. In the figures, references numeral 61 denotes a movable component housing container, 62 denotes a first camera for recognizing the insertion guide hole, 63 denotes a second camera for recognizing the holding hole, and 64 denote a component forcing-in machine.

The component housing container 61 is made up of a flat vessel having a contour of circular shape viewed from the top. Rows of insertion guide holes 61*a* are formed in a radial manner at equal angular intervals (in the figure, 45° intervals) in the bottom surface of the component housing container 61 the bottom surface of which has a shaft 61*b* at the center thereof. The number of the insertion guide holes 61*a* per row and the arrangement thereof coincide with the number of the component holding holes 1*b*2 formed in the resilient body 1*b* of the component conveyer belt 1 and the arrangement thereof. Each insertion guide hole 61*a* being of circle in the lateral section has a basin-like portion at the top thereof, so that the component chips P that longitudinally enter thereinto can be held in the same posture while being introduced at the basin portion. A number of component chips P that are the subject to be inserted are reserved in a bulky manner within the component housing container 61.

Figure 48:
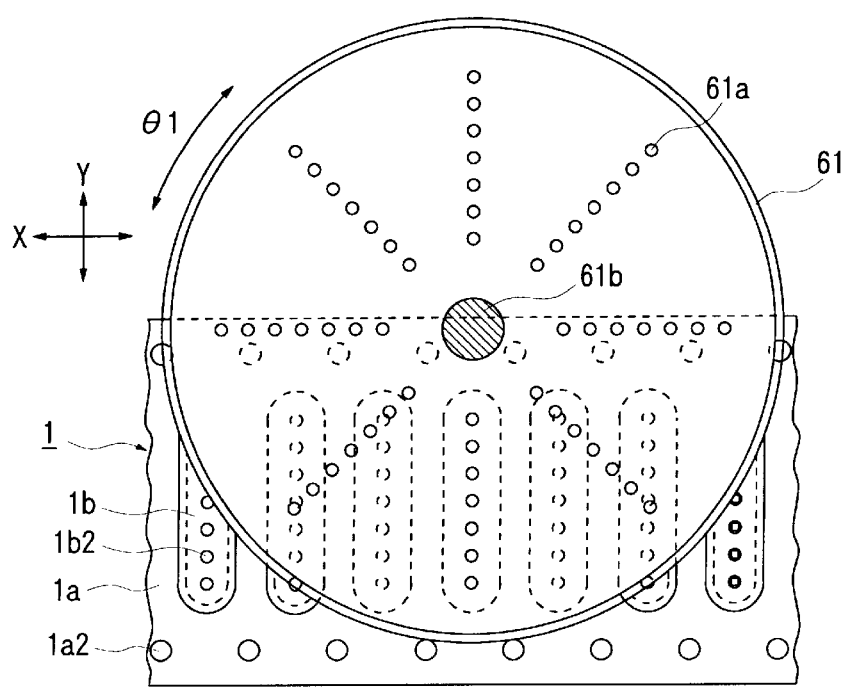
FIG. 48 is a top view of a component-housing vessel shown in FIG. 47.
Figure 49:
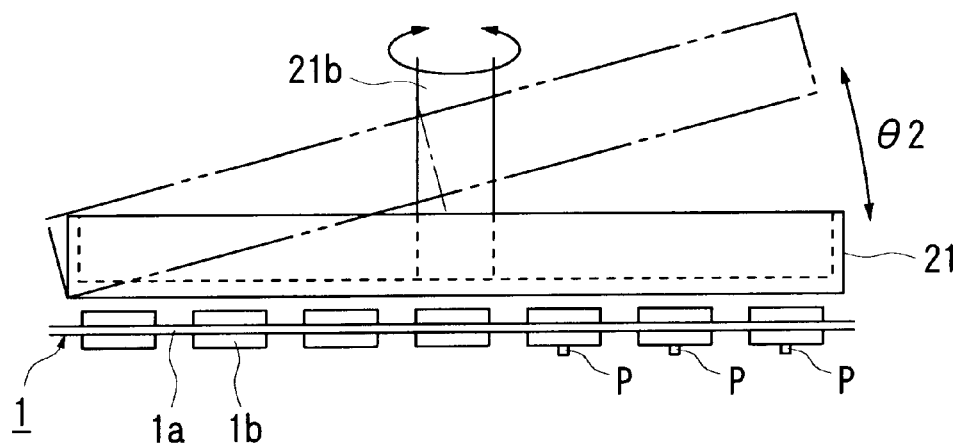
FIG. 49 is an explanatory diagram of an operation of the component-housing vessel shown in FIG. 48.

Incidentally, a driving mechanism having four degree of freedom (not shown) permits the component housing container 61 to move in the X and Y directions and to rotate in the direction of θ1 with reference to FIG. 48, and to rotate in the direction of θ2 with reference to FIG. 49.

The first camera 62 serves to recognize the positions of the insertion guide holes 61*a* of the component housing container 61 that stops at the component insertion position, and has a lighting utensil 62*a* integral therewith. In the case where there exists misalignment at the insertion guide hole position of the insertion guide hole of the component housing container 61 in a stopping state, the degree of the misalignment that is detected through the first camera 62 is fed back to the driving mechanism for the component housing container 61, to thereby carry out the position correcting operation accordingly. The first camera 62 incorporates a two dimensional CCD therein, and connects to a control device or the like (see FIG. 23) for detecting the degree of the misalignment based on the image data to send the correction signals.

The second camera 63 serves to recognize the positions of the holding holes of the component conveyer belt 1 that stops at the component insertion position, and has a lighting utensil 63*a* integral therewith. In the case where there exists misalignment at the holding hole position of the component conveyer belt 1 in a stopping state, the degree of the misalignment that is detected through the second camera 63 is fed back to the rotation driving source for the component conveyer belt 1, to thereby carry out the position correcting operation accordingly. The second camera 63 incorporates a two dimensional CCD therein, and connects to a control device or the like (see FIG. 23) for detecting the degree of the misalignment based on the image data to send the correction signals.

The component forcing-in machine 64 is made up of a cylinder 64*a*, its rod 64*b*, a plate member 64*c* attached to the distal end of the rod 64*b*, and a plurality of pressure pins 64*d* integrally or separately mounted to the supporting plate 24*c*. The number of the pins 64*d* and the arrangement thereof coincide with the number of the insertion guide holes 61*a* per row and the arrangement thereof.

Figure 47:
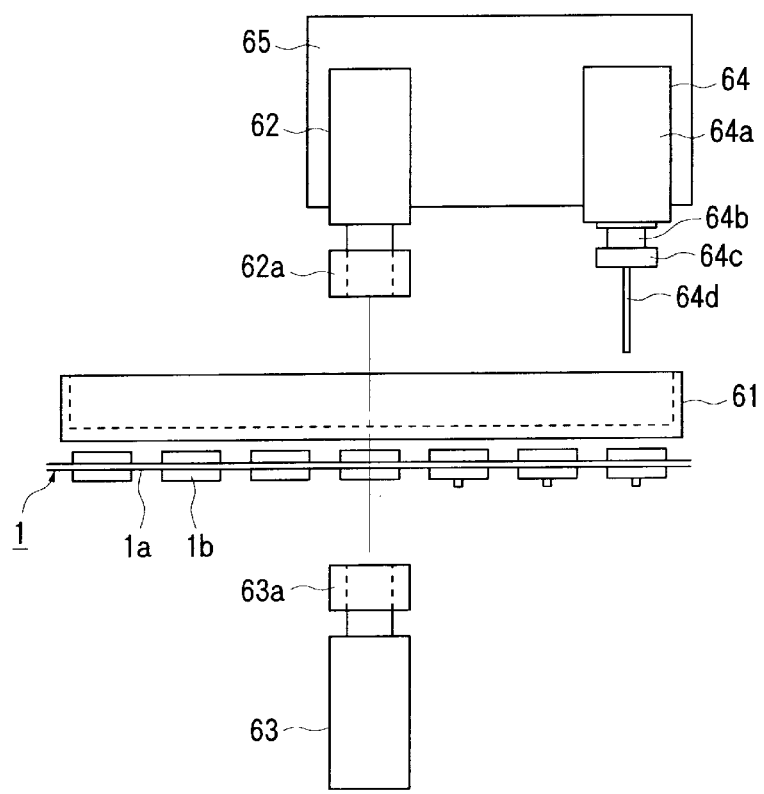
FIG. 47 is a structural view showing a fourth example of the component-inserting machine applicable to the apparatus according to the first to third embodiments of the present inventions.

Incidentally, as shown in FIG. 47, the first camera 62 and the component forcing-in machine 64 are affixed to a moving plate 65, which travels in the left or right directions by a rectilinear driving source such as a cylinder (not shown).

When the component chips P are inserted into the component holding holes 1*b*2 of the component conveyer belt 1, the component housing container 61 is allowed to rotate at a certain angle, for instance 45°, and the component chips P are allowed to enter in a longitudinal manner into the insertion guide holes 61*a* to be held therein. Then, as shown in FIG. 49, the component housing container 21 is rotated at a certain angle, say 30°, to the direction of θ2 from the horizontal manner to set exceeding component chips P at one side. Thereafter, one row of the insertion guide holes 41*a* in which the component chips P have been reserved is made to mate with one of the component holding holes 1*b*2 of the resilient body 1*b* that is stopped at the component insertion position. As described previously, in the case where a row of the component holding holes 1*b*2 of the resilient body 1*b* that stops at the component insertion position is not mated with a row of the insertion guide holes 61*a* of the component housing container 61, the relative degree of the misalignment that is detected through the first camera 62 and the second camera 63 is fed back to the driving mechanism for the component housing container 61 to carry out the position correcting operation accordingly.

Figure 50:
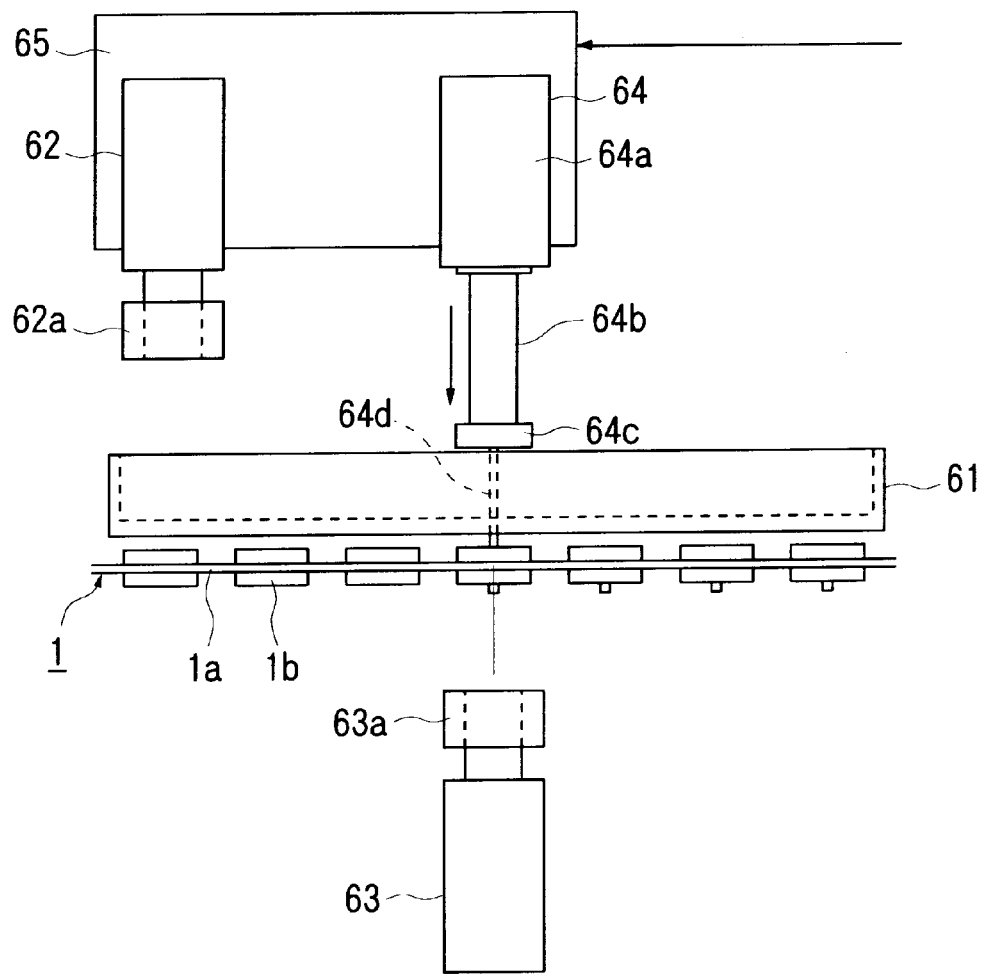
FIG. 50 is an explanatory diagram of an operation of the component-inserting machine shown in FIG. 47.
Figure 51:
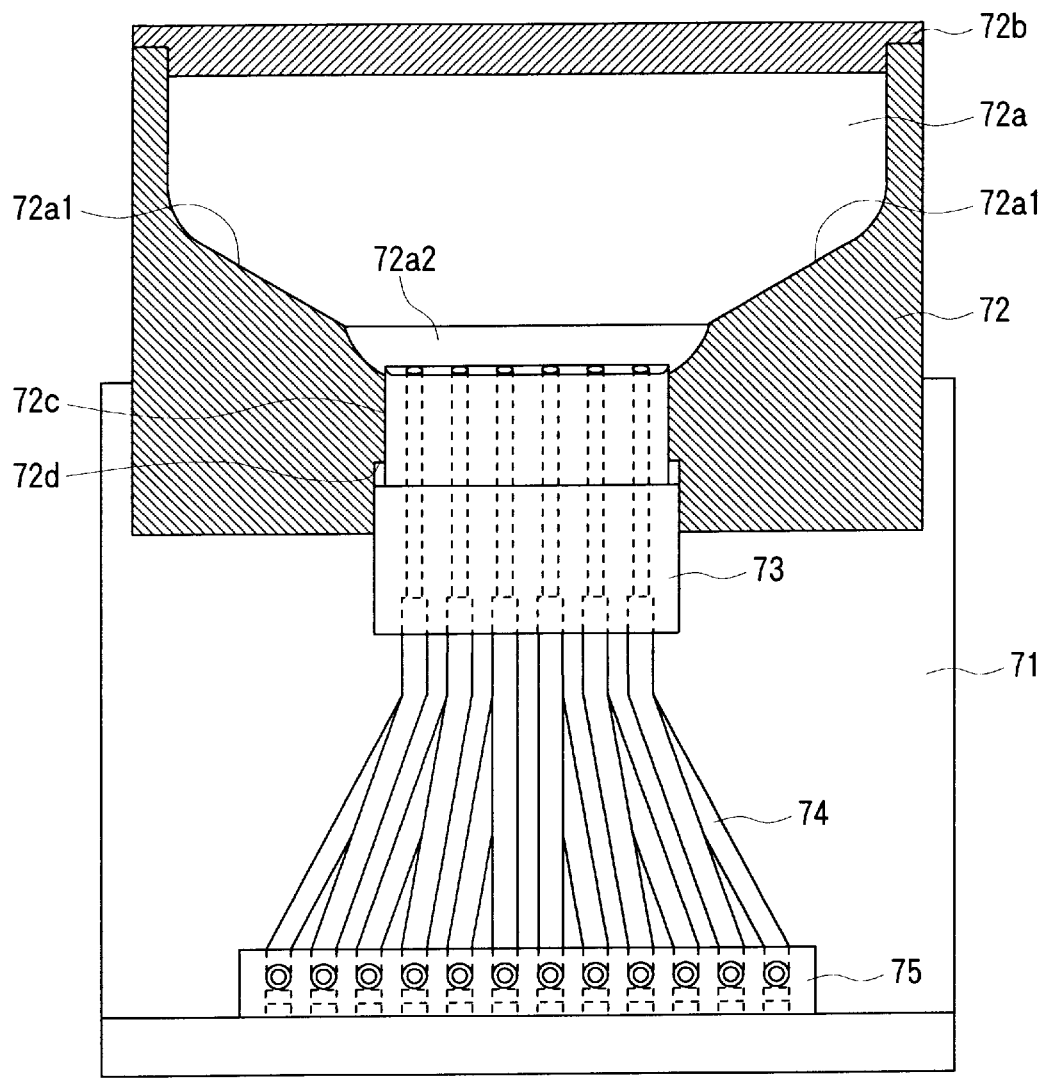
FIG. 51 is a stgyousructural view showing a fifth example of the component-inserting machine applicable to the apparatus according to the first to third embodiments of the present invention, exclusive of an absorption jig.
Figure 52:
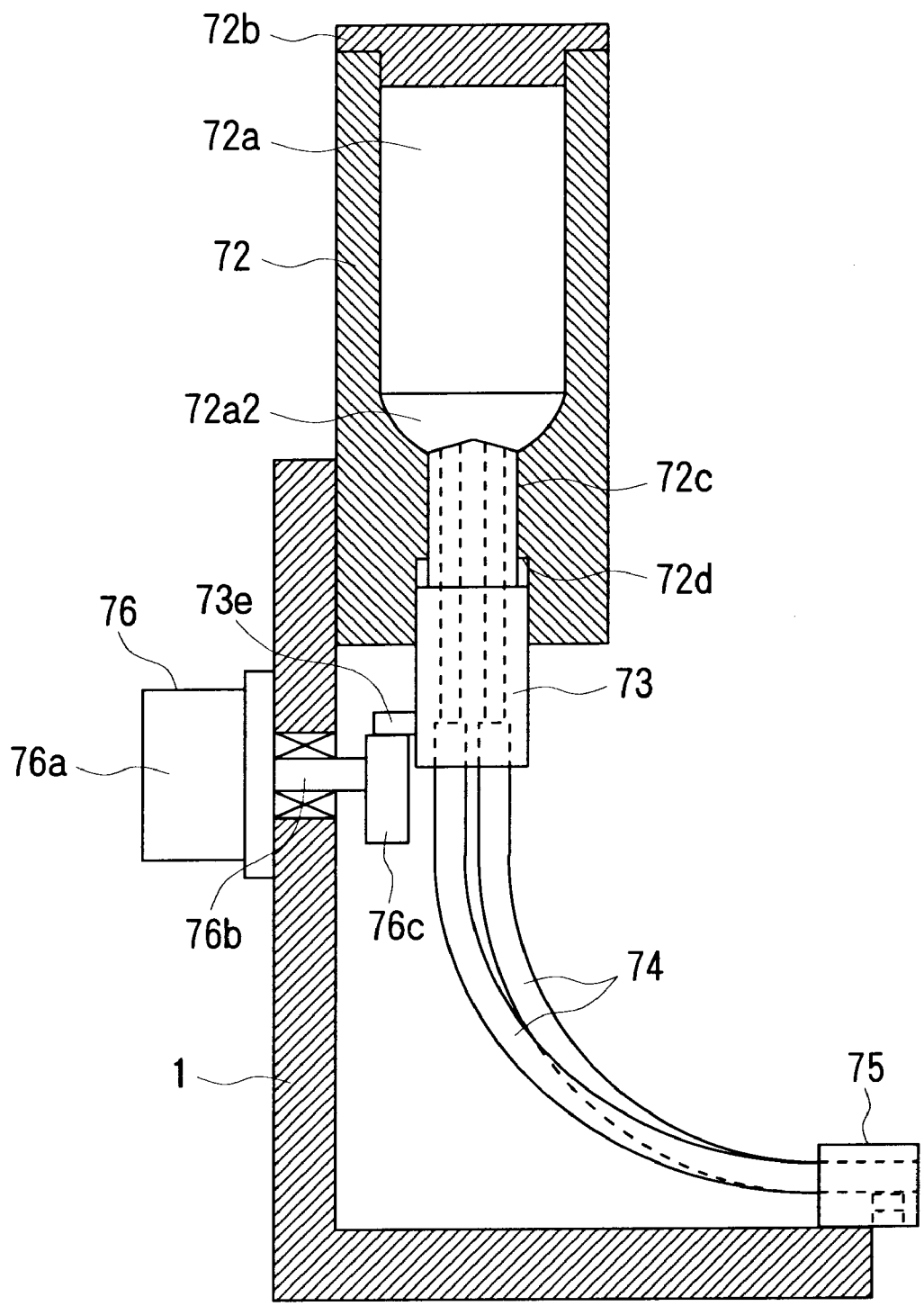
FIG. 52 is a longitudinal sectional view of a component-supplying unit shown in FIG. 51.
Figure 53:
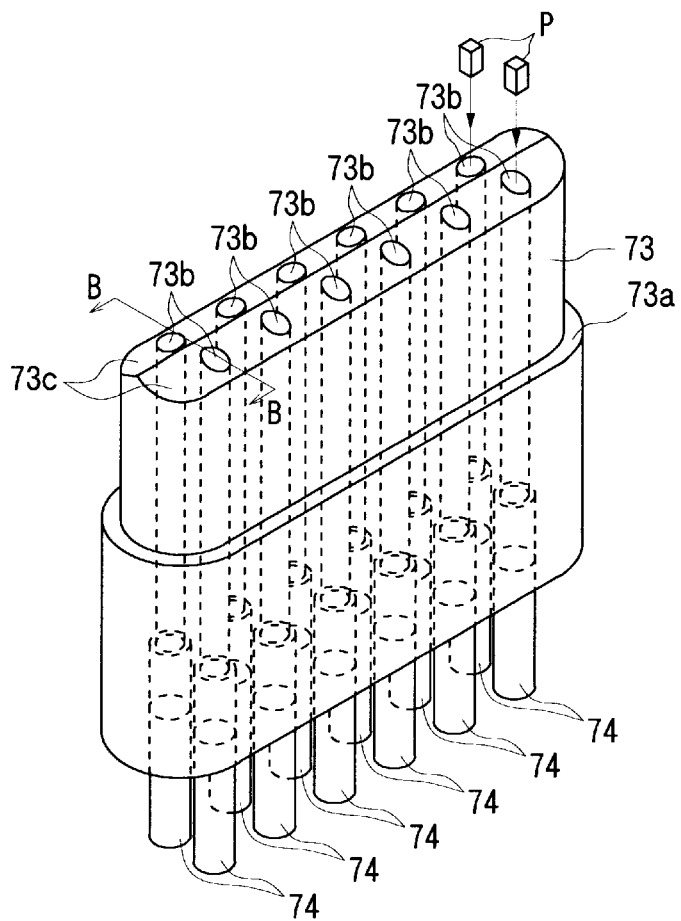
FIG. 53(A) is a perspective view of a capturing member shown in FIG. 51.
FIG. 53(B) is a longitudinal sectional view of the capturing member shown in FIG. 51.
Figure 53:
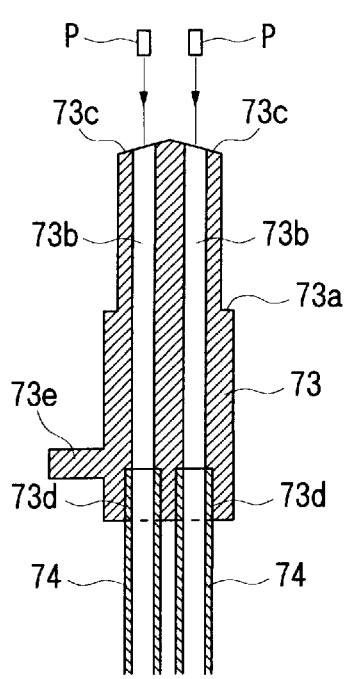
Figure 54:
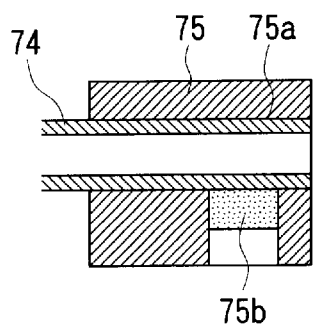
FIG. 54 is a longitudinal sectional view of a tip portion of a feeding conduit shown in FIG. 51.

Referring now to FIG. 50, the moving plate 65 is allowed to advance in the left direction viewing the drawing to thereby make the pressure pins 64*d* of the component forcing-in machine 64 mate with the inserting guiding holes 61*a* of the component housing container 61. Then, the rod 64*b* of the component forcing-in machine 64 is allowed to extend, so that the component chips P that are held within each insertion guide hole 63*a* are extruded downward by each pressure pin 64*d*. The component chips P that are extruded is forced into the respective holding holes 1*b*2 of the resilient body 1*b*.

Then, the rod 64*b* of the component forcing-out machine 64 is allowed to returningly move upward and the moving plate 65 is returned to the initial position shown in FIG. 47. Then, the component conveyer belt 1 is allowed to travel by a certain distance (i.e. resilient body interval) to stop the following resilient bodies 3 at the component insertion position. The same further procedure is made as the foregoing one to repeat the component insertion operation into the belt hole.

In the foregoing component-inserting machine, the following operation is made. The component chips P are received in rows of the insertion guide holes 61*a* of the component housing container 61, then the rows of the insertion guide holes 61*a* are aligned with the rows of the component holding holes 1*b*2 of the component conveyer belt 1 that is stopped at the component insertion position, and then the component chips P that are held within the insertion guide holes 61*a* are extruded by the pins 64*d* of the component forcing-in machine 64. Therefore, the resultant component chips P can be forced into the respective holding holes 1*b* of the resilient body 1*b*2 at the same time.

The rows of the insertion guide holes 61*a* are formed in the bottom surface of component housing container 61 that is allowed to advance in the X and Y directions and the direction of θ1, so that the component housing container 61 may be correctly aligned with respect to the resilient body 1*b*. In other words, the component insertion into the component holding holes 1*b*2 of the component conveyer belt 1 is suitably carried out. Accordingly, the opening edges or the interiors of the component holding holes 1*b*2 will not be damaged by the inserted component chips P, so that the reduced time resistant to occurrence of damage can be required. In addition, frequencies of exchanging the belt may be reduced to diminish the cost loading therefor. The inserted component chips P may also be prevented from being slant. Therefore, the external electrode paste can be applied to the inserted component chips P in a suitable manner.

Still, since the component chips P that are reserved in the component housing container 61 are designed to be captured into the respective insertion guide holes 61*a* formed in the bottom surface thereof to be held therein, the component chips P can be captured into the respective insertion guide holes 61*a* with high possibility, so that error in the capturing operation may be avoided to occur. Additionally, such inconvenience will be positively overcome that the component chips P may not be inserted into the respective component holding holes 1*b*2.

Furthermore, since it is preferable that the component chips P that are the subject to be inserted may be stored in a bulky manner within the component housing container 61 with the open-ended top surface, works such as component supplement or component exchanging may be facilitated.

FIGS. 51 to 58 show a fifth example of the component-inserting machine. In the figures, reference numeral 71 denotes a base member, 72 denotes a reservoir vessel, 73 denotes a capturing member, 74 denotes delivery conduits, 75 denotes a supporting member, 76 denotes a capturing member driving mechanism, and 77 denotes a absorption jig.

The base member 71 is entirely of an "L" shape, the reservoir vessel 72 is supported detachably at a perpendicular portion of the base member 71, and the supporting member 75 is supported detachably at a horizontal portion of the base member 71.

The reservoir vessel 72 includes a reservoir chamber 72*a* having an opening portion at the upper end thereof, and a cover 72*b* for covering the upper end opening of the reservoir chamber 72*a* in an freely opening and closing manner. The reservoir chamber 72*a* is of a dimensional relation such as front width>side width, the upper end opening of which is of rectangular viewed from the top. The bottom surface of the reservoir chamber 72*a* is made up of two angular surfaces 72*a*1, being symmetrical with each other in the direction of front width and a curved recess portion 72*a*2 formed therebetween. A sliding hole 72*c* for the capturing member is longitudinally formed in the bottom surface of the curved recess portion 72*a*2 in a penetrating manner. Each angular surface 72*a*1 has an slant angle of on the order of 30° against to the horizontal line, and the curved recess portion 72*a*2 is so arranged as to extend front widthwise. The sliding hole 72*c* is of a dimensional relation such as front width>side width, and the upper portion of the hole has a slightly larger front width and side width than the lower portion thereof. For this, a step portion 72*d* is formed at the mid-position in the vertical direction of the interior of the hole.

A number of the component chips P are reserved in a bulky manner within the reservoir chamber 72*a*. This component chips P have outer electrode, inner conductivity or the like, so that absorption can be made by a permanent magnet 75*b* described later.

The capturing member 73 is of a flat plate shape having a half-round surface at the both sides front widthwise, and is located within the sliding hole 72*c* in a vertically movable manner. The upper and lower portions of the capturing member 73 are similar but slightly smaller than the upper and lower portions of the sliding hole 72*c* in a lateral section, respectively. Further, the lower portion of the capturing member 73 has a slightly larger front width and side width than the upper portion thereof. For this, a step portion 73*a* is formed at the mid-position in the vertical direction of the outer.

The capturing member 73 has a plurality of capturing holes 73*b* (12 holes by way of example illustrated in the figures) formed in a longitudinally penetrating manner, in such a manner that the upper opening portions thereof are oriented to the interior of the reservoir chamber 72*a*. Each capturing hole 73*b* has a circle in lateral section having the dimension slightly larger than the end maximum length of each component chip P, so that the reserved component chips P can be captured in a longitudinal direction one by one and be delivered under gravity. Incidentally, by way of example illustrated in the figures, the plurality of capturing holes 73*b* are so arranged that 6 capturing holes 73*b* are aligned in line at equal intervals viewed from the top in addition to which the lines each having 6 holes is aligned parallel to each other in the direction of the side width.

Further, two slant plane surfaces 73*c* being symmetrical with each other in the direction of the side width are formed at the top of the capturing member 73. A top of each capturing hole 73*b* is opened at the each slant plane surface 73*c*. Each slant plane surface 73*c* has an angle of on the order of 15° with respect to the horizontal line. Of course, the slant plane surface 73*c* may be formed of a convex surface or a concave surface. Further, each capturing hole 73*b* has a mounting portion 73*d* for mounting a delivery conduit at the lower end thereof, the mounting portion 73*d* having a hole diameter larger than that of the capturing hole 73*b*. A manipulating projection 73*e* connecting to an off-center cam 76*c* of the capturing member driving mechanism 76 is also attached to the lower outer surface of each capturing member 73*b*.

The delivery conduits 74, each being formed of resin pipe or the like having flexibility, are prepared so as to correspond to number of the capturing holes 73*b*. Each delivery conduit 74 has substantially the same inner lateral section as that of each capturing hole 73*b*, allowing the component chips P to be delivered in a longitudinal direction one by one under gravity. The upper end portions of the delivery conduits 74 are inserted and fixed to the mounting portions 73*d*, respectively, the lower end portions are inserted and fixed to mounting holes 75*a* formed in the supporting member 75, respectively. Since the supporting member 75 is positioned in front with respect to the position where the capturing member 73 moves vertically, the delivery conduit 74 is designed to be moderately curved toward the supporting member 75 from the capturing member 73. The lower opening portion of the delivery conduit 74 is open-ended from the supporting member 75 toward the front side.

The supporting member 75 has a plurality of mounting holes 75*a* (12 holes by way of example illustrated in the figures) formed at front-widthwise equally spaced intervals in a laterally penetrating manner. Each mounting hole 75*a* has a permanent magnet 75*b* formed of rare-earth permanent magnet or the like at the lower portion so that one of N pole or S pole is oriented in the mounting hole 75*a*.

The capturing member driving mechanism 76 is made up of a motor 76*a* adhered to the rear surface of the vertical portion of the base member 1, and an off-center cam 76c adhered to a shaft 76b of the motor 76a for projecting at the front side of the vertical portion. As described previously, the circumferential surface of the off-center cam 76c is brought into contact with the lower surface of the manipulating projection 73e of the capturing member 73. The motor 76a allows the off-center cam 76c to rotate clockwise or counterclockwise, so that the capturing member driving mechanism 76 may permit the capturing member 73 to move vertically.

The absorption jig 77 includes recesses 77a for receiving one component chip P in a lateral posture, and a suction passage 77b in communication therewith, the suction passage 77b being connected a suction tube 77d via a joint 77c.

Figure 55:
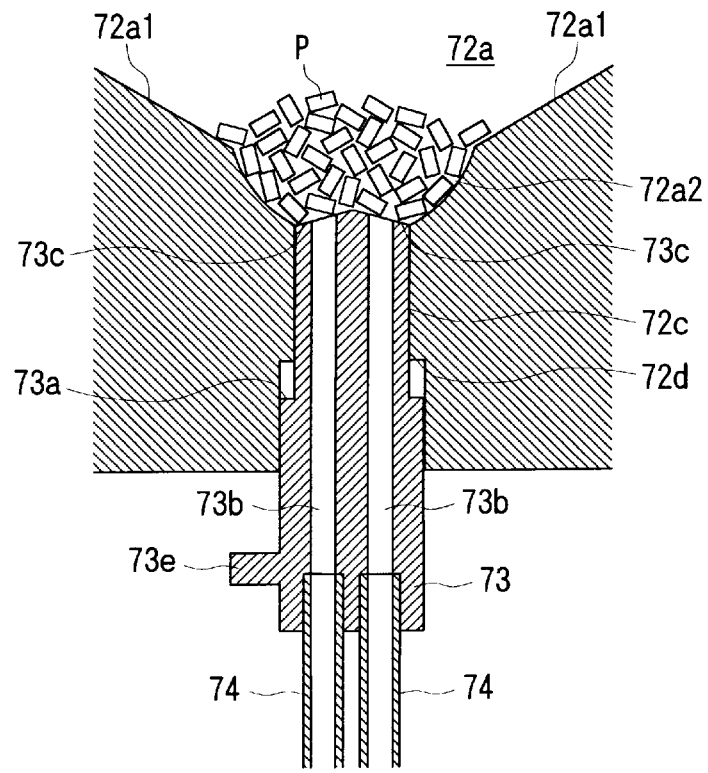
FIG. 55 is a diagram showing a component capturing operation into the capturing member.

When the component chip P is inserted into the component holding hole 1b2 of the component conveyer belt 1, from the state as shown in FIG. 55, the off-center cam 76c is rotated by the motor 76a. For this, the capturing member 73 is ascended by a certain stroke from the original position, and then returned to the original position from the ascending position. Such an operation is repeated. Incidentally, in FIG. 55, the outer edge of the slant plane surface 73c of the capturing member 73 is substantially matched with the bottom surface of the curved recess portion 72a2. Further, a clearance even longer than the ascending stroke of the capturing member 73 is formed between the step portion 73a of the capturing member 73 and the step portion 72d of the sliding hole 72c. It is also noted that some of the component chips P that are reserved within the reservoir chamber 72a enter into the curved recess 72a2.

Figure 56:
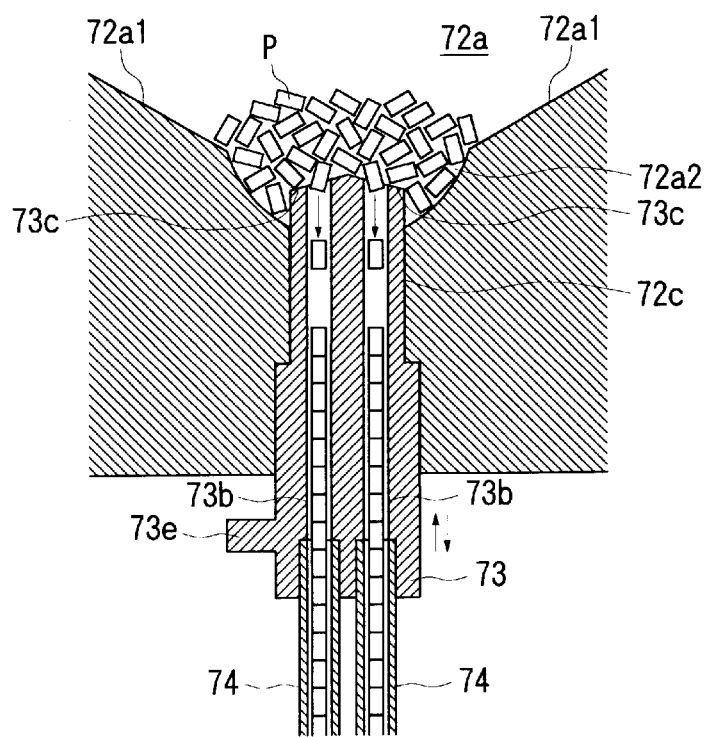
FIG. 56 is a diagram showing the component capturing operation into the capturing member.

As shown in FIG. 56, in the process that the capturing member 73 ascends from the original position, the component chips P located in the curved recess portion 72a2 are separated by projecting the capturing member 73, and then the so separated component chips P are captured in the upper opening of the capturing hole 73b in a longitudinal direction one by one by means of the slant portion of the slant plane surface 73c. The component capturing operation into the capturing hole 73b is implemented in the process that the capturing member 73 descends from the ascending position in a similar fashion. Therefore, the component chips P located in the curved recess portion 72a2 are caused to be simultaneously and subsequently captured from the upper opening of the capturing hole 73b.

Figure 57:
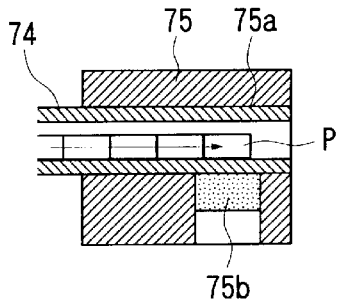
FIG. 57 is a diagram showing the feeding operation of the component in the feeding conduit.
Figure 58:
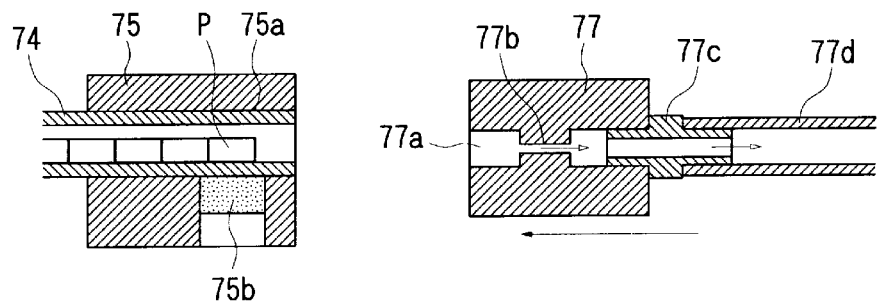
FIGS. 58(A) and 58(B) are diagrams showing the absorption jig and a component extracting operation by the absorption jig.
Figure 58:
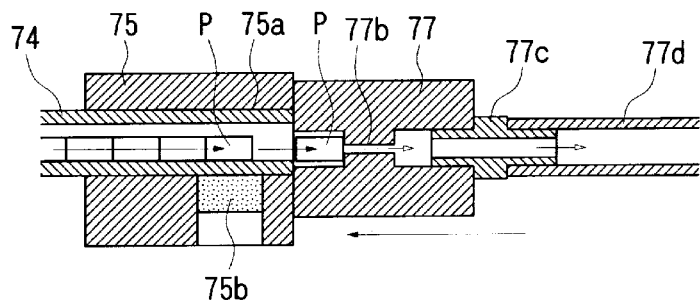

The component chips P that are captured into the capturing holes 73b are moved downward within the capturing holes 73b under gravity to be introduced into the delivery conduits 74 connecting to the lower end portions of the capturing holes 73b, respectively. The component chips P that are received in the respective delivery conduits 74 are further moved downward under gravity within the respective delivery conduits 74. In the moving process, the component chips P are allowed to change their postures on the order of 90° from the longitudinal orientation to the lateral orientation. The component chips P that have been changed in their postures are allowed to travel to the lower opening (exit) of the respective delivery conduits 74. Referring now to FIG. 57, a primary component chip P reaches the position on the permanent magnet 75b, the primary component chip P is attracted by the force of the permanent magnet 75b to stop at this position to be held thereat. Since one component chip is lightweight, even when a plurality of component chips P follow the primary component chips P, the above-noted component stop condition can be sufficiently maintained by the force of the permanent magnet 75b. The respective delivery conduits 74 suffer from flexure when the capturing member 73 moves vertically. However, the ascending or descending stroke for the capturing member 73 is not so large that no inconvenience will occur due to the flexure when the component chips P within the delivery conduit 74 is allowed to move under gravity.

Referring now to FIGS. 58(A) and 58(B), the component extracting operation will be described. The absorption jig 77 is moved toward the supporting member 74 while the negative pressure acts on the suction passage 77b. The recesses 77a are connected to the lower opening of the delivery conduits 74 to suck and capture the primary component chip P under the stopping condition into the recess 77a against the attractive force of the magnet. Since the absorption jig 77 has the same number of the recesses 77a each having the same alignment as those of the lower opening portions of the delivery conduits 74, a plurality of component chips p (i.e., 12 chips) can be captured into the absorption jig 77 all together at the same time.

Then, the extracted component chips P are conveyed to the component conveyer belt 1 by the absorption jig 77, the recesses 77a are aligned with the component holding holes 1b2, and then the component chips P that are captured into the absorption jig 77 are forced into the component holding holes 1b2. This component forcing-in operation may be available by applying the positive pressure to the suction passage 77b, however more positive possibility will be obtained using pin pressure concurrently. Of course, accurate component insertion operation into the component holding holes 1b2 may be achieved if the component-inserting head 41 shown in FIG. 34 is employed in place of the absorption jig 77.

As seen from above, in the component-inserting machine, when the capturing member 73 including a plurality capturing holes 73b are used, the component chips P that are reserved in a bulk manner may be captured at the same time from the respective capturing holes 73b, and the component chips P that are introduced to the exits of the respective delivery conduits 74 can be forced into the component holding holes 1b2 of the resilient body 1b using the absorption jig 77. Since only one capturing member 73 is sufficient, extremely simple arrangement can be realized, so that cost increase for complexity of the arrangement may be prevented.

Further, since the slant plane surface 73c is formed at the top end of the capturing member 73, the upper opening of the capturing holes 73b may not be prevented from being closed by a lateral component chip P, so that the possibility of capturing the component chips P into the respective capturing holes 73b may be enhanced to efficiently perform the desired component capturing operation. As a result, error in the capturing operation may be avoided to occur, and such inconvenience will be positively overcome that the components may not be inserted into the component holding holes 1b2. Of course, such an arrangement that the slant plane surface 73c be substituted for a convex surface or a concave surface can realize the same operation and effect as above noted.

Figure 59:
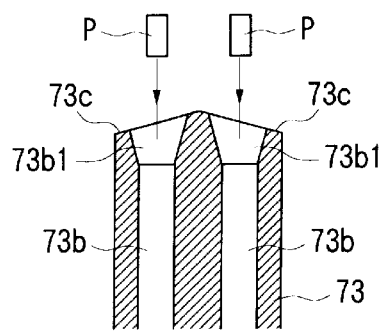
FIG. 59 is a diagram showing an example of another configuration example of a capturing hole of the capturing member.

Incidentally, the upper opening portion of each capturing hole 73b is open with the slant plane surface 73c or any curved surface. However, as shown in FIG. 59, if a taper 73b1 are formed at the upper opening portion of each capturing hole 73b, the component chip P capturing operation into the respective capturing holes 73b may be more efficiently performed due to a guiding operation by the taper 73b1.

Figure 60:
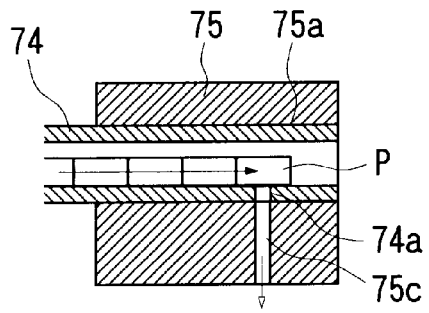
FIG. 60 is a diagram showing another structural example of the tip portion of the feeding conduit.

Still, since the permanent magnet 75b is used as a means for stopping a primary component chip P travelling within each delivery conduit 74 at the lower opening position, as shown in FIG. 60, suction holes 74a and 75c each having a small aperture are formed at the supporting member 75 and the delivery conduit 74, respectively. If the negative pressure is applied to these suction holes 75c and 74a, the component chips P can be attracted by the suction force of the suction hole 74a when a primary component chip P reaches the position on the suction hole 74a to stop at the position to be held thereat.

Further, since the capturing member 73 is allowed to descend from the ascending position mainly using the weight of the capturing member 73, the capturing member 73 may be biased downward by a spring member such as a coil spring to allow the capturing member 3 to descend using such biasing force by the spring member.

Figure 61:
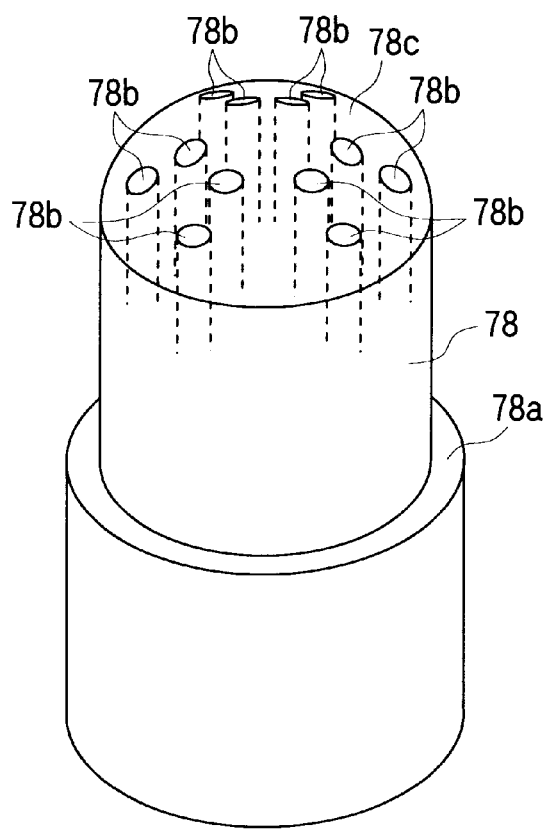
FIGS. 61(A) to 61(D) are diagrams showing other structural examples of the capturing member and arranging examples of the capturing hole of the capturing member.
Figure 61:
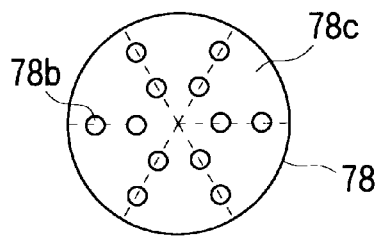
Figure 61:
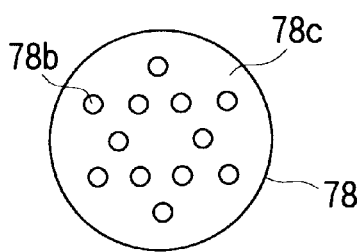
Figure 61:
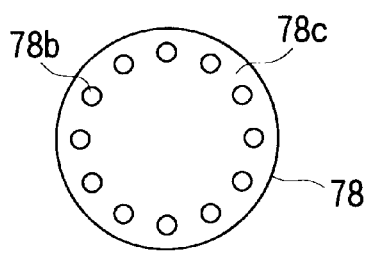

Further, since the capturing member 73 is of flat plate, as shown in FIG. 61(A), a capturing member 78 having a cylindrical shape may be used to perform the component capturing operation. The capturing member 78 has a step portion 78a at the outer surface thereof, a plurality of capturing holes 78b, a curved surface 78c at the top end thereof, and a manipulating projection (not shown), which is in the same manner as the above-described capturing member 73, the lower openings of the respective capturing holes 78b being connected to delivery conduits (not shown) as described above, respectively. As shown in FIG. 61(B), the plurality of capturing holes 78b are arranged in a radial manner viewed from the top. As shown in FIG. 61(C) or 61(D), regular alignment other than the radial one or a random alignment may be adopted.

If the capturing member 78 having such a circular shape is used, the lateral section shape of the sliding hole 72c may be matched with the contour of the capturing member 78. If ascending and descending the capturing member 78 from the state shown in FIG. 55 is repeated, the component chips P located within the curved recess portion 72a2 can be captured all together at the same time into the upper opening of each capturing hole 73b using the curvature ratio of the upper curved surface 78c to be introduced downward in an alignment condition. In particular, when the alignment as shown in FIG. 61(D) is adopted, in which a plurality of capturing holes 78b are formed on the outer periphery of the upper curved surface 78b at equal intervals in the circumferential direction viewed from the top, the reserved component chips P can be positively captured into the respective capturing holes 78b even if the reserved component chips P become less and no component chip P remains on the upper surface of the upper curved surface 78b.

Figure 62:
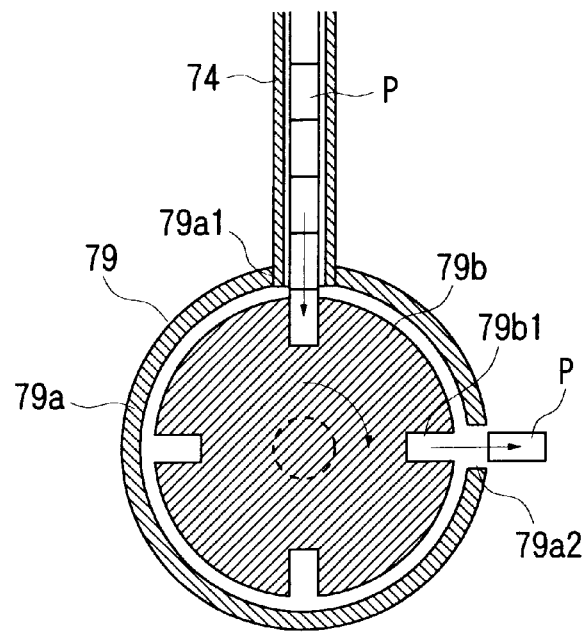
FIG. 62 is a structural view of a component separation mechanism applicable to the component-inserting machine shown in FIG. 51.
Figure 63:
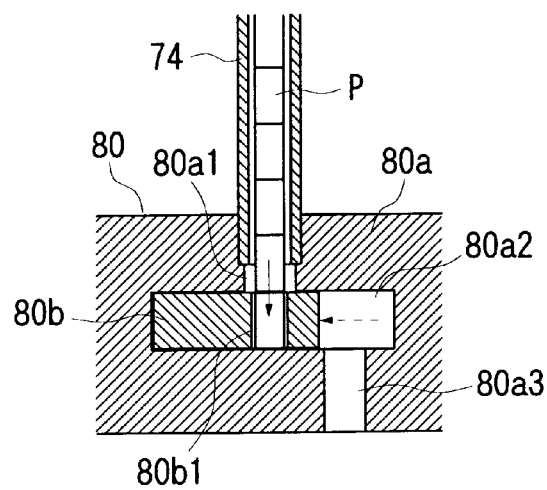
FIGS. 63(A) and 63(B) are structural views of another component separation mechanism applicable to the component-inserting machine shown in FIG. 51 and explanatory diagrams of the operation thereof.
Figure 63:
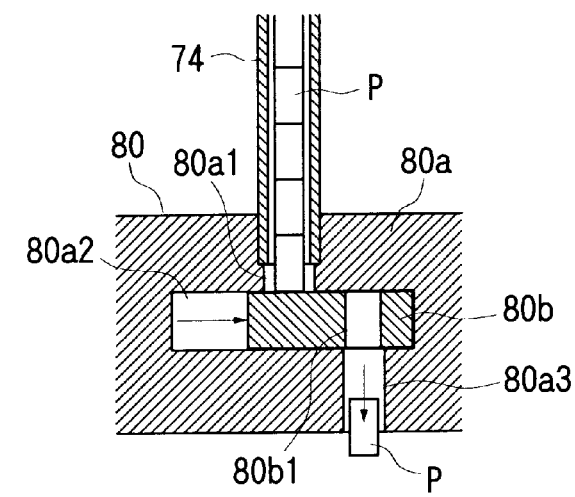

Further, since a primary component chip P travelling within each delivery conduit 74 is allowed to stop at the lower opening position, a component separation mechanism, in which a primary one in the component chips P in the regular alignment condition may be separated from the remaining component chips P. FIGS. 62, 63(A) and 63(B) show concrete examples of this component separation mechanism.

In FIG. 62, the component separation mechanism 79 is made up of a supporting cylinder 79a having a tubular manner, and a separate drum 79b movably disposed within the supporting cylinder 79a. The supporting cylinder 79a has a connecting hole 79a1 to which the lower end portion of each delivery conduit 74 are affixed, and an extracting hole 79a2 for extracting the component chips P out thereof. A plurality of storing holes 79b1 for receiving the component chips P in a longitudinal manner are formed on the circumferential surface of the separate drum 79b in the circumferential direction at equally angular intervals (by way of example illustrated in the figure, 4 storing holes at 90° intervals).

A primary component chip P in the component chips P travelling downward within each delivery conduit 74 in the state of the regular alignment enters into each storing hole 79b1 of the separate drum 79b which is waited for the component chips P at immediately under the delivery conduit 74. If the separate drum 79b is rotated clockwise by 90° in the figure by a rotation driving source (not shown) utilizing a motor or the like thereafter, the component chips P that enter into the respective storing holes 79b1 can be oriented in the extracting hole 79b2 of the supporting cylinder 79a. For the component extracting operation from the separation mechanism 79, the absorption jig shown in FIG. 58 or the component-inserting head 41 shown in FIG. 34 may be available. Further, if all the delivery conduits 74 are connected to the supporting cylinder 79a, and the storing holes 79b1 are formed on the separate drum 79b so as to correspond to the delivery conduits 74, respectively, the plurality of component chips P can be supplied to the respective extracting holes 79a2 at the same time.

Referring now to FIGS. 63(A) and 63(B), the component separation mechanism 80 is made up of a supporting member 80a, and a separate slider 80b located within the supporting member 80a in a rightward and leftward movable manner. The supporting member 80a has a connecting hole 80a1 to which the lower end portion of each delivery conduit 74 is adhered, a hollow 80a2 for the separate slider, and an extracting hole 80a3 for extracting the component chips P out thereof. The separate slider 80b has a storing hole 80b1 for receiving the component chips P in a longitudinal manner.

As shown in FIG. 63(A), a primary component chip P in the component chips P travelling downward within each delivery conduit 74 in the state of the regular alignment enters into each storing hole 80b1 of the separate slider 80b which is waited for the component chips P at immediately under the delivery conduit 74. As shown in FIG. 63(B) if the separate slider 80b is moved rightward viewing the drawing by a rectilinear driving source (not shown) utilizing a solenoid or the like thereafter, the component chips P that enter into the respective storing holes 80b1 are allowed to be oriented in the extracting hole 80b3 of the supporting member 80a to drop under gravity. For the component extracting operation from the separation mechanism 80, the absorption jig 77 shown in FIG. 58 or the component-inserting head 41 shown in FIG. 34 may be available. Further, if all the delivery conduits 74 are connected to the supporting cylinder 80a, and the storing holes 80b1 are formed on the separate slider 80b so as to correspond to the delivery conduits 74, respectively, the plurality of component chips P can be supplied to the respective extracting holes 80a3 at the same time.

Alternative constructive examples of the paste-coating machine applicable to the apparatus according to the first to third embodiments of the present invention will be described hereinbelow.

Figure 64:
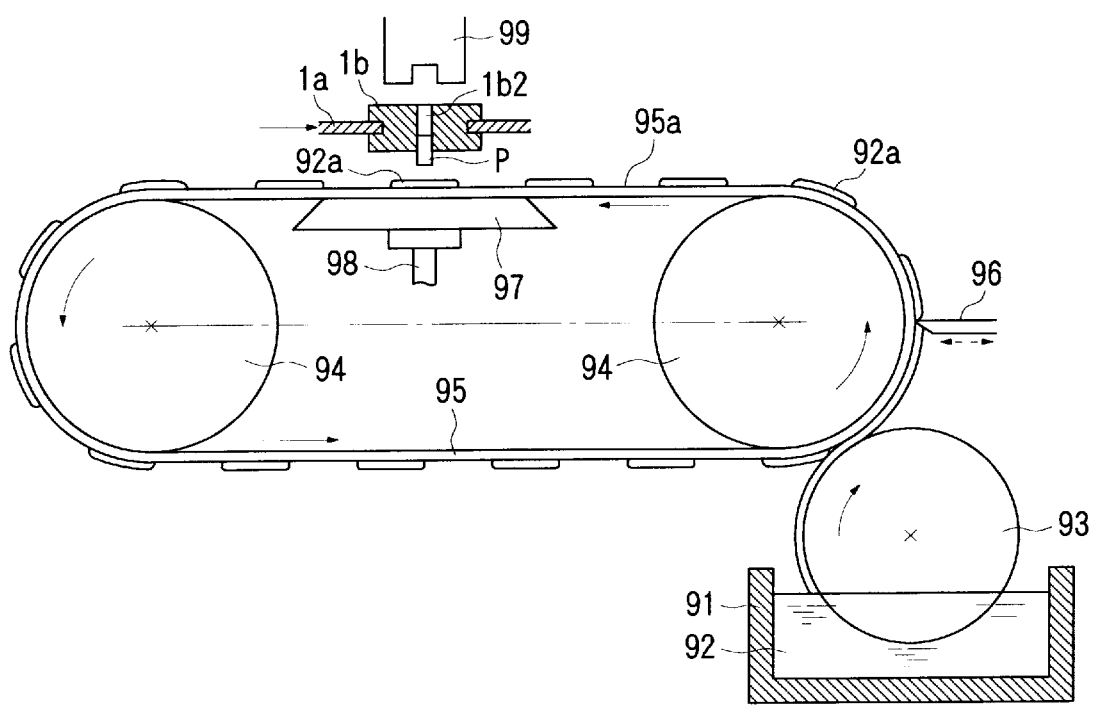
FIG. 64 is a structural view showing an example of the paste-coating machine applicable to the apparatus according to the first to third embodiments of the present invention.
Figure 65:
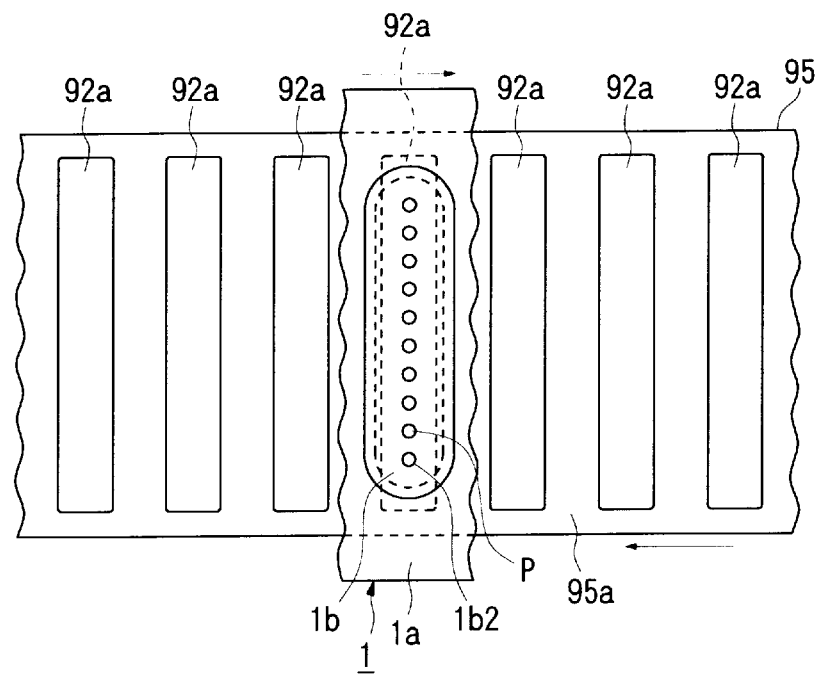
FIG. 65 is a partial top view of a paste-coating belt shown in FIG. 64.
Figure 66:
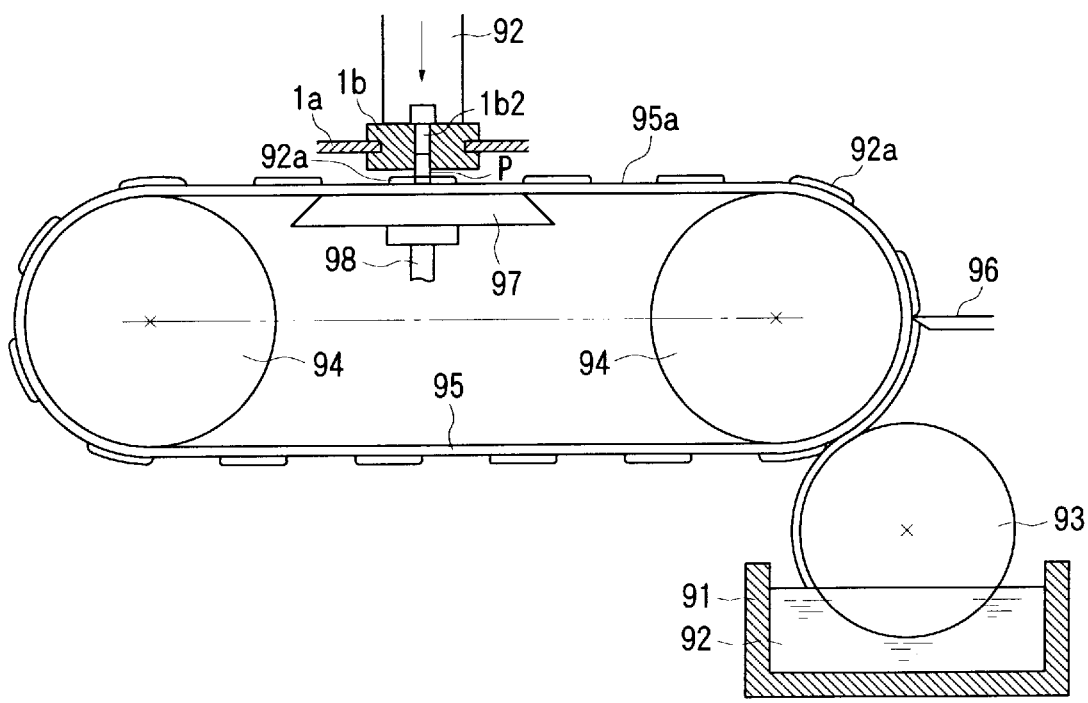
FIG. 66 is an explanatory diagram of an operation of a paste-coating machine shown in FIG. 64.

FIGS. 64 to 66 show an example of the paste-coating machine. In the figures, reference numeral 91 denotes a vessel having an opening at the top thereof, 92 denotes electrode paste accommodated in the vessel 91, 93 denotes a paste transfer roller, 94 denotes right and left belt supporting rollers in pair, 95 denotes a paste-coating belt wound around the two belt supporting rollers 94, 96 denotes a movable blade, 97 denotes a belt supporting base, 98 denotes a suction tube, and 99 denotes a depressing jig.

The paste-coating belt 95 is preferably formed of metal such as stainless, and is so arranged as to be an endless, which is wound around the two belt supporting rollers having the same diameters as each other. The two belt supporting rollers 94 are arranged in such a manner that the centers thereof may be positioned at the same height as each other. A flat portion 95a is present at the upper portion between the two belt supporting rollers 94 so that the surface of the belt can appear. In FIG. 64, the paste-coating belt 95 intermittently travels in the direction indicated by the arrow by an actuator such as a motor (not shown) connected to the shaft of the left belt supporting roller 94.

The paste transfer roller 93 is freely rotatably arranged so as to allow the lower portion thereof to be dipped in the electrode paste 92 in the vessel 91. The paste transfer roller 93 permits a circumferential portion thereof to be brought into contact with the paste-coating belt 95 formed circumferentially on the right belt supporting roller 94, so that it can be intermittently rotated in the direction indicated by the arrow along with the travel of the paste-coating belt 95. That is, when the paste transfer roller 93 rotates in synchronization with the paste-coating belt 95, the electrode paste 92 within the vessel 91 is adhered to the circumferential surface of the paste transfer roller 93. The adhered paste 92 is transferred to the surface of the paste-coating belt 95.

The movable blade 96 serves to control the dimension (thickness dimension and length dimension in the direction of the belt)of the electrode paste 92 transferred to the surface of the paste-coating belt 95, and is allowed to move repeatedly in the direction indicated by the arrow in FIG. 64 by an actuator such as a solenoid (not shown).

The belt supporting base 97 includes a planar surface parallel to a flat portion 95a of the paste-coating belt 95, and the paste-coating belt 95 slidingly travels on the planar surface thereof. A plurality of suction holes (not shown) are formed on the planar surface of the belt supporting base 97, each being connected to a suction source such as a vacuum pump (not shown) via the suction tube 98.

When the electrode paste 92 is applied to the end of the component chips P that is held within the component holding holes 1b2 of the component conveyer belt 1, as shown in FIG. 64, the paste-coating belt 95 intermittently travels in the direction indicated by the arrow to transfer the electrode paste 92 to the surface of the paste-coating belt 95 from the paste transfer roller 93. Then, the movable blade 96 is allowed to move repeatedly in the direction indicated by the arrow, and the transferred paste portions 92a having predetermined dimensions remain on the surface of the paste-coating belt 95. As is clear from FIG. 65, each transfer paste portion 92a has a lengthwise dimension to the belt slightly smaller than the width of the resilient body 1b of the component conveyer belt 1, and a widthwise dimension thereto slightly longer than the length of the resilient body 1b of the component conveyer belt 1.

Then, at the instant in which one of the transferred paste portions 92a on the paste-coating belt 95 reaches the center of the belt supporting base 97, the paste-coating belt 95 is stopped. The component conveyer belt 1 is allowed to intermittently advance in the direction indicated by the arrow concurrently therewith. Then, at the instant in which the component chips P that are held within the component holding hole 1b2 of the resilient body 1b reaches immediately above the center of the belt supporting base 97, the component conveyer belt 1 is stopped. Further, after the paste-coating belt 95 is stopped, the negative pressure is applied to the suction hole of the belt supporting base 97 to allow the reverse surface of the flat portion 95a of the paste-coating belt 95 to be held with absorption to the planar surface of the belt supporting base 97.

Referring now to FIG. 66, the depressing jig 99 is allowed to descend in the direction indicated by the arrow by an actuator such as a solenoid (not shown), depressing the resilient body 1b at the lower surface thereof, to press the projecting ends of the component chips P against a transferred paste portion 92a formed on the flat potion 95a of the paste-coating belt 95. As a result, the projecting ends of the plurality of component chips P that are held within one resilient body 1b are subjected to the paste coating at the same time. Since an area on the paste-coating belt 95 which the component chips P are pressed against and the vicinity area thereof are supported by the belt supporting base 97, the paste-coating belt 95 cannot be deflected downward at the instant when the component chips P are pressed thereagainst. After the component chips are pressed, the depressing jig 99 returningly moved upward to separate the projecting ends of the component chips P from the transferred portion 92a with use of the recovery force of the component conveyer belt 1. Since the area on the paste-coating belt 95 which the component chips P are pressed against and the vicinity area thereof are held with absorption by the belt supporting base 97, the paste-coating belt 95 cannot float upward at the time when the component chips P are separated therefrom.

The aforementioned operations such that the paste-coating belt 95 intermittently travels, the component conveyer belt 1 intermittently travels, and the depressing jig 99 ascends or descends are repeated in a given cycle, the paste coating will be subsequently applied to the following component chips P that are held within the component holding holes 1b2 of the resilient body 1b.

In the paste-coating machine, when the paste-coating belt 95 is stopped, the component chips P are pressed against the transferred paste portion 92a formed on the flat portion 95a of the paste-coating belt 95. As a result, the relative orientation and the position relation between the component chips P and the transferred paste portion 92a on the paste-coating belt 95 may be optimized, the dimensional precision of the electrode paste to be applied to the component chips P may be enhanced, and occurrence of the dimensional failure may be surely prevented for the external electrodes.

Further, since an area on the paste-coating belt 95 which the component chips P are pressed against and the vicinity area thereof are supported by the belt supporting base 97, the paste-coating belt 95 may be prevented from deflecting downward at the instant when the component chips P are pressed thereagainst. Therefore, the component chips P can be stably pressed against the transferred paste portions 92a.

Furthermore, since the area on the paste-coating belt 95 which the component chips P are pressed against and the vicinity area thereof are supported by the belt supporting base 97, the paste-coating belt 95 may be prevented from floating upward at the time when the component chips P are separated from the transferred paste portion 92a. Therefore, the paste coating failure can be avoided due to this floating.

By the way, in the paste-coating machine, the projecting ends of the plurality of component chips P that are held within one resilient body 1b are pressed against one of the transferred paste portions 92a formed on the flat portion 95a of the paste-coating belt 95. However, if the dimensions in the direction of the belt travel of the depressing jig 99 and the belt supporting base 97 are elongated, a plurality of component chips P held within a plurality of resilient bodies 1*b* will be simultaneously pressed against a plurality of transferred paste portions 92*a* on the flat portion 95*a*, respectively. Therefore, the paste can be applied to a number of component chips P at one operation, to considerably improve productivity.

Figure 67:
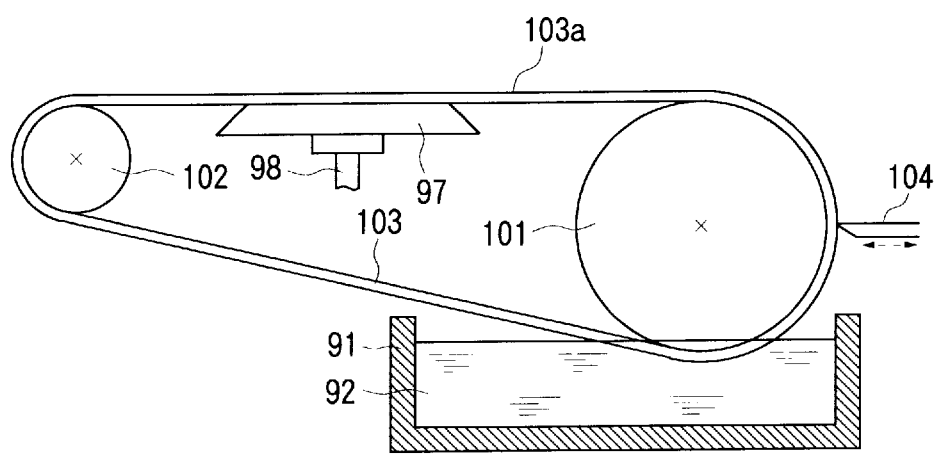
FIG. 67 is a diagram showing a modification of the paste-coating machine shown in FIG. 64.

Further, in the paste-coating machine, the paste transfer roller 93 is used to transfer the electrode paste 92 on the surface of the paste-coating belt 95. However, the paste transfer operation can be applied to the paste-coating belt 95 without the paste transfer roller 93. FIG. 67 shows an example of this case. The arrangement is made in such a manner as follows. A paste coating component conveyer belt 103 is wound around two belt supporting rollers 101, 102 having different diameters from each other. The lower portion of the belt supporting roller 101 having a larger diameter is dipped in the electrode paste 92 within the vessel 91, and a movable blade 104 is disposed sideways to the belt supporting roller 101 having a larger diameter in order to control the dimension (thickness dimension and length dimension in the direction of the belt) of the transferred paste portion remained on the surface of the paste coating component conveyer belt 103. The two belt supporting roller 101, 102 are arranged so that the circumferential upper portions thereof are positioned at the same height as each other. A flat portion 103*a* is present at the upper portion between the two belt supporting rollers so that the surface of the belt can appear. In such an arrangement, the electrode paste 92 within the vessel 91 may be allowed to be directly adhered to the surface of the paste coating component conveyer belt 103 on the belt supporting roller 101. Therefore, the paste transfer roller 93 may be removed to simplify the apparatus arrangement.

Figure 68:
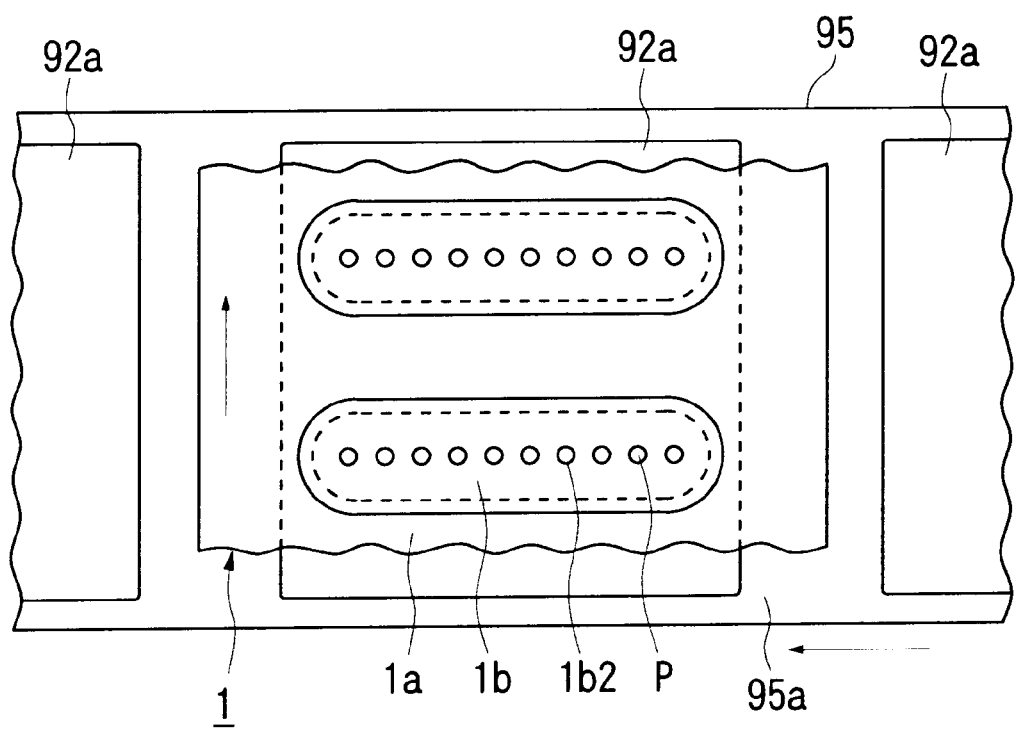
FIG. 68 is a diagram showing another modification of the paste-coating machine shown in FIG. 64.

Furthermore, in the paste-coating machine, the component conveyer belt 1 travels parallel to the direction where the paste-coating belt 95 travels. As shown in FIG. 68, the component conveyer belt 1 is arranged so as to travel perpendicular to the direction where the paste-coating belt 95 travels. In this case, if the belt lengthwise dimension of the transferred paste portion 92*a* that remains on the surface of the paste-coating belt 95 is set larger than the length of the resilient body 1*b* of the component conveyer belt 1, simultaneous paste operations can be applied to a plurality of the component chips P that are held within a plurality of the component holding holes 1*b*2 of the resilient bodies 1*b*. Accordingly, distance between the two belt supporting rollers are reduced to make the entire apparatus compact, and to implement efficiently the paste coating to the component chips P.

Description will be hereinbelow made of other constructive examples of the component conveyer belt applicable to the apparatus in the first to third embodiments according to the present invention.

Figure 69:
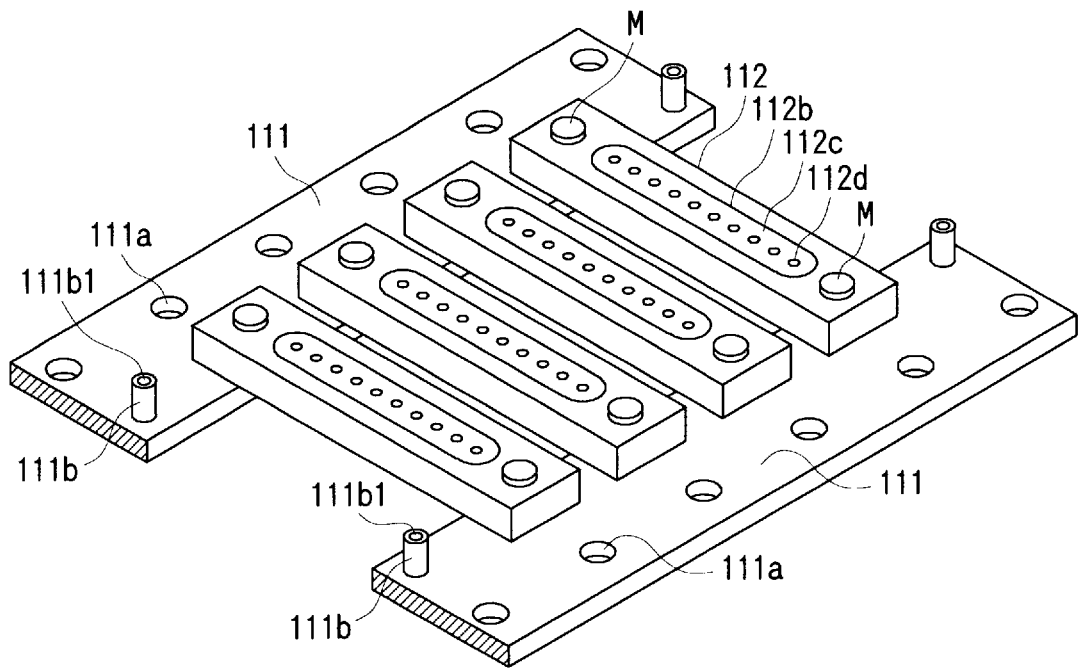
FIG. 69 is a partial perspective view showing a first example of a component conveyer belt applicable to the apparatus according to the first to third embodiments of the present invention.
Figure 70:
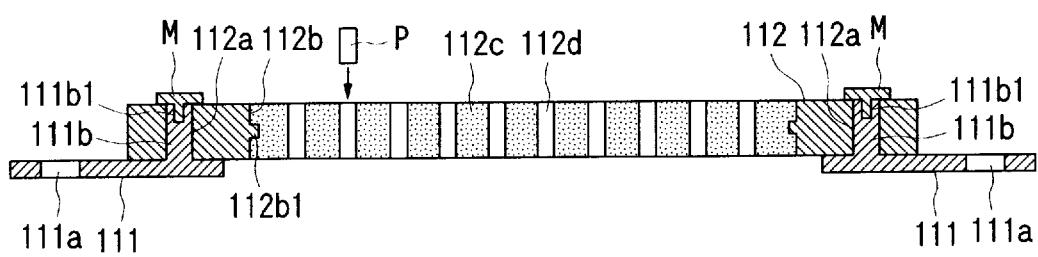
FIG. 70(A) is a cross-sectional view of the component conveyer belt in a width direction shown in FIG. 69.
FIG. 70(B) is a cross-sectional view of the component conveyer belt in a longitudinal direction shown in FIG. 69.
Figure 70:
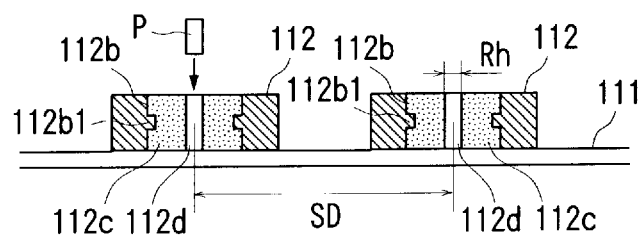
Figure 71:
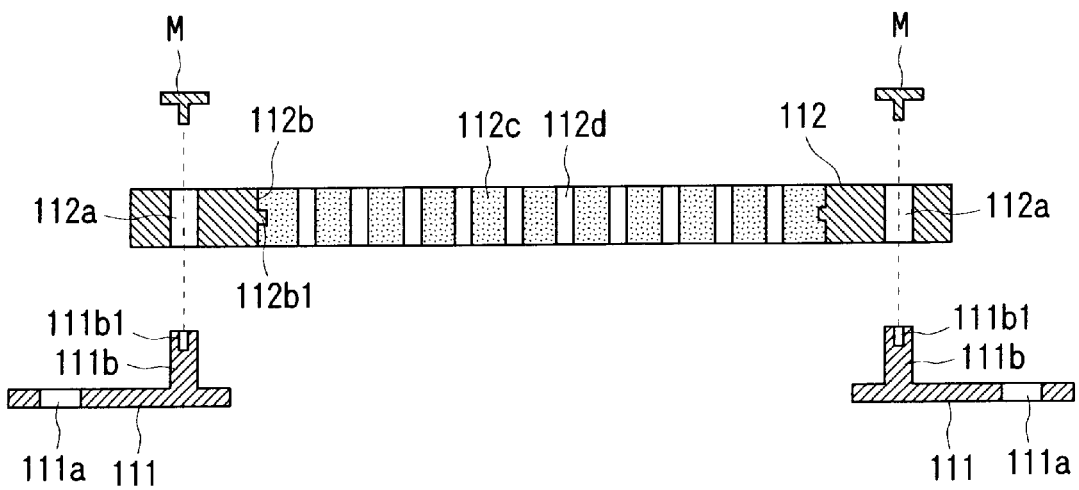
FIG. 71 is an exploded cross-sectional view of the component conveyer belt shown in FIG. 69.

FIGS. 69 to 71 show a first example of the component conveyer belt. The component conveyer belt shown in the figure is made up of a pair of belt bodies 111, and a plurality of component holding plates 112 formed at belt in a longitudinal direction at equal intervals so as to be parallel to each other.

The pair of belt bodies 111 is both preferably formed of metal such as stainless, and have non-expandability and appropriate flexibility. A plurality of guiding grooves 111*a* into which the circumferential surface projection of each of sprockets (not shown) is inserted and fitted are formed at belt in a longitudinal direction at equal intervals outside on an edge of each belt bodies 111. A plurality of connecting pins 111*b* to which the component holding plates 112 are connected are formed at belt in a longitudinal direction at equal intervals inside on a top surface of each belt body 111 so as to be positioned integrally with or separately from the each belt body 111. Retaining holes 111*b*1 for detachably retaining fasteners M such as screws or press-fit pins are formed on the top end surface of each connecting pin 111*b*.

Each component holding plate 112 is preferably formed of metal such as stainless is configured in a rectangular parallelepiped manner or similar thereto. Connecting channels 112*a* into which the connecting pins 111*b* can be inserted in a closed manner are formed at the both ends in a longitudinal direction of each component holding plate 112 so as to perforate therethrough. An elongated hole 112*b* extending lengthwise is formed between the connecting channels 112*a*, a resilient body 112*c* formed of synthetic rubber such as silicone rubber is fitted into the elongated hole 112*b* in a stepless manner with the plate surface. A convex portion 112*b*1 or concave portion (not shown) is formed inner surface of the elongated hole 112*b*, so that the resilient body 112*c* incorporated in the elongated hole 112*b* will not suffer from misalignment or dropout. A plurality of component holding holes 112*d* having a circle in a lateral section for resiliently holding the component chips P are formed at center widthwise of the resilient body 112*c* at plate in a longitudinal direction at equal intervals so as to perforate from the resilient body 112. The diameter Rh of each component holding hole 112*d* is set as slightly smaller than the end maximum length of each component chip P so that the component chips P can be inserted longitudinally and resiliently held.

The connecting channels 112*a* formed at the both ends of each component holding plate 112 are fitted into the connecting pins 111*b* of the pair of the belt bodies 111, and the fasteners M are retained in the retaining holes 111*b*1 of the connecting pins 111*b*. Therefore, the component holding plate 112 can be provided between the pair of belt bodies 111 so as to be perpendicular to the direction of the belt length. Since the connecting pins 111*b* are formed at belt in a longitudinal direction at equal intervals, as shown in FIG. 70(B), the thus formed component holding plate 112 is aligned parallel along with the pair of belt bodies 111 at a certain equal intervals SD. Further, when the fasteners M are released from the retaining holes 111*b*1 of the connecting pins 111*b*, the component holding plate 112 can be readily detached from the pair of belt bodies 111.

In the component conveyer belt, a plurality of the component holding plates 112 are detachably mounted between the pair of component conveyer belts 111. Therefore, when the above-noted electrode forming operation is repeatedly performed, even if the component holding holes 112*d* on some of the component holding plates 112 suffer from any inconvenience such as inserting failure or dropout of the component chips P due to damage to the component holding hole 112*d*, using the belt for a long time period will be possible by exchanging with a new one only the component holding plate 112 suffering from the inconvenience. Therefore, the cost for exchanging the components is reduced.

Figure 72:
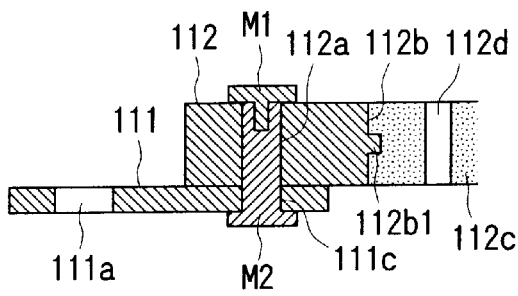
FIGS. 72(A) and 72(B) are diagrams showing a modification of the component conveyer belt shown in FIG. 69, respectively.
Figure 72:
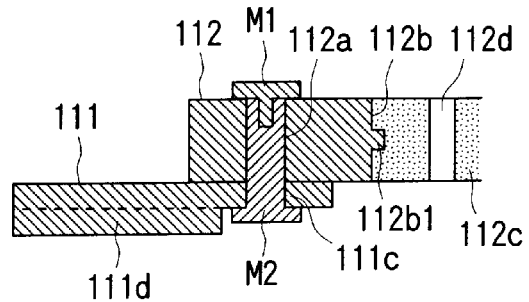

As shown in FIG. 72(A), the connecting pins 111*b* may be removed from the belt bodies 111, and in place thereof, a plurality of the retaining holes 111*c* may be formed at belt in a longitudinal direction at equal intervals. When the above-noted component holding plate 112 is mounted to the pair of belt bodies 111, it is preferable that the connecting holes 112*a* of the component holding plates 112 may be fitted into the retaining holes 111*c* of the belt body 111, and that connecting pins M2 having retaining holes (not shown)

in which the fasteners M1 such as springs or press-fit pins are detachably retained may be inserted from the down or the up to retain the fasteners M1 into the retaining holes of the connecting pins M2. As shown in FIG. 72(B), the guiding holes 111a are removed from the belt body 111, and in place thereof, timing teeth 111d may be formed on the lower surface of the belt body 111 along with the belt body 111. When the belt is used, a timing pulley (not shown) having teeth matched with the timing teeth 111d of the belt body 111 is used in place of the sprocket.

Figure 73:
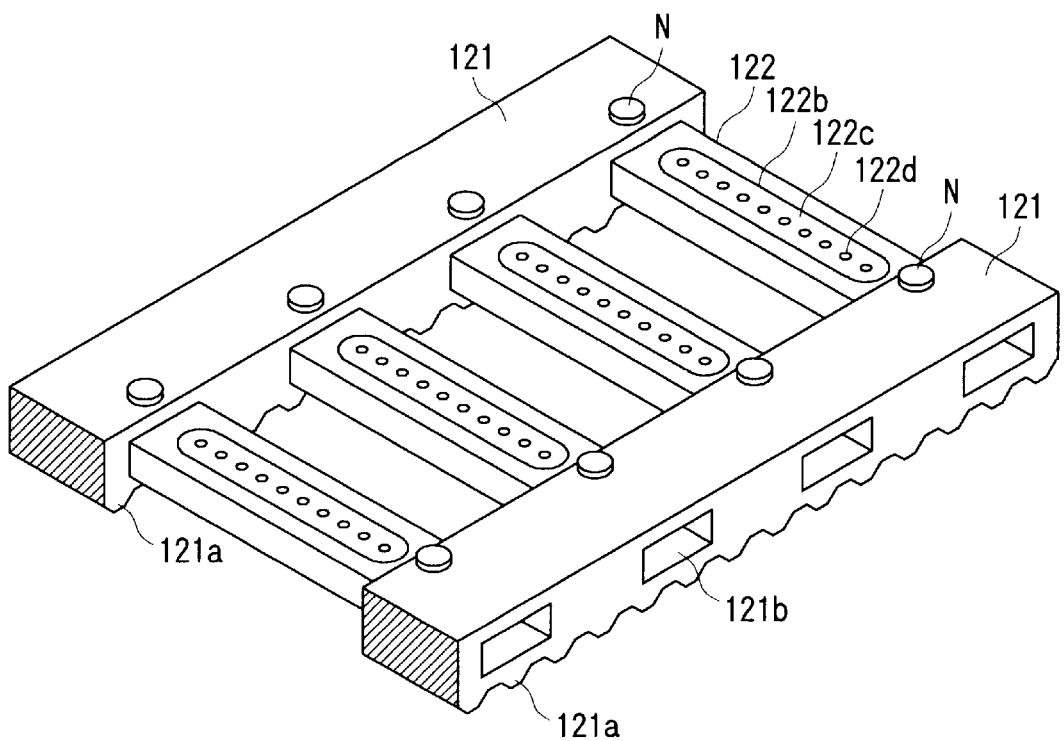
FIG. 73 is a partial perspective view showing a second example of the component conveyer belt applicable to the apparatus according to the first to third embodiments of the present invention.
Figure 74:
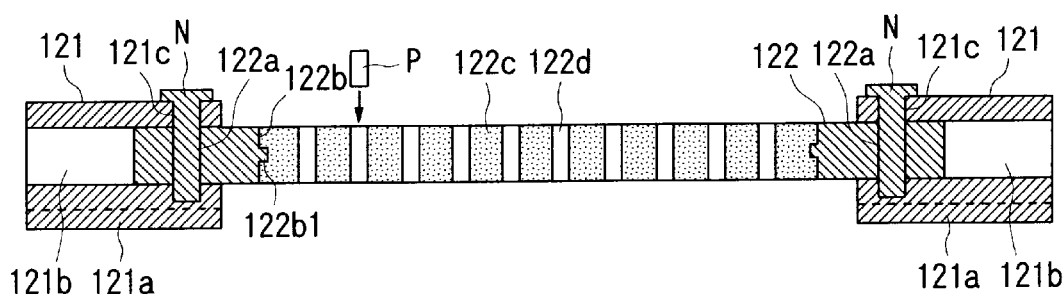
FIG. 74(A) is a cross-sectional view of the component conveyer belt in a width direction shown in FIG. 73.
FIG. 74(B) is a cross-sectional view of the component conveyer belt in a longitudinal direction shown in FIG. 73.
Figure 74:
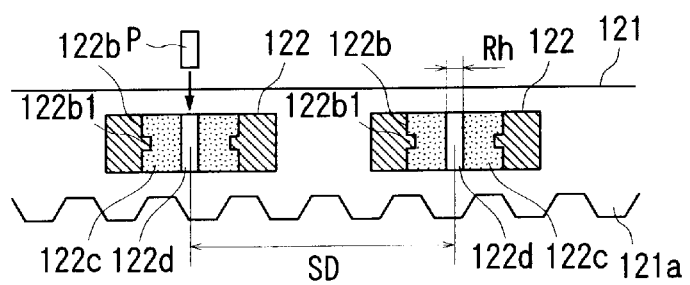
Figure 75:
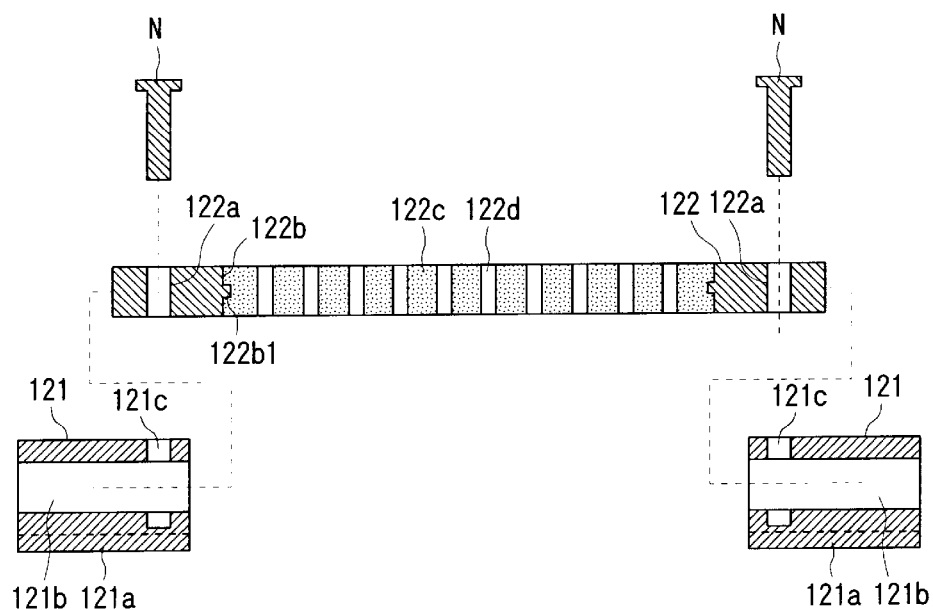
FIG. 75 is an exploded cross-sectional view of the component conveyer belt shown in FIG. 73.

FIGS. 73 to 75 show a second example of the component conveyer belt. The component conveyer belt shown in the figure is made up of a pair of belt bodies 121, and a plurality of component holding plates 122 disposed at equal intervals parallel to the direction of the belt length.

The pair of belt bodies 121 are both preferably formed of any material having non-expandability and appropriate flexibility. Timing teeth 121a into which the circumferential groove of the timing pulley (not shown) is inserted and fitted are formed at lower surface of each belt body 121. A plurality of plate insertion holes 121b are formed at belt widthwise equally spaced intervals so as to perforate therethrough. The plate insertion holes 121b has the same configuration as that of the component holding plate 122 which will be described later in their lateral section. Retaining holes 121c into which connecting pins N are detachably press-fitted are formed on the inside edge of each belt body 121 so as to correspond to each plate insertion hole 121b. Incidentally, each retaining hole 121c illustrated in the figures perforates through the upper wall of the plate insertion holes 121b, but not perforates through the lower wall thereof. The connecting pins N that are press-fitted into the retaining holes 121c are governed by the lower wall of the plate insertion holes 121b and individual upper collar for press-fitting limit.

Each component holding plate 122 is preferably formed of metal or resin is configured in a rectangular parallelepiped manner or similar thereto. Connecting channels 122a into which the above-noted connecting pins N can be inserted in a closed manner are formed at the both ends in a longitudinal direction of each component holding plate 112 so as to perforate therethrough. An elongated hole 122b extending lengthwise is formed between the connecting channels 122a, a resilient body 122c formed of synthetic rubber or softtissue resin is fitted into the elongated hole 122b in a stepless manner with the plate surface. A convex portion 122b1 or concave portion (not shown) is formed inner surface of the elongated hole 122b, so that the resilient body 122c incorporated in the elongated hole 122b will not suffer from misalignment or dropout. A plurality of component holding holes 122d having a circle in a lateral section for resiliently holding the component chips P are formed at center widthwise of the resilient body 122c at plate in a longitudinal direction at equal intervals so as to perforate from the resilient body 122c. The diameter Rh of each component holding hole 122d is set as slightly smaller than the end maximum length of each component chip P so that the component chips P can be inserted longitudinally and resiliently held.

Each component holding plate 122 is mounted between the pair of belt bodies 121 perpendicular to the belt in a longitudinal direction in such a manner that it is inserted into the plate insertion hole 121b of the pair of belt bodies 121 to fit the connecting holes 122a into the retaining holes 121c and the connecting pins N are press-fitted into the retaining holes 12lc from above the belt bodies 121. Of course, the component holding plate 122 can be inserted into the plate insertion holes 121b from both sides of the plate insertion holes 121b. As shown in FIG. 74(B), since the plate insertion holes 121b are formed at belt in a longitudinal direction at equal intervals, the component holding plates 122 are aligned parallel along with the belt bodies 121 at certain intervals SD. The component holding plate 122 can be removed from the pair of belt bodies 121 by extruding the connecting pins N from the retaining holes 121c of the belt bodies 121.

In the component conveyer belt, a plurality of the component holding plates 122 are detachably mounted between the pair of belt bodies 121. Therefore, when the above-noted electrode forming operation is repeatedly performed, even if the component holding holes 122d on some of the component holding plates 122 suffer from any inconvenience such as inserting failure or dropout of the component chips P due to damage to the component holding hole 122d, using the belt for a long time period will be possible by exchanging with a new one only the component holding plate 122 suffering from the inconvenience. Therefore, the cost loading for the component exchanging may be reduced.

Figure 76:
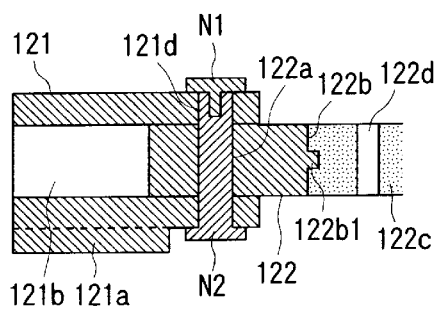
FIGS. 76(A) and 76(B) are diagrams showing a modification of the component conveyer belt shown in FIG. 73, respectively.
Figure 76:
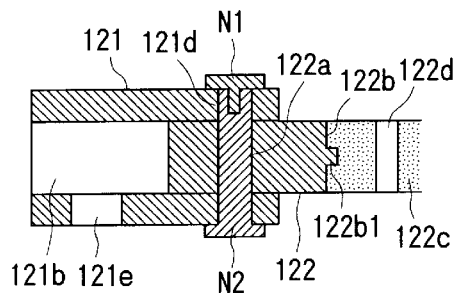

As shown in FIG. 76(A), the connecting holes 122a may be formed so as to perforate through the pair of belt bodies 121, the connecting holes 122a on the component holding plates 122 are fitted into the retaining holes 121d of the belt bodies 121 to insert from the lower or upper side thereof connecting pins N2 having at the upper end thereof retaining holes (not reference numerals) into which the fasteners N1 such as screws or press-fit pins may be detachably retained. Then, the fasteners N1 may be retained into the retaining holes of the connecting pins N2. Further, as shown in FIG. 76(B), timing teeth 121a may be removed from the belt bodies 121, and in place thereof, a plurality of the guide holes 121e may be formed at lower surface of the belt bodies 121 in a longitudinal direction at equal intervals. When this belt is used, a sprocket (not shown) having projection matched with the guiding holes 121e of the belt body 121 is used in place of the timing pulley.

Figure 77:
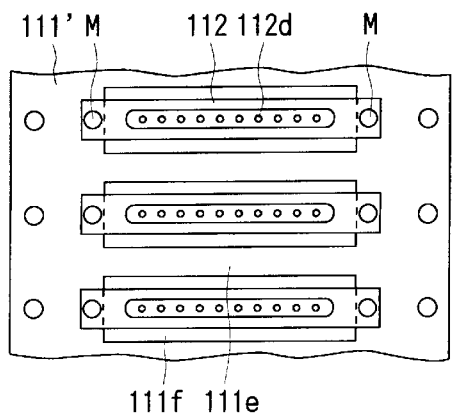
FIGS. 77(A) and 77(B) are diagrams showing modifications of the component conveyer belt shown in FIG. 69 and the component conveyer belt shown in FIG. 73, respectively.
Figure 77:
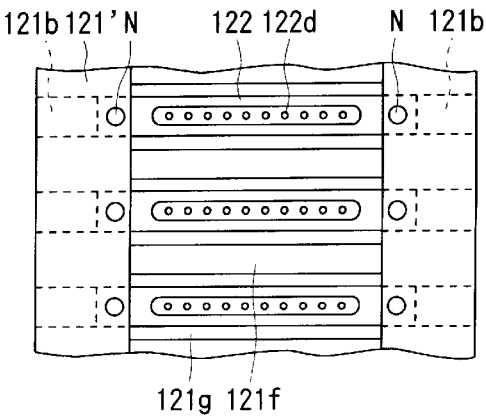

Further, in the above component conveyer belts, the component holding plates are provided between the pair of belt bodies. However, as shown in FIG. 77(A), a belt body 111' having such a configuration that the above-noted belt bodies 111 are connected to each other by the strip portion 111e may be available in such a manner that the component holding plates 112 may be mounted so as to be positioned at the laterally elongated holes 111f formed at belt in a longitudinal direction at equal intervals, respectively. Alternatively, as shown in FIG. 77(B), a belt body 121' having such a configuration that the above-noted belt bodies 121 are connected to each other by the strip portion 121f may be available in such a manner that the component holding plates 122 may be mounted so as to be positioned at the laterally elongated holes 121g formed at belt in a longitudinal direction at equal intervals, respectively.

Figure 78:
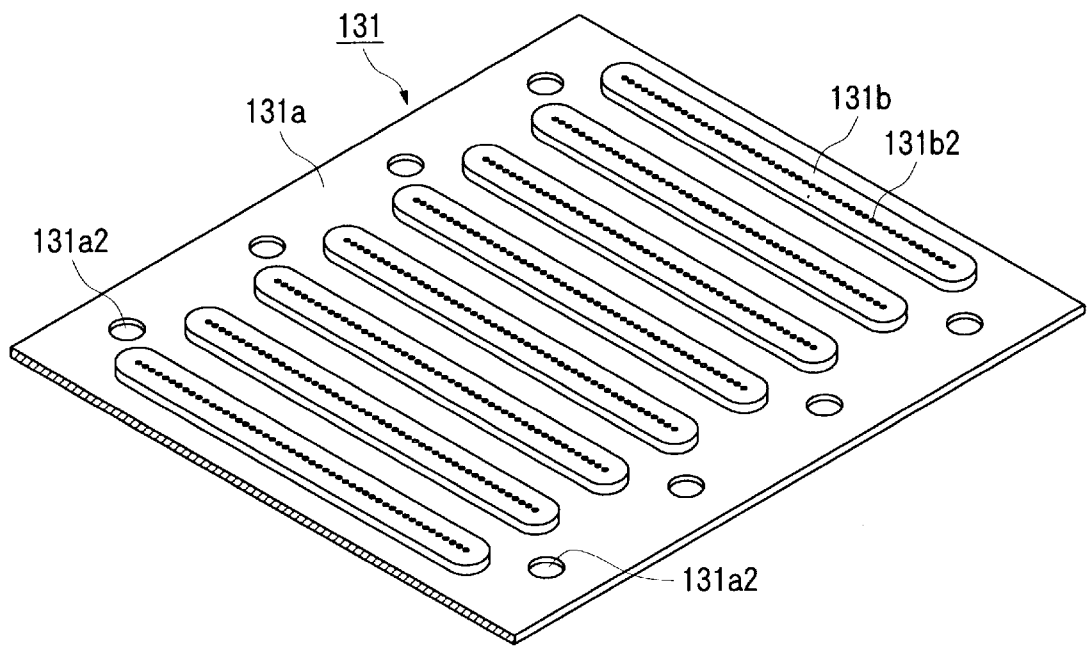
FIG. 78 is a partial perspective view showing a third example of the component conveyer belt applicable to the apparatus according to the first to third embodiments of the present invention.
Figure 79:
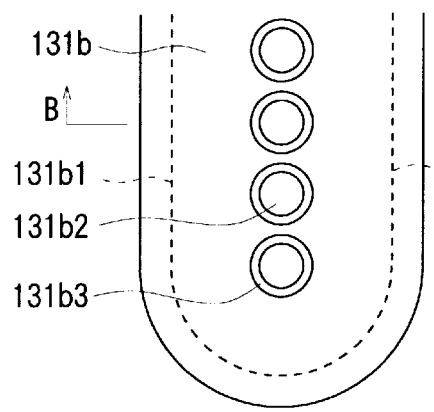
FIG. 79(A) is a top view of the main portion of the component conveyer belt shown in FIG. 78.
FIG. 79(B) is a longitudinal sectional view of the main portion of the component conveyer belt shown in FIG. 78.
Figure 79:
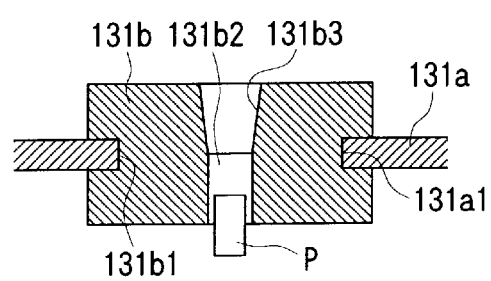

FIGS. 78, 79(A) and 79(B) show a third example of the component conveyer belt. The component conveyer belt 131 shown in the figure is made up of a belt body 131a, and a plurality of resilient bodies 131b disposed at belt in a longitudinal direction at equal intervals.

The belt body 131a is formed of metal or resin, and is not expandable, while having appropriate flexibility. A plurality of resilient mounting holes 131a1 having a configuration extending widthwise to the belt are formed at equal intervals parallel to the direction of the belt length on the belt bodies 131a. A plurality of guiding grooves 131a2 into which the circumferential surface projection of each of sprockets is inserted and fitted are formed at belt in a longitudinal direction at equal intervals outside on an edge of the belt body 131a.

Each resilient body 131b is formed of synthetic rubber or soft-tissue resin, having appropriate flexibility. Each resilient body 131b has a slight larger thickness than that of the belt body 131a, a slightly larger width and length than that of the mounting hole 131a1, and has a ring groove 131b1 into which the inner edge of the mounting hole 131a1 is inserted and fitted at the center in the thickness direction of the circumferential surface. A plurality of component holding holes 131b2 having a circle in lateral section are formed in the direction of the length and thickness of the resilient body at equal intervals so as to perforate therethrough. A guide portion 131b3 having a basin shape for guiding the component insertion into the component holding holes 131b2 is formed at one end of each component holding hole 131b2 (upper end portion viewing the drawing).

As is clear from FIG. 79(B), the length dimension of the entire component holding hole 131b2 including the guide portion 131b3 is made more than two orders of magnitude but less than three orders of magnitude larger than the length dimension of the component chip P. Further, out of length dimension of the entire component holding hole 131b2 including the guide portion 131b2, the dimension ratio for the guide portion 131b2 is half order of magnitude or less. The inner diameter of the component holding hole 131b2 exclusive of the guide portion 131b2 is made slightly smaller than the end maximum length of the component chip P. The component chip P that is inserted into the component holding hole 131b2 is held under resilience of the resilient body 131b. Also, upper opening diameter of the guide portion 131b3 is slightly larger than the end maximum length of the component chip P, and the component chips P are introduced downward with a slant inner surface of the guide portion 131b3.

In the component conveyer belt 131, therefore, basin-like guide portion 131b3 is formed at the upper portion of the component holding hole 131b2, and the length dimension of the component holding hole 131b2 including the guide portion 131b3 is set larger than the length dimension of the component chip P. Therefore, if the component insertion is carried out in the state where the inserted component P and the component holding hole 131b2 are slightly misaligned, the misalignment may be corrected in the process of introducing the component chips P with the slant inner surface of the guide portion 131b3. Accordingly, damage to the interior of the component holding hole 131b2 by the inserted component chips P may be positively prevented, so that such difficulty of the slant inserted component chips P caused by such damage will be overcome to enhance accuracy such as the characteristic test or the dimensional test. Another difficulty such as reduced time resistant to use may be overcome, and thus the cost loading for the component exchanging may be reduced.

Since the length dimension of the entire component holding hole 131b2 including the guide portion 131b3 is set more than two orders of magnitude larger than the length dimensional of the component chip P, the guide portion 131b3 is formed at the upper portion of the component holding hole 131b2, the component chips P can be resiliently held by the component holding holes 131b2 with high efficiency. Therefore, such difficulty as the component dropout during conveyance cannot occur.

Figure 80:
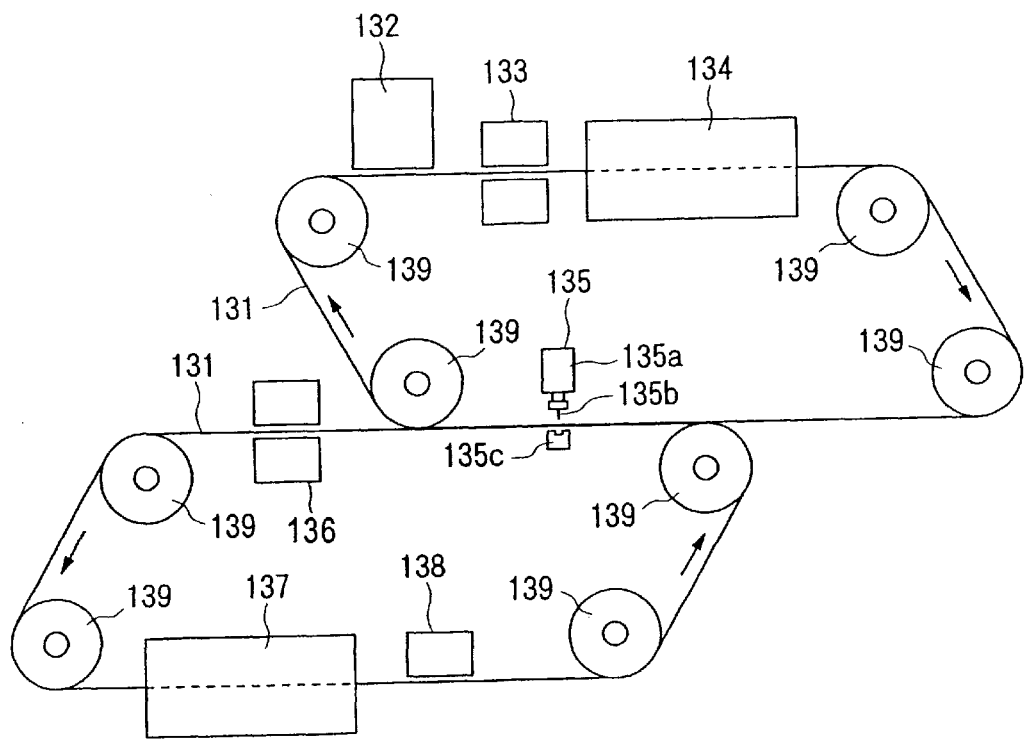
FIG. 80 is a schematic structural view of the external electrode forming apparatus using the component conveyer belt shown in FIG. 78.

FIG. 80 is a diagram of an external electrode forming apparatus using the above-noted component conveyer belt 131. In the figure, reference numeral 131 denotes a belt, 132 denotes a component-inserting machine, 133 denotes a first paste-coating machine, 134 denotes a first paste dryer, 135 denotes a component feeding machine, 136 denotes a second paste-coating machine, 137 denotes a second paste dryer, 138 denotes a component-discharging machine, and 139 denotes a sprocket.

Two component conveyer belts 131 are prepared. One component conveyer belt 131 is wound around four sprockets 139 positioned at upside, and the other component conveyer belt 131 is wound around four sprockets 139 positioned at downside. The former component conveyer belt 131 positioned at upside intermittently travels in the clockwise direction viewing the drawing at a certain pitch so as to correspond to the intervals of the resilient bodies 131b by an intermittent driving means such as a pulse motor (not shown) connected to one of the sprockets 139. The latter component conveyer belt 131 positioned at downside is synchronized with the upside component conveyer belt 131 intermittently travels in the counterclockwise direction viewing the drawing at a certain pitch so as to correspond to the intervals of the resilient bodies 131b by an intermittent driving means such as a pulse motor (not shown) connected to one of the sprockets 139.

The component-inserting machine 132 has the same arrangement as that shown in FIG. 32. When the resilient body 131b of the upside component conveyer belt 131 is stopped at the component insertion position, the component chips P are inserted into a plurality of component holding holes 131b2 of the resilient bodies 131b.

The first paste-coating machine 133 has the same arrangement as that shown in FIG. 6(A). When the resilient body 131b of the upside component conveyer belt 131 stops at the paste coating position, the projecting end portions of a plurality of the component chips P that are held within the component holding holes 131b2 of the resilient bodies 131b are coated with electrode paste.

The first paste dryer 134 has the same arrangement as that shown in FIG. 1. The electrode paste applied to the component chips P by the first paste-coating machine 133 is dried in the process in which the component conveyer belt 131 passes within the first paste dryer 134.

The component feeding machine 135 serves to feed the component chips P that are held within the component holding holes 131b2 of the resilient bodies 131b of the upside component conveyer belt 131 to the component holding holes 131b2 of the resilient bodies 131b of the downside component conveyer belt 131. The component feeding machine 135 includes a cylinder 135a, feeding rods 135b each being connected to a rod of the cylinder 135a, and a receptacle base 135c for supporting the resilient body 131b. Incidentally, the feeding rod 135b have the number of and the arrangement so as to correspond to those of the component holding holes 131b2 formed on the resilient bodies 131b, and has a lateral section shape smaller than that of each component holding hole 131b2. A recess 135d for avoiding interference with the component chips P that are changingly fed to the downside component conveyer belt 131 is formed on the receptacle base 135c.

The second paste-coating machine 136 has the same arrangement as that shown in FIG. 6(A). When the resilient body 131b of the downside component conveyer belt 131 stops at the paste coating position, the projecting end portions of a plurality of the component chips P that are held within the component holding holes 131b2 of the resilient bodies 131b are coated with electrode paste.

The second paste dryer 137 has the same arrangement as that shown in FIG. 1. The electrode paste applied to the component chips P by the second paste-coating machine 136 is dried in the process in which the component conveyer belt 131 passes within the second paste dryer 137.

The component-discharging machine 138 has the same arrangement as that shown in FIG. 8(A). When the resilient body 131b of the downside component conveyer belt 131 stops at the component discharging position, a plurality of the component chips P that are held within the component holding holes 131b2 of the resilient bodies 131b are discharged downward out of the component holding holes 131b2.

When the apparatus shown in FIG. 80 is used to form external electrode on the component chips P, a rotation driving source (not shown) makes the upside component conveyer belt 131 to intermittently rotate clockwise in FIG. 80 and the downside component conveyer belt 131 to intermittently rotate counterclockwise in FIG. 80 in the same cycle and velocity as each other.

Figure 81:
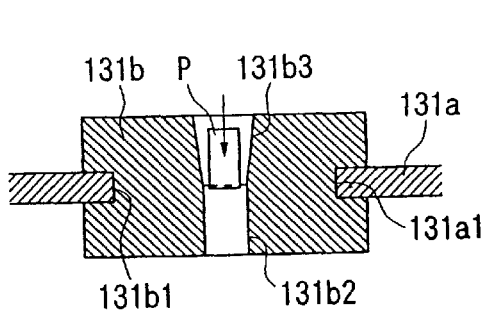
FIGS. 81(A) and 81(B) are diagrams showing a component inserting operation into a component holding hole in the apparatus shown in FIG. 80.
Figure 81:
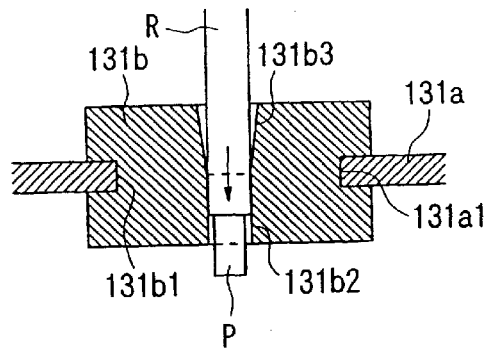

As shown in FIGS. 81(A) and 81(B), the component chips P are inserted from the component-inserting machine 132 into the component holding holes 131b2 of the resilient bodies 131b of the upside component conveyer belt 131 with the timing when the resilient bodies 131b stop at the component insertion position. One end of the inserted component chips P into the component holding holes 131b2 project beyond the lower surface of the resilient bodies 131b.

When the resilient bodies 131b in which the component chips P have been inserted is stopped at the paste coating position, the electrode paste is applied by the first paste-coating machine 133 to projecting end portions of a plurality of the component chips P that are held within the component holding holes 131b2 of the resilient bodies 131b.

The component chips P that have been coated with the electrode paste are dried in the process in which the component conveyer belt 131 passes within the first paste dryer 134. When the resilient body 131b holding the component chips P that have been subjected to dry the paste travel downside through the two sprockets 139, the resilient body 131b reversely upside down, thereby one end portion of the component chips P are projected from the upper surface of the resilient body 131b.

Figure 82:
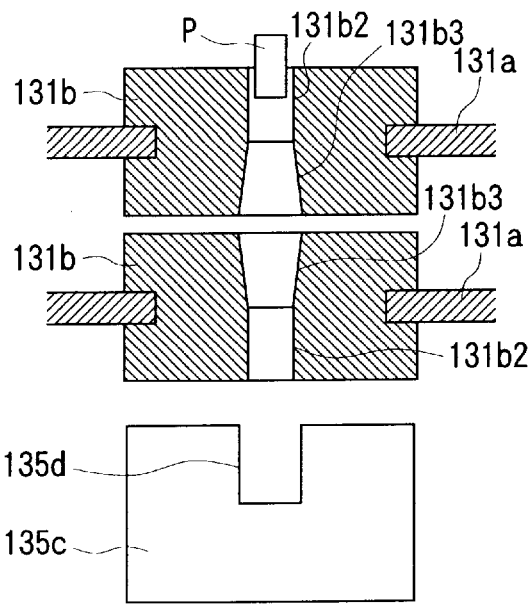
FIGS. 82(A) to 82(D) are diagrams showing a component transitional operation from the component holding hole to another component holding hole in the apparatus shown in FIG. 80.
Figure 82:
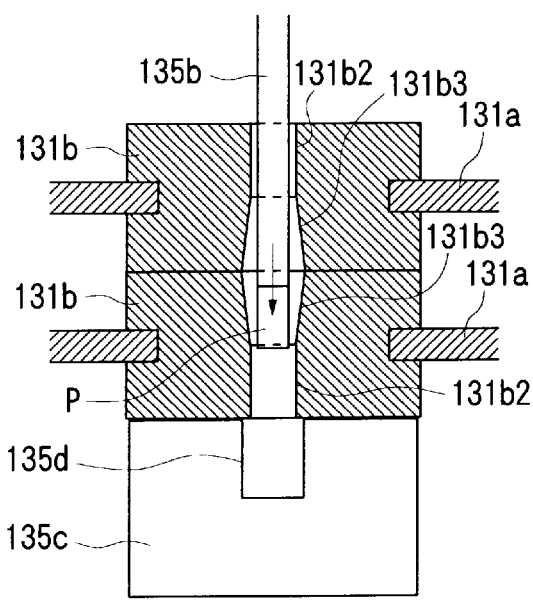
Figure 82:
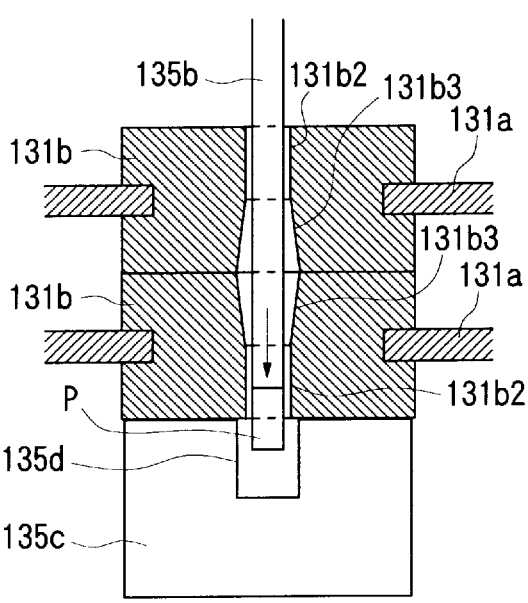
Figure 82:
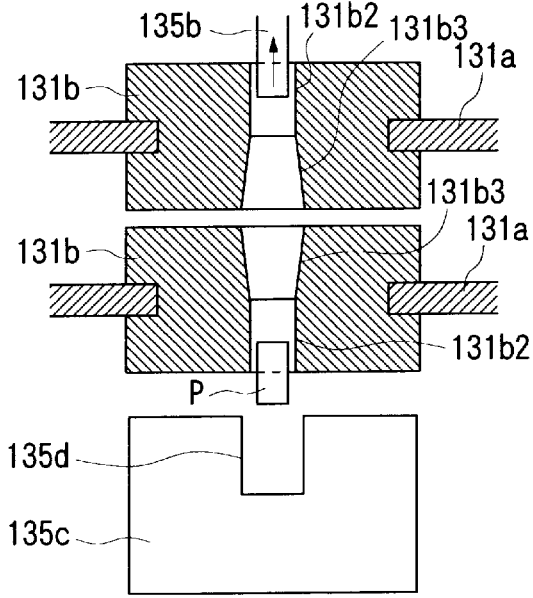

When the resilient body 131b is stopped at the component feeding position as shown in FIG. 82(A), as shown in FIG. 82(B), the feeding rod 135b descends from the waiting position. The component chips P that are held within the component holding holes 131b2 of the upside resilient bodies 131b are extruded downward to travel downward within the component holding holes 131b2, and then enter into the guide portion 131b3 of the downside resilient bodies 131b. As shown in FIG. 82(C), when the feeding rod 135b further descends, the component chips P that have entered into the guide portion 131b3 are forced into the lower portion of the component holding holes 131b2 while being introduced downward by the slant inner surface of the guide portion 131b3. Then, the resulting component chips P are held in the state where another end portion projects from the lower surface of the resilient body 131b. Since the receptacle base 135c has the recess 135d, the projection of each component chip P and the receptacle base 135c are not interfered with each other. After the component feeding, as shown in FIG. 82(D), the feeding rod 135b ascends to be returned to the original position.

When the resilient bodies 131b of the downside component conveyer belt 131 on which the component chips have been fed stop at the paste coating position, the electrode paste is applied by the second paste-coating machine 136 to projecting end portions of a plurality of the component chips P that are held within the component holding holes 131b2 of the resilient bodies 131b.

The resilient body 131b holding the component chips P that have been subjected to apply the paste travel downside through the two sprockets, the resilient body 131b reversely upside down, and one end portion of the component chips P are projected from the lower surface of the resilient body 131b.

When the resilient body 131b stops at the component discharging position, the component chips P that are held within the component holding holes 131b2 of the resilient bodies 131b are extruded downward out of the component holding holes 131b2, and then are discharged outside. Incidentally, if the rotations of the two component conveyer belts 131 are coincident with each other, and the portion where the two component conveyer belts parallel confront each other is allowed to intermittently advance in reverse direction in the same cycle and velocity as each other, the same operation would be obtained.

Figure 83:
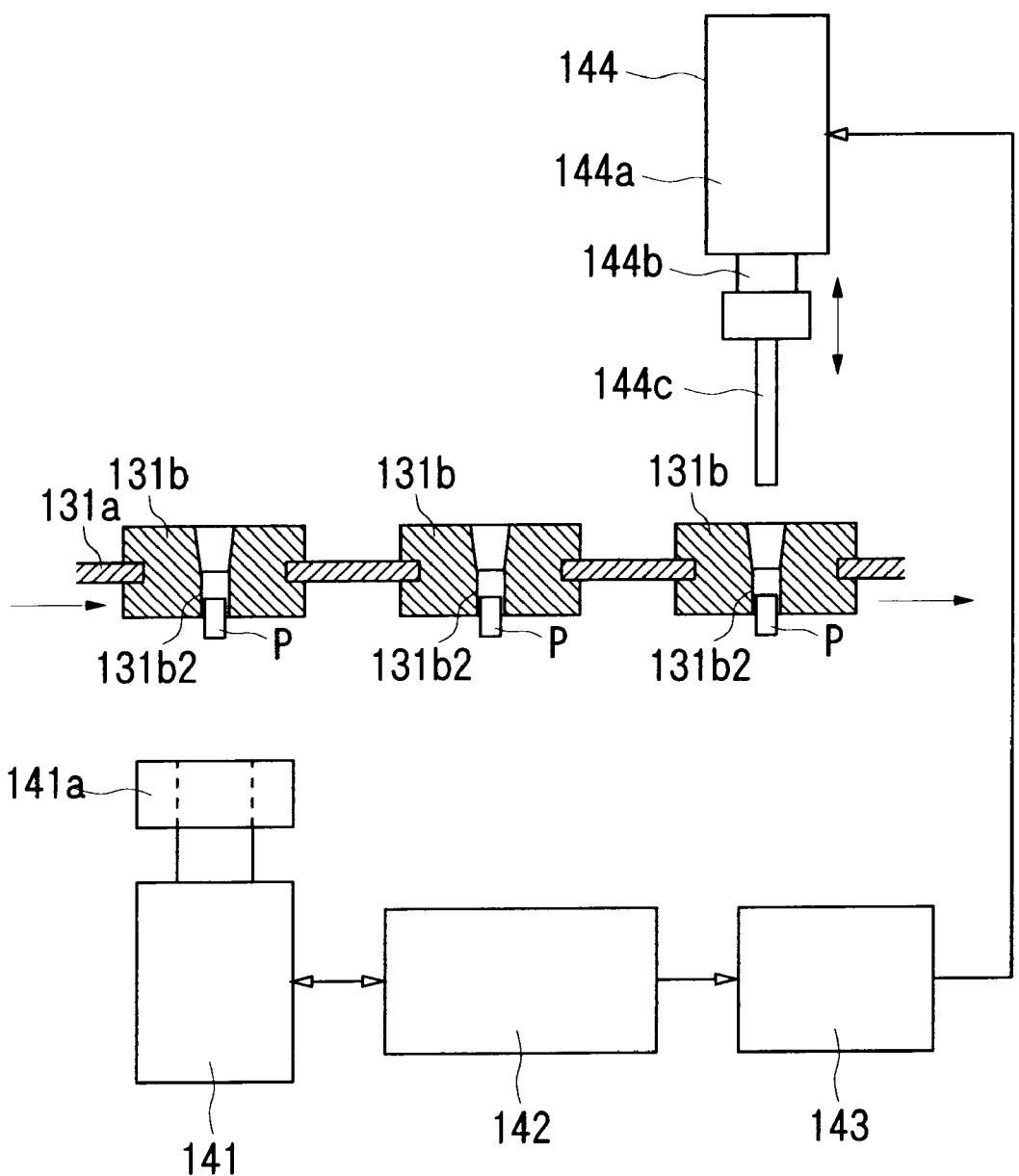
FIG. 83 is a block diagram of an apparatus for detecting and removing the component chips that are inserted into the component holding hole in a slant state.

Shown in FIG. 83 is an apparatus for detecting and discharging component chips P that are inserted into the component holding hole in the slant condition. Though FIG. 83 exemplifies the component conveyer belt 131 illustrated in FIG. 78, this apparatus may be applicable to all the modifications for the external electrode forming apparatus as described previously.

The apparatus shown in FIG. 83 includes a CCD camera 141, a control unit 142, a driving unit 143, and a component eliminating machine 144. The CCD camera 141 is placed so as to confront the component projection side of the resilient body 131b, and photographs the projection to tune for the stopping timing of the conveyer belt while lighting it by a lighting utensil 141a. The control unit 142 has a data processing arranged by microcomputer and an imaging memory. The control unit 142 discriminates the presence or absence of the slant of the component chips P that are held within the component holding holes 131b2 on the basis of the imaging data obtained by the CCD camera 141, and sends to the driving unit 143 signals for eliminating the component chips P that are held therein in the slant state.

The component eliminating machine 144 includes a cylinder 144a, and an eliminating rod 144c connected to a rod 144b thereof. The component eliminating machine 144 is located at a different position from the photographing position, and serves to eliminate the component chips P that are inconveniently held within the component holding holes 131b2 so as to tune for the stopping timing of the component conveyer belt 131. Incidentally, the cylinder 144a and the eliminating rod 144c have the number and the arrangement so as to correspond to the component holding holes 131b2 formed on the resilient bodies 131b, respectively, and the eliminating rod 144c has a lateral section shape smaller than that of the component holding hole 131b2. If the intervals between the component holding holes 131b2 are so small that the cylinder 144a and the eliminating rod 144c are difficult to be arranged so as to be coincident with the number of the component holding holes 131b2 and the arrangement thereof, the component holding holes 131b2 may be divided into some blocks. Then, a plurality of the component eliminating machines 144 corresponding to the respective blocks are placed at different positions, and the stepwise component eliminating operation may be performed.

The driving unit 143 is made up of an air circuit including an air source and an electric bulb, and allows the cylinder 144a of the component eliminating machine 144 to suitably operate in responsive to the signals from the control unit 142 to eliminate the component chips P that are inconveniently held therein.

In this apparatus according to the present invention, if the slant that is to be considered inconvenient in the component chips P that are held within the component holding holes 131b2 of the resilient bodies 131b is discovered by the imaging data obtained by the CCD camera 141, the eliminating rod 144c corresponding to the component holding holes 131b2 within which the inconveniently held component chips P are held is allowed to descend from the waiting position at the timing when the resilient bodies 131b of the component conveyer belt 131 stop under the eliminating rod 144c of the component eliminating machine 144. Therefore, this eliminating rod 144c enables the inconveniently held component chips P to be forced into downward to be eliminated outside. Accordingly, in the case where the component chips P that are inserted into the component holding holes 131b2 should suffer from the slant, the slant component chips P can be eliminated prior to the paste coating. As a result, failure due to the slant would be obviated.

While the present invention has been shown in conjunction with preferred embodiments thereof, it is not so limited but is susceptible of many variations and modifications without departing from the spirit and scope of the appended claims.

What is claimed is:

1. An apparatus for forming external electrodes on component chips, comprising:

an endless component conveyer belt arrangement including a plurality of component holding holes for resiliently holding the component chips;

a belt driving mechanism for intermittently driving said component conveyer belt arrangement through a given distance each time the belt is driven;

a component-inserting machine for inserting the component chips into the component holding holes, the component inserting machine including first pressure pins for projecting a first end portion of each component chip from one surface of said component conveyer belt arrangement;

paste-coating machinery for coating with electrode paste the projection of each component chip held within each component holding hole; and a position misalignment detection apparatus for detecting relative misalignment between said component conveyer belt and a point while the belt is stopped; and a position correction apparatus connected to be responsive to the detection apparatus for correcting the misalignment between said component conveyer belt and said point before the component chips are forced into the component holding holes.

2. The apparatus of claim 1 wherein the detection apparatus includes an image processor arranged to be responsive to an image on the belt while the image is in the vicinity of the point.

3. The apparatus of claim 2 wherein the point is at said component-inserting machine.

4. An apparatus as claimed in claim 2, wherein said position misalignment is detected based upon a difference between a reference position for said component conveyer belt and a preset reference position of the processed image.

5. An apparatus as claimed in claim 2, wherein said position misalignment is detected based upon a difference between a reference position for said component conveyer belt and a reference position of said component-inserting machine.

6. The apparatus of claim 1 wherein the point is at said component-inserting machine.

* * * * *

UNITED STATES PATENT AND TRADEMARK OFFICE
CERTIFICATE OF CORRECTION

PATENT NO. : 6,214,118 B1
DATED : April 10, 2001
INVENTOR(S) : Naoki Obana

It is certified that error appears in the above-identified patent and that said Letters Patent is hereby corrected as shown below:

<u>Title page, Item [54], and Column 1, lines 1-6,</u>
The title should read: -- [54] APPARATUS FOR FORMING EXTERNAL ELECTRODES OF ELECTRONIC COMPONENT, COMPONENT INSERTING APPARATUS, PASTE COATING APPARATUS, AND COMPONENT CONVEYER BELT --.

Signed and Sealed this

Fourteenth Day of May, 2002

*Attest:*

*Attesting Officer*

JAMES E. ROGAN
*Director of the United States Patent and Trademark Office*